Aug. 16, 1960
E. L. WALTERS ET AL
2,948,991
AUTOMATIC GLASS CUTTING MACHINE
Filed Oct. 22, 1956
24 Sheets-Sheet 1
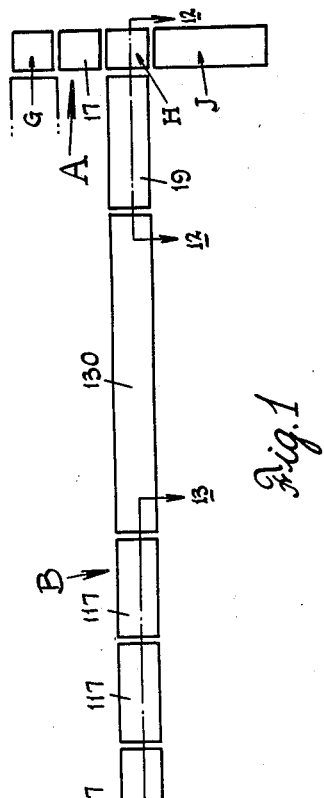
INVENTORS
Emmett L. Walters and
BY Alfred H. Miller
Nobbe & Swope
ATTORNEYS

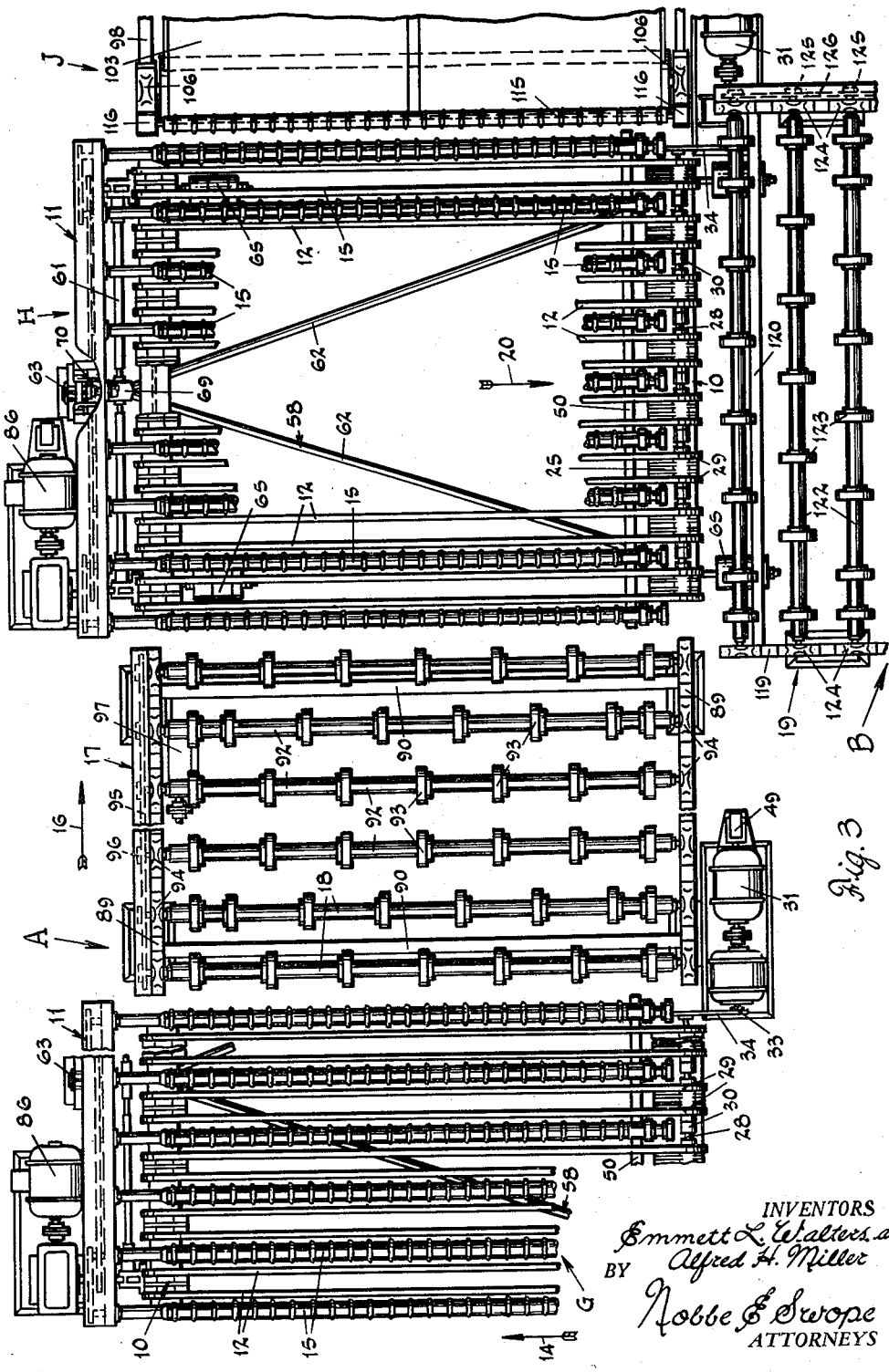

Aug. 16, 1960  E. L. WALTERS ET AL  2,948,991
AUTOMATIC GLASS CUTTING MACHINE
Filed Oct. 22, 1956  24 Sheets-Sheet 3
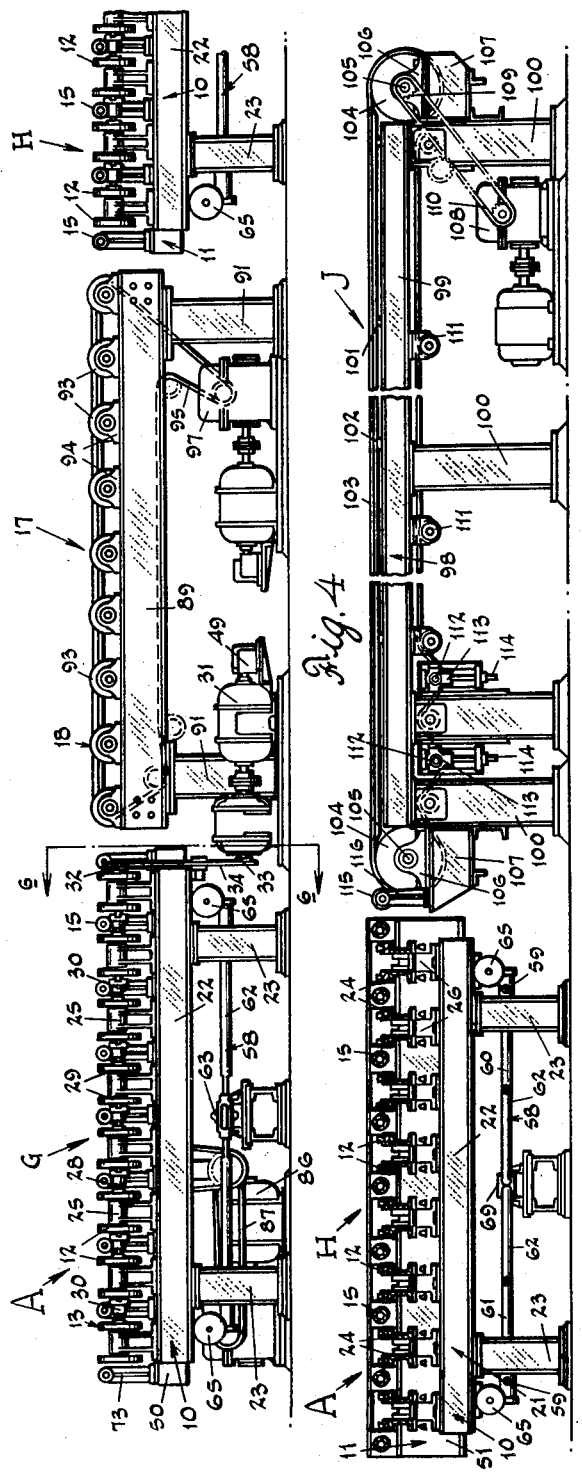
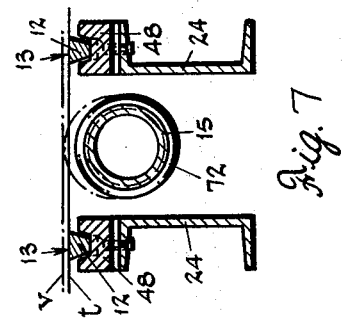
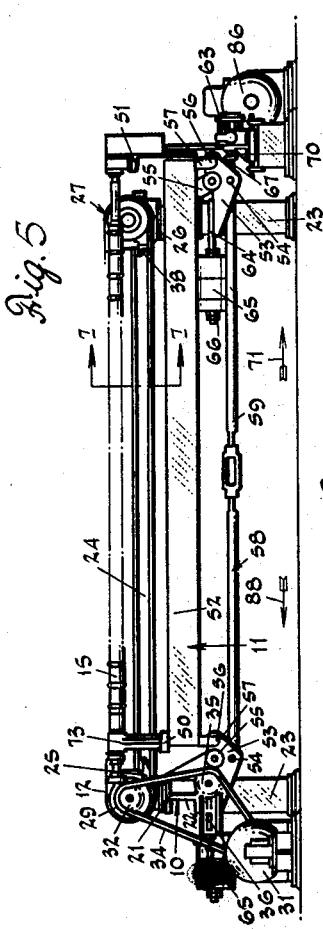
INVENTORS
Emmett L. Walters and
BY Alfred H. Miller
Robbe & Swope
ATTORNEYS

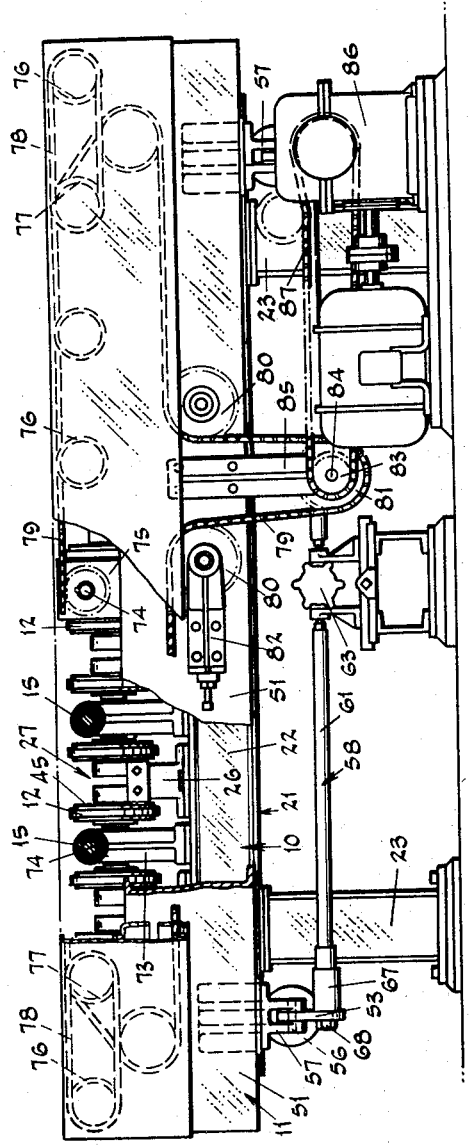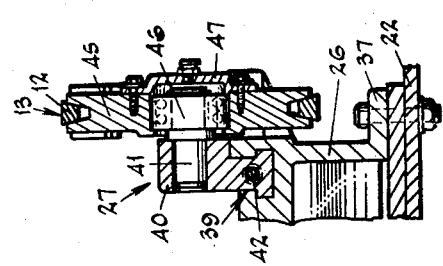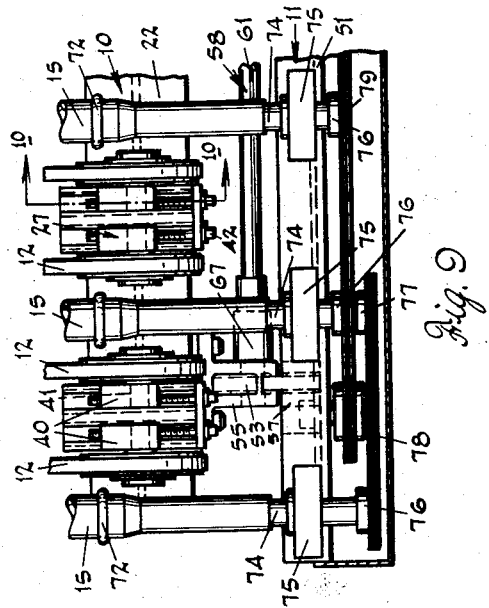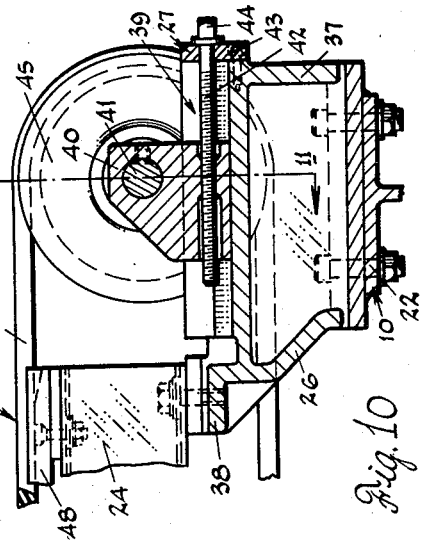

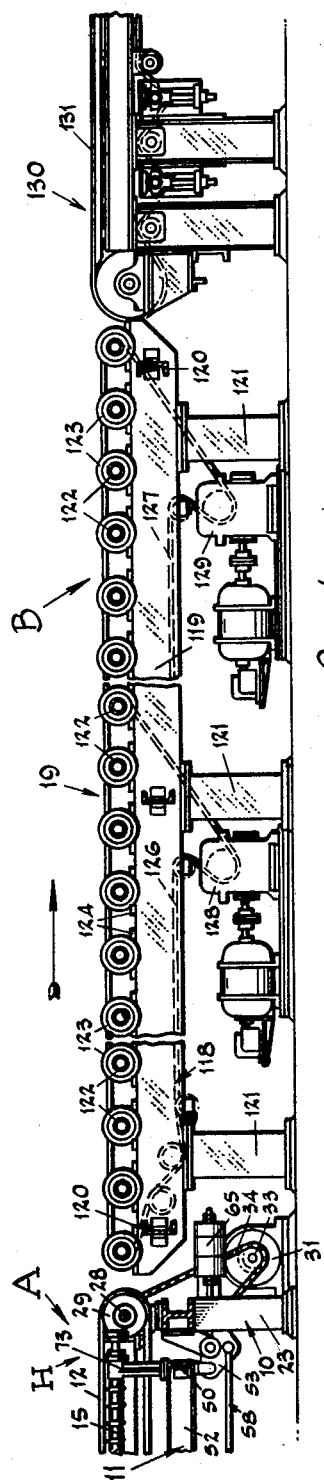

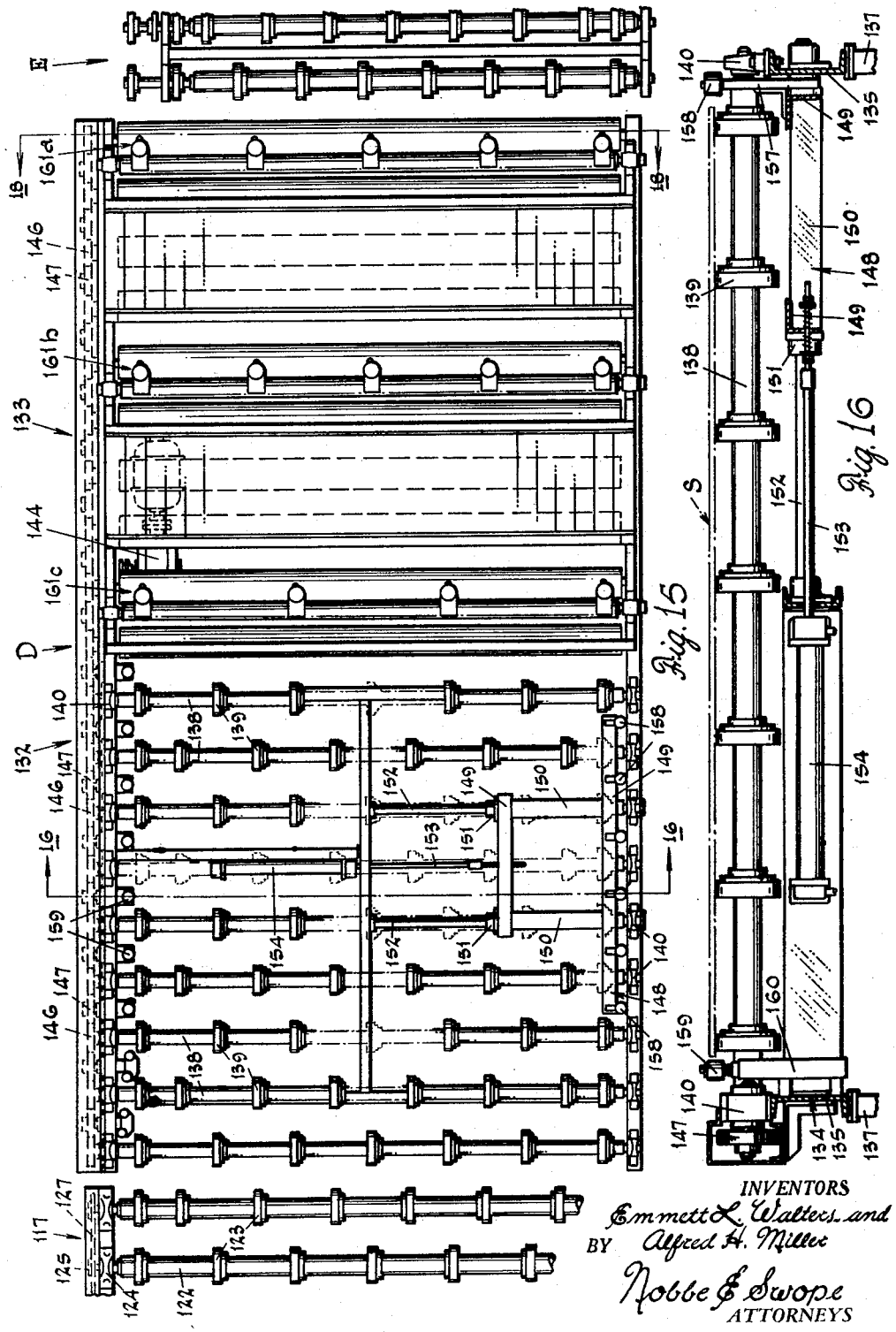

Aug. 16, 1960     E. L. WALTERS ET AL     2,948,991
AUTOMATIC GLASS CUTTING MACHINE
Filed Oct. 22, 1956     24 Sheets-Sheet 7
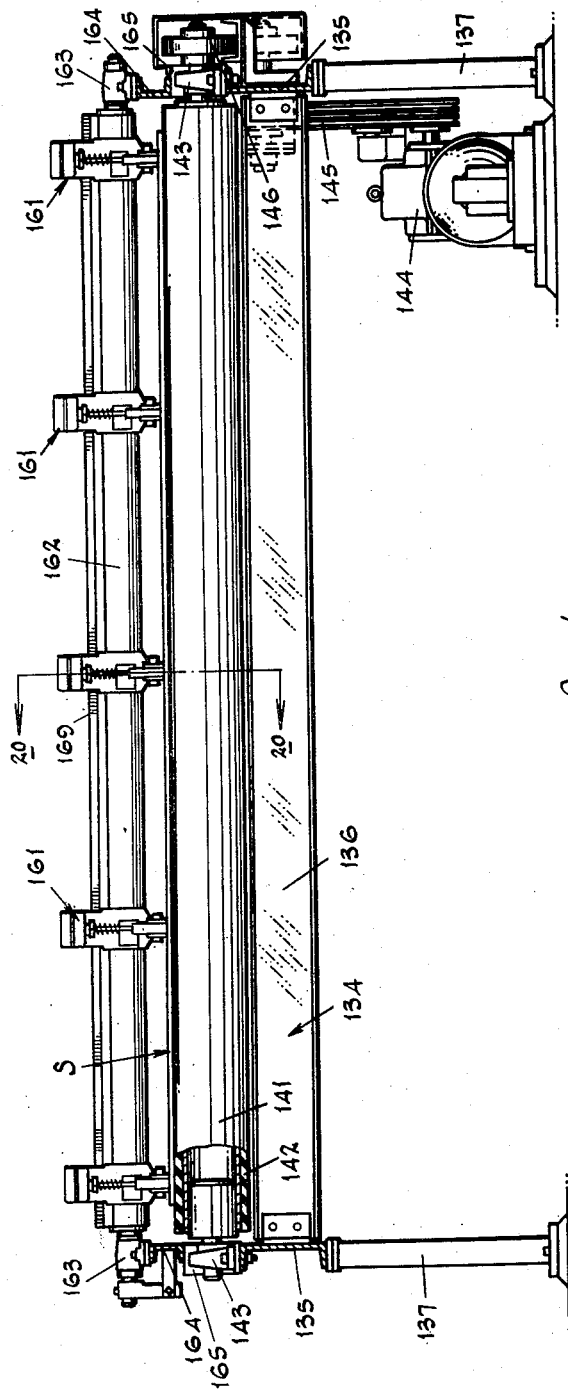
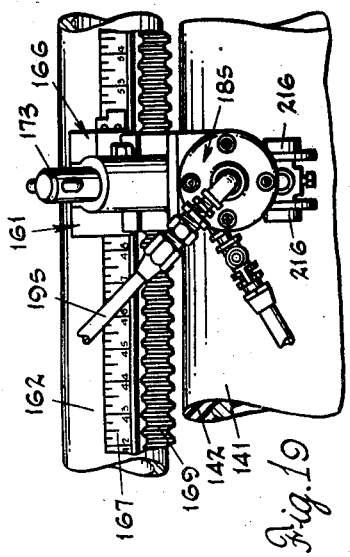
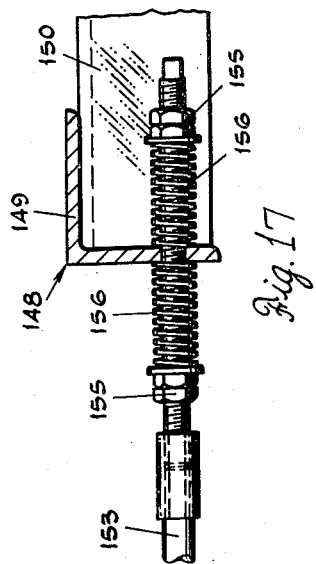
INVENTORS
Emmett L. Walters and
BY Alfred H. Miller
Nobbe & Swope
ATTORNEYS Aug. 16, 1960  E. L. WALTERS ET AL  2,948,991
AUTOMATIC GLASS CUTTING MACHINE
Filed Oct. 22, 1956  24 Sheets-Sheet 8

INVENTORS
Emmett L. Walters and
BY Alfred H. Miller
Nobbe & Swope
ATTORNEYS

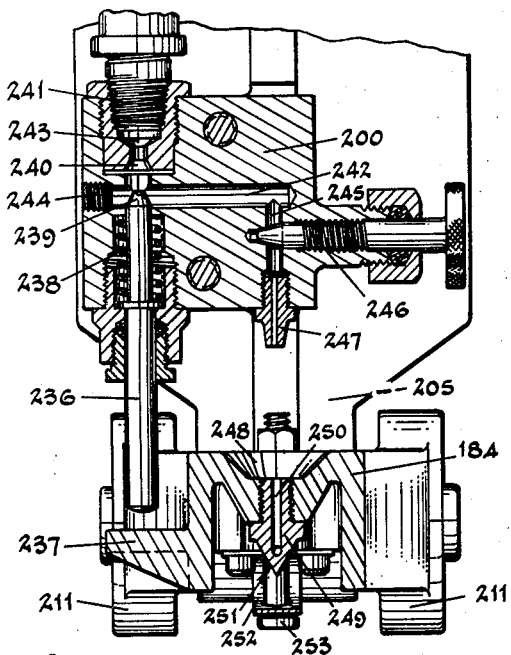
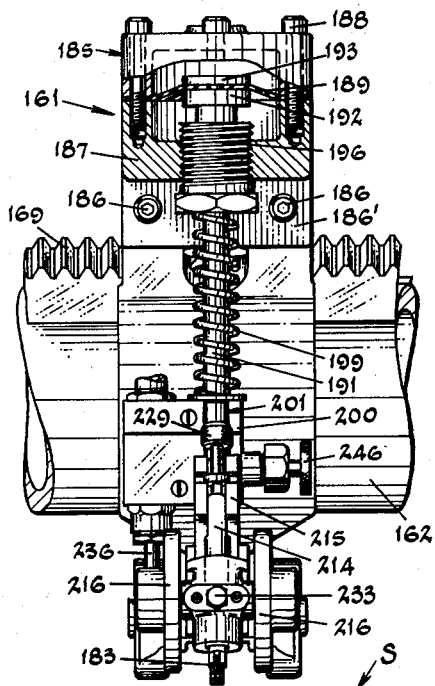
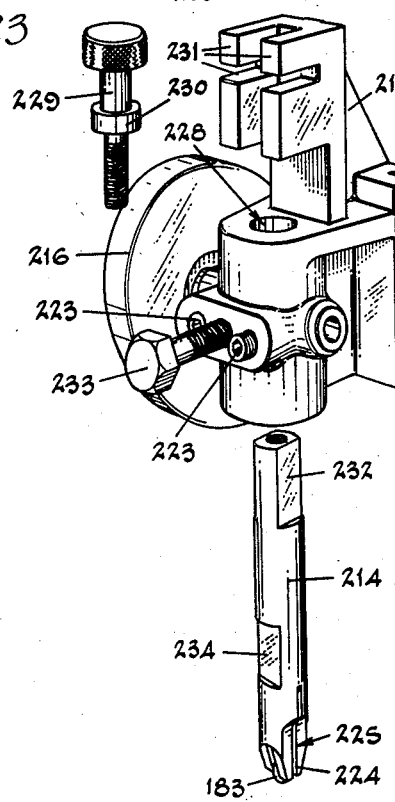

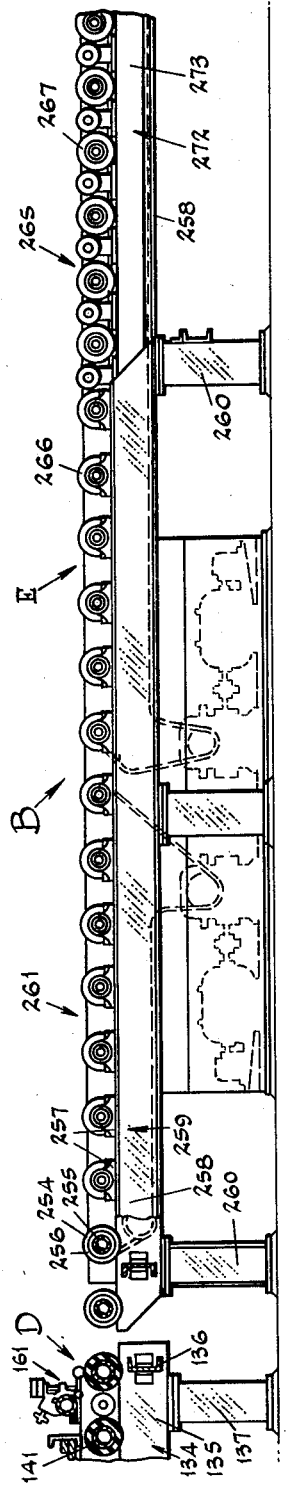

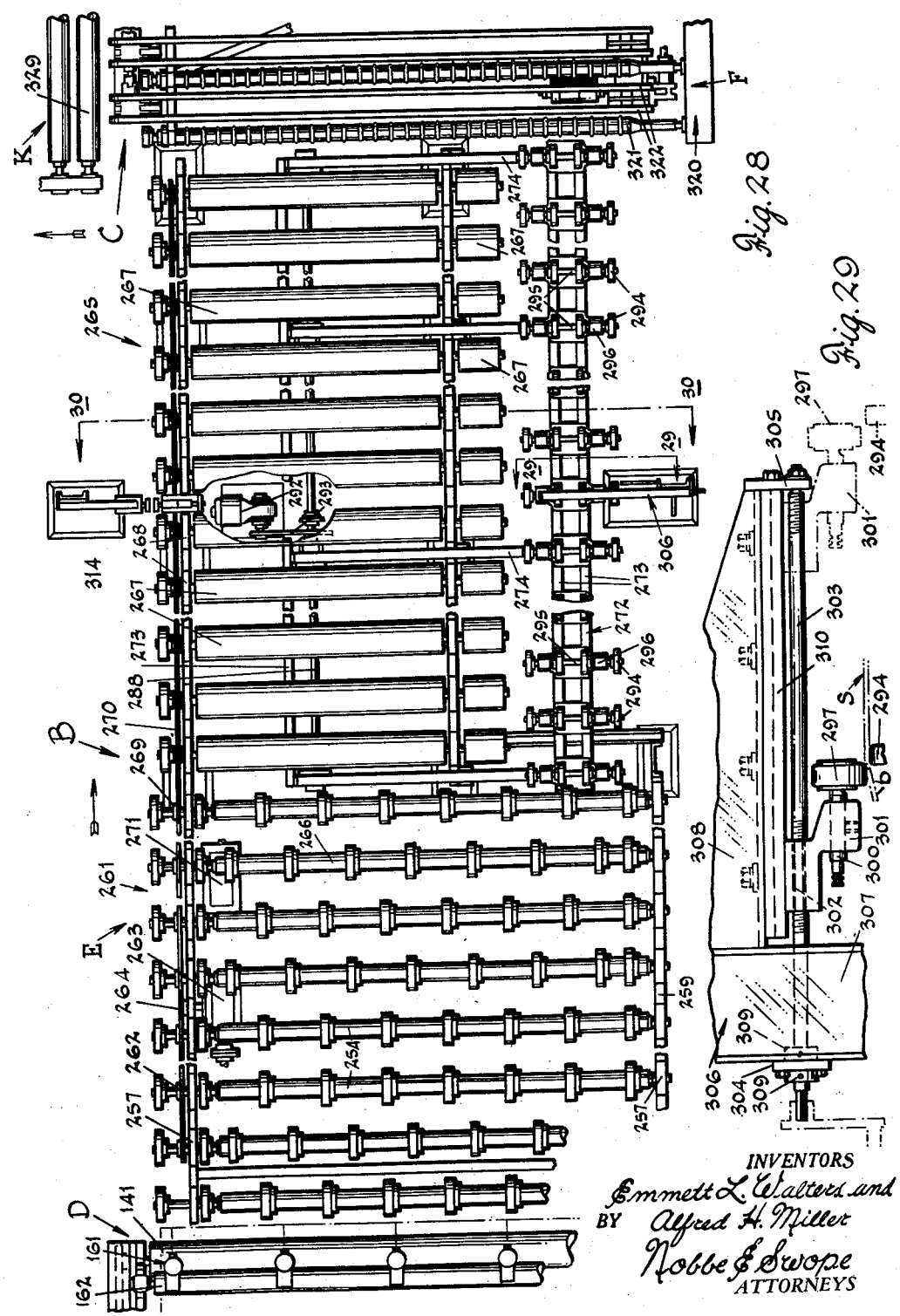

Aug. 16, 1960 E. L. WALTERS ET AL 2,948,991
AUTOMATIC GLASS CUTTING MACHINE
Filed Oct. 22, 1956 24 Sheets-Sheet 12
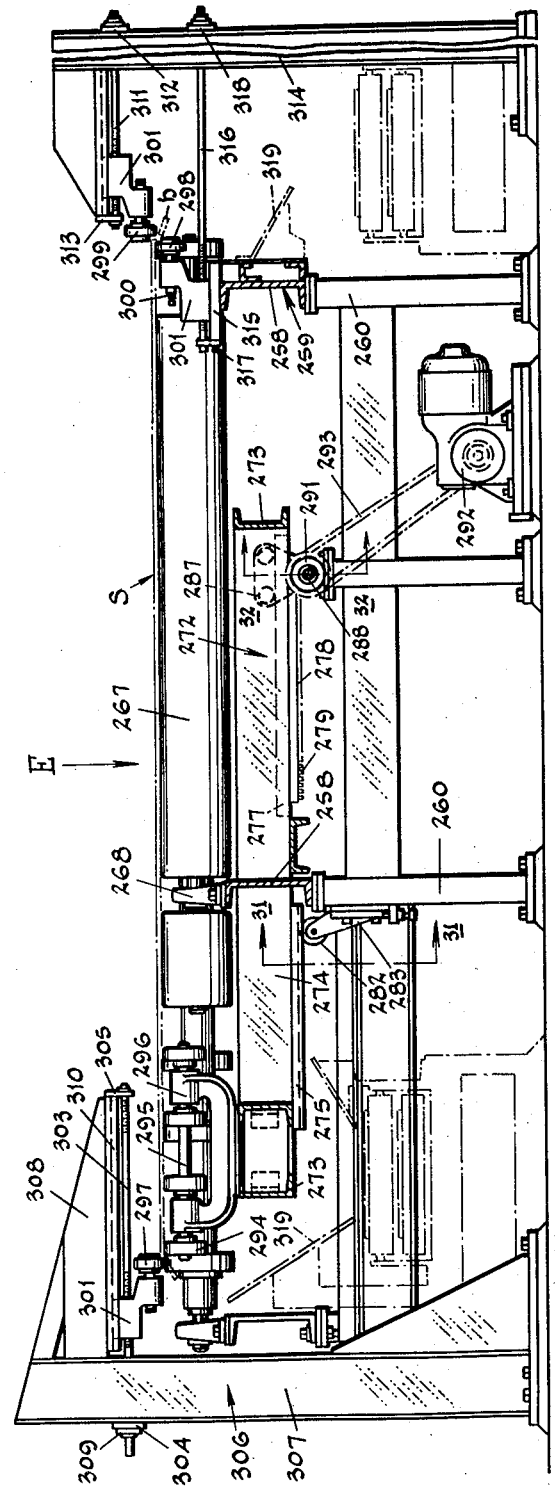
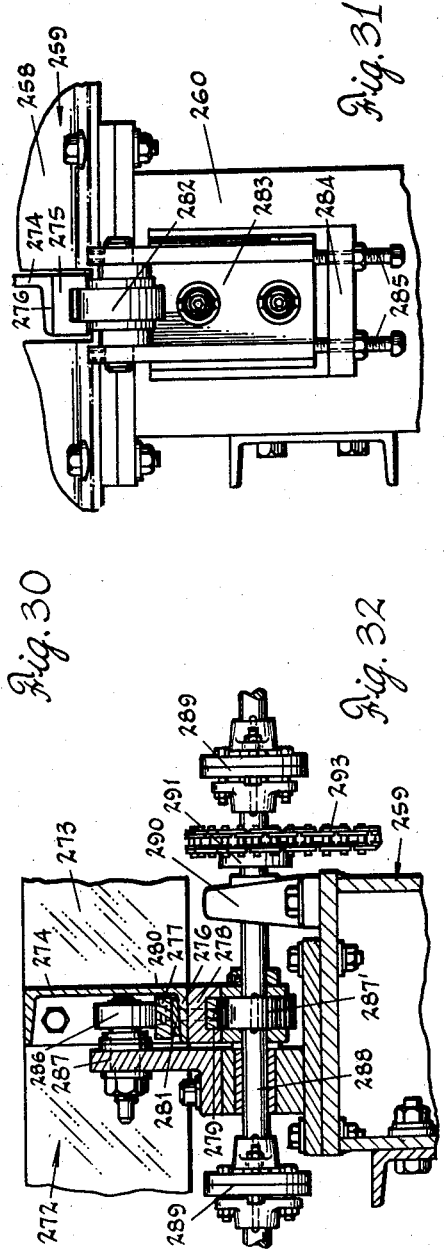
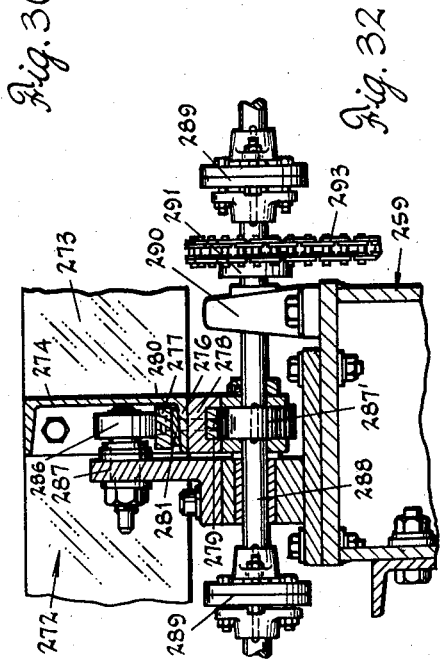
INVENTORS
*Emmett L. Walters and*
BY *Alfred H. Miller*
*Nobbe & Swope*
ATTORNEYS

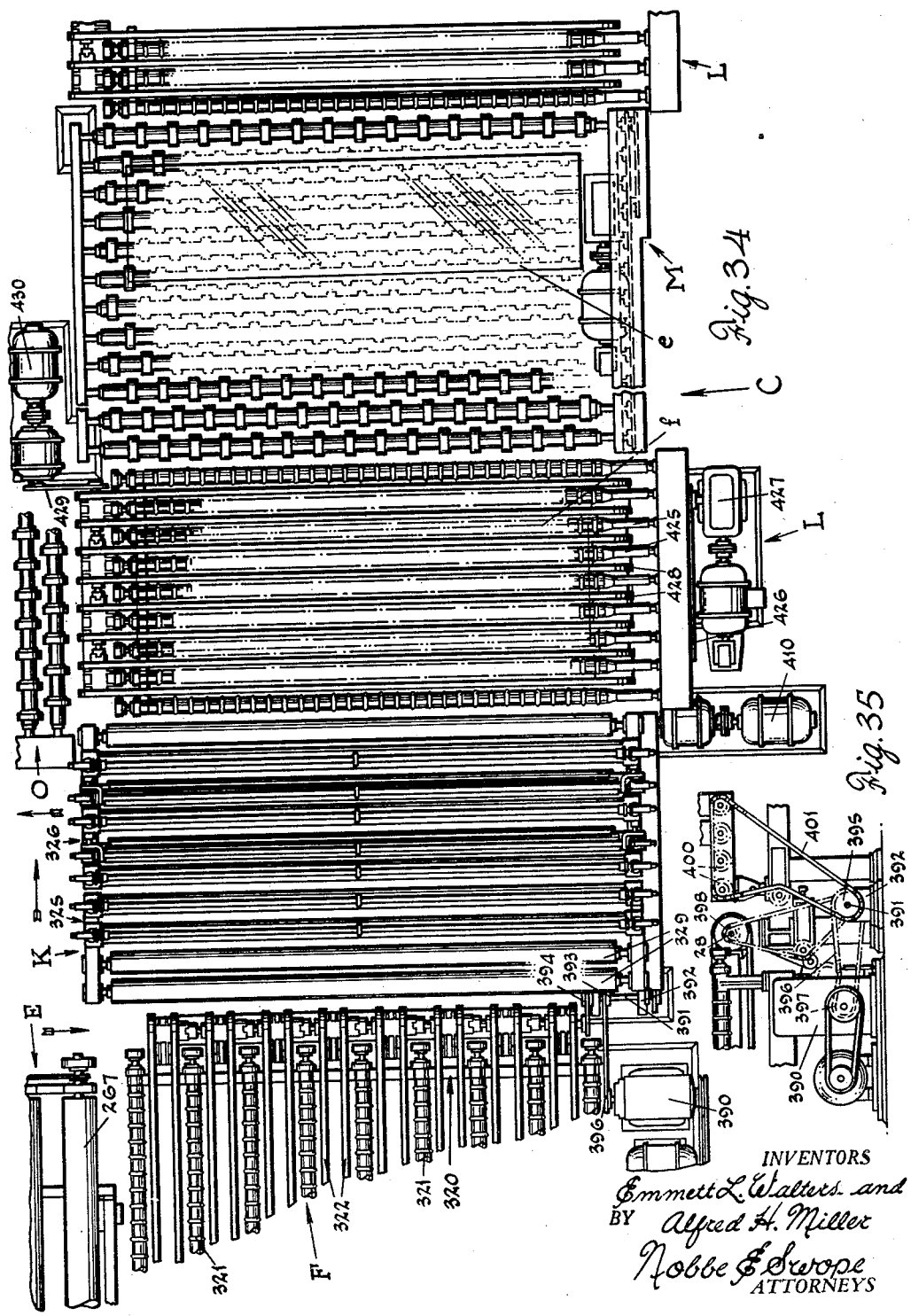

Aug. 16, 1960 E. L. WALTERS ET AL 2,948,991
AUTOMATIC GLASS CUTTING MACHINE
Filed Oct. 22, 1956 24 Sheets-Sheet 14

INVENTORS
Emmett L. Walters and
BY Alfred H. Miller
Nobbe & Swope
ATTORNEYS

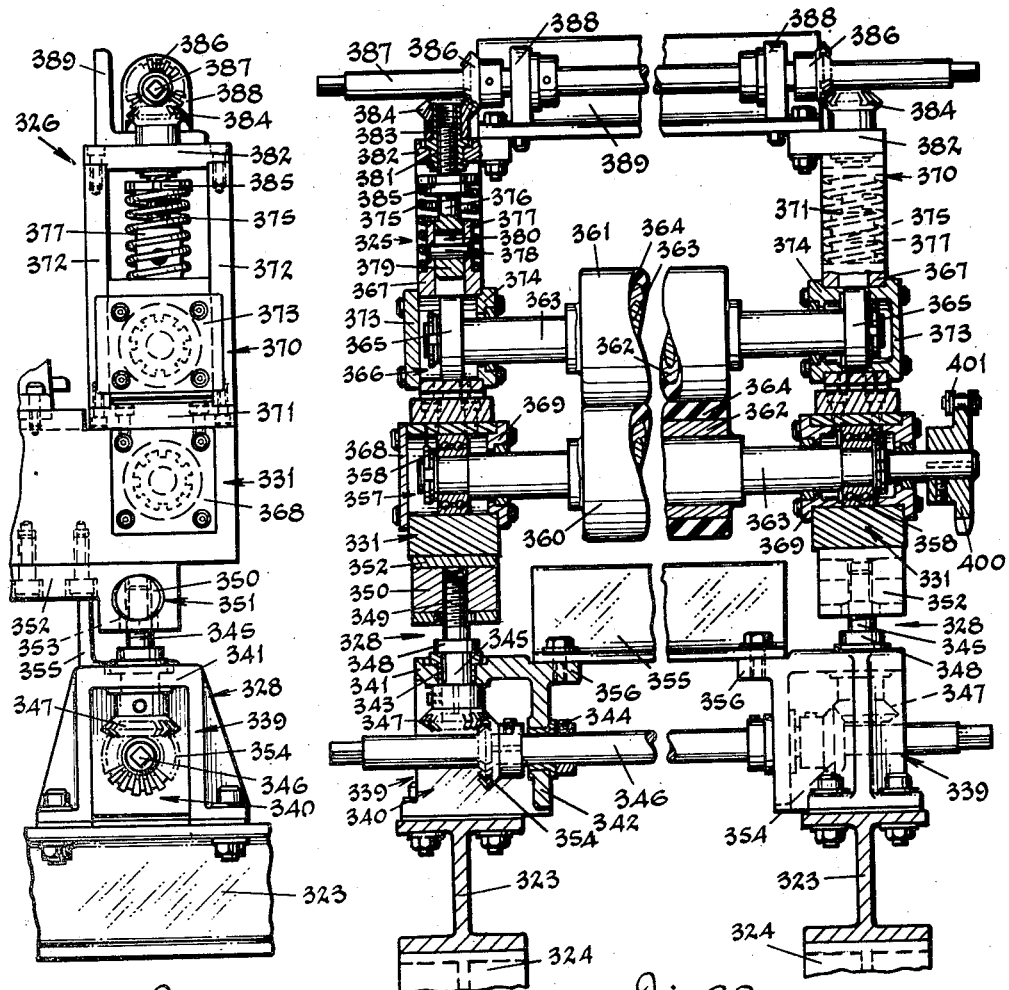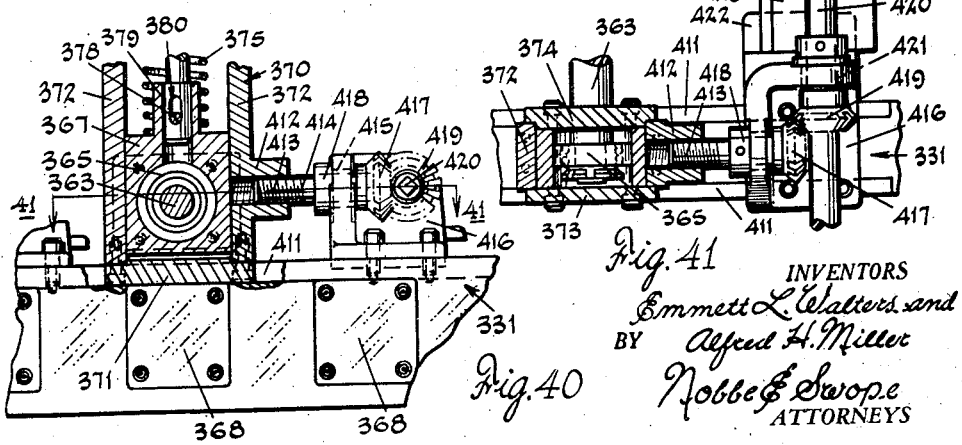

Aug. 16, 1960 E. L. WALTERS ET AL 2,948,991
AUTOMATIC GLASS CUTTING MACHINE
Filed Oct. 22, 1956 24 Sheets-Sheet 16
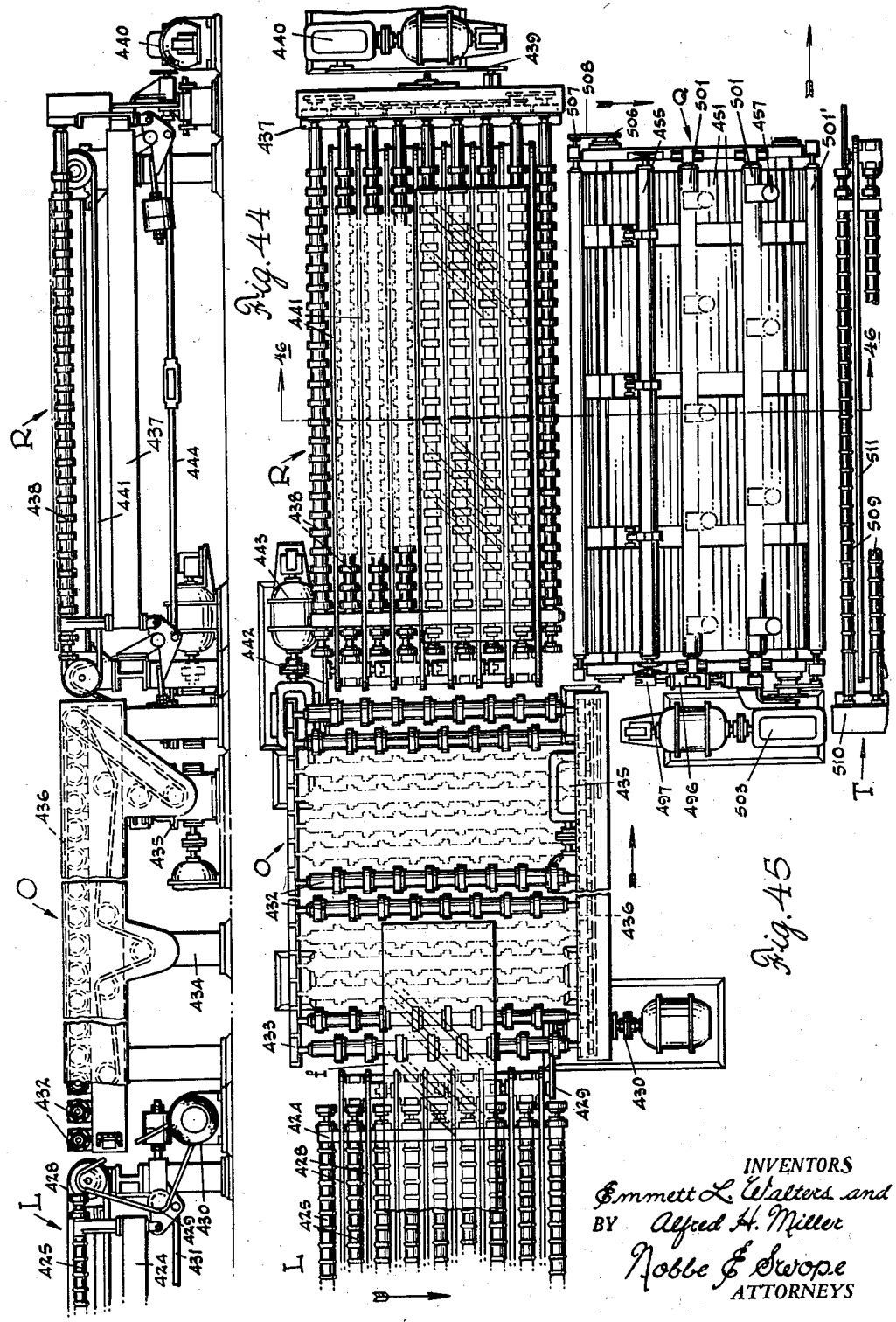
INVENTORS
Emmett L. Walters and
BY Alfred H. Miller
Nobbe & Swope
ATTORNEYS Aug. 16, 1960  E. L. WALTERS ET AL  2,948,991
AUTOMATIC GLASS CUTTING MACHINE
Filed Oct. 22, 1956  24 Sheets-Sheet 18
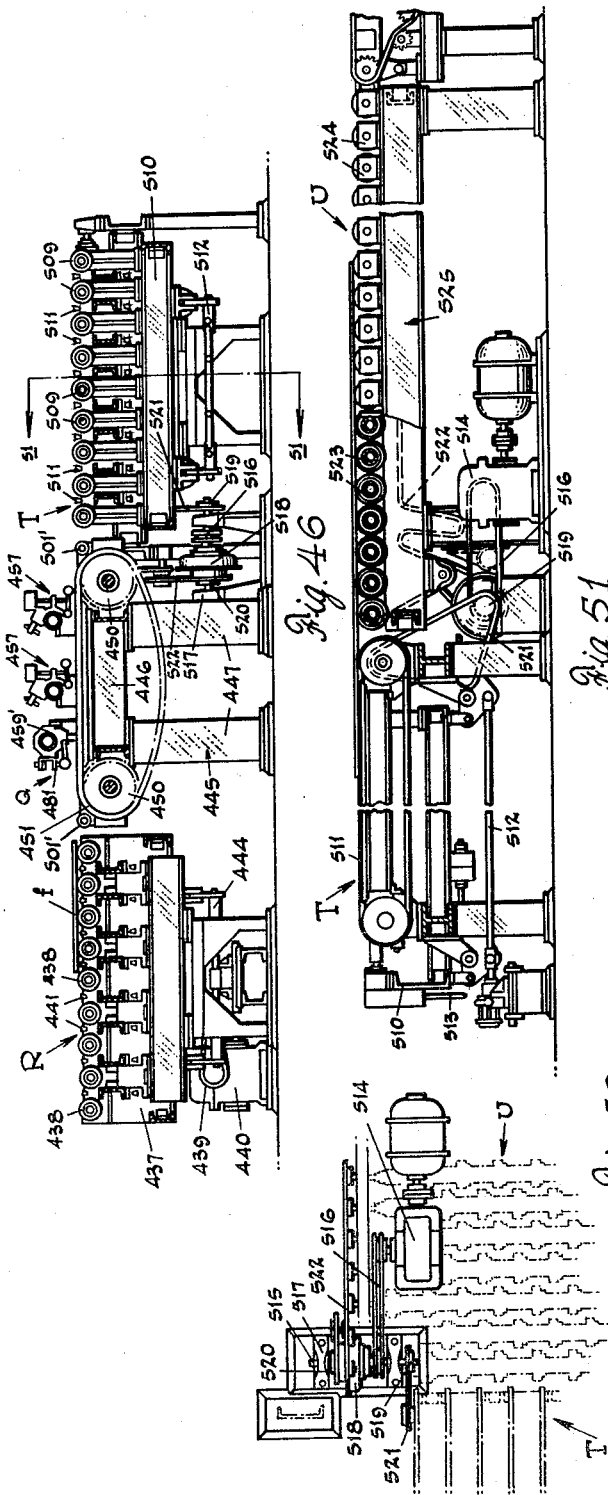
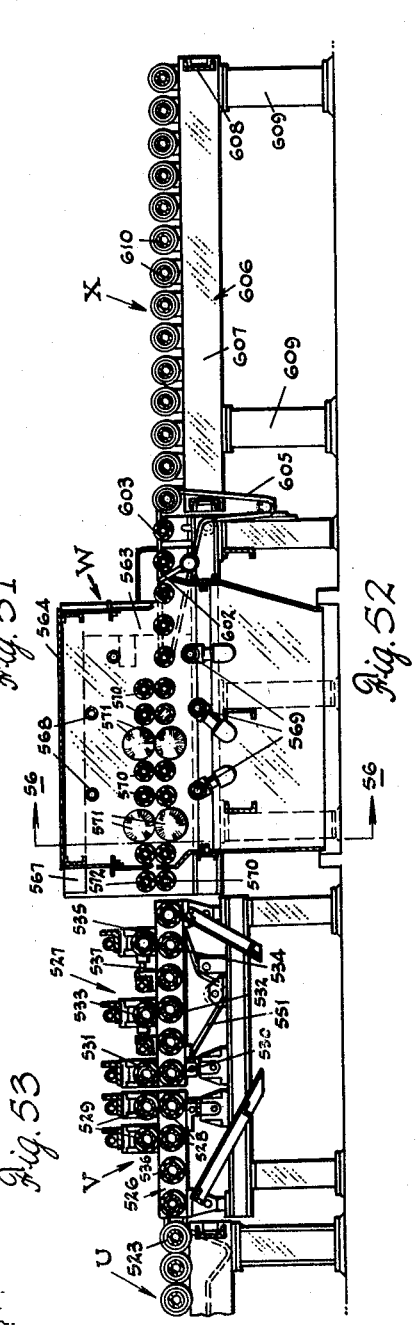
INVENTORS
Emmett L. Walters, and
BY Alfred H. Miller
Nobbe & Swope
ATTORNEYS

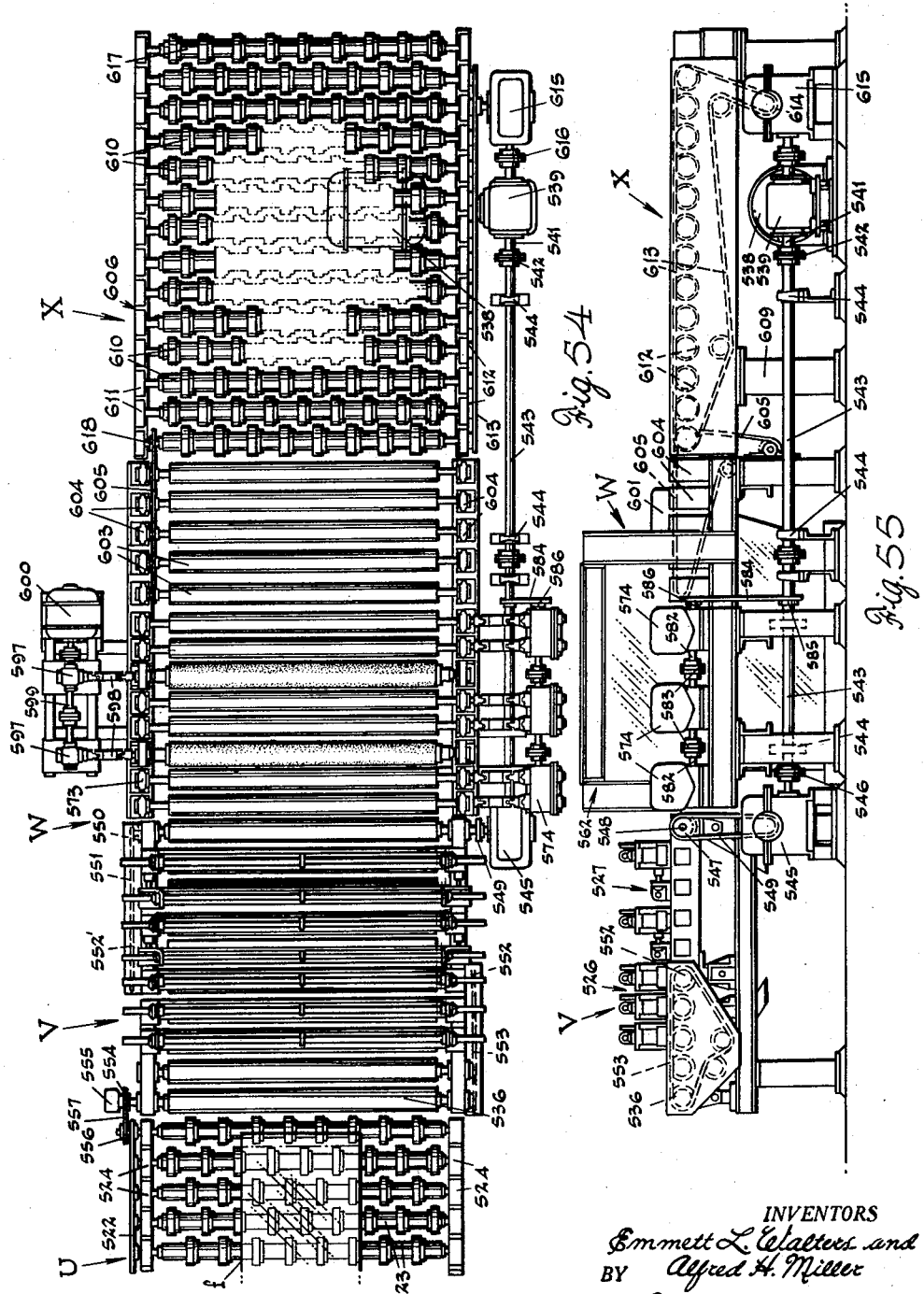

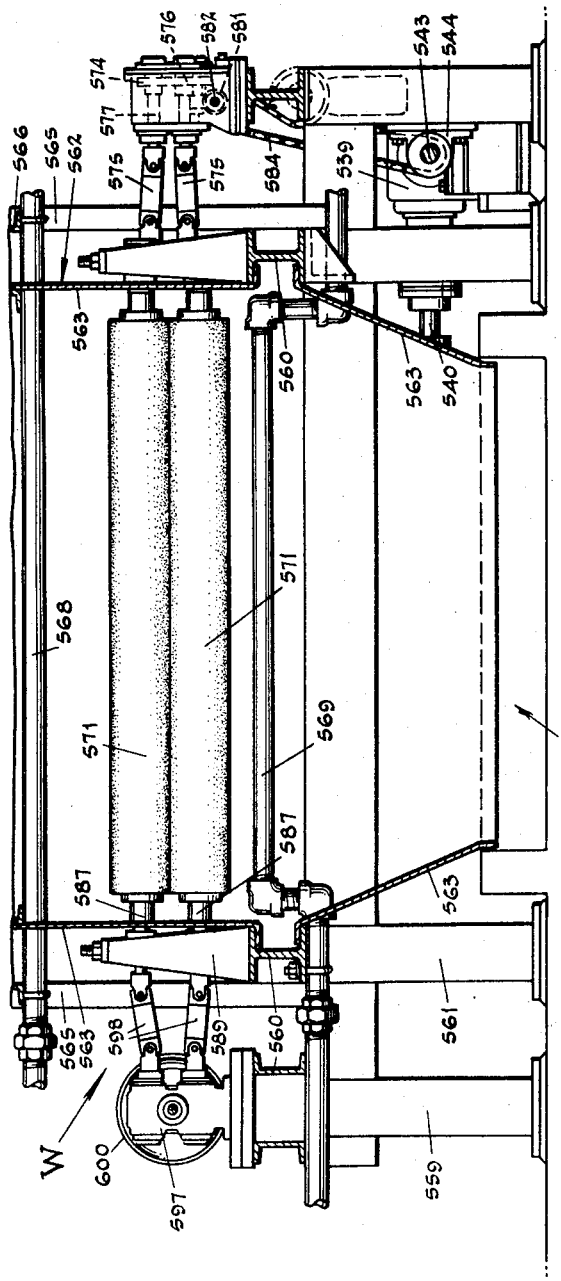
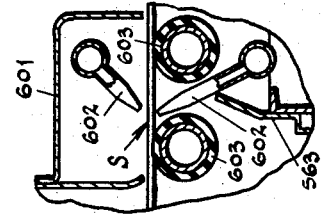
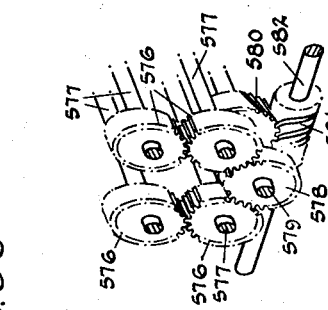
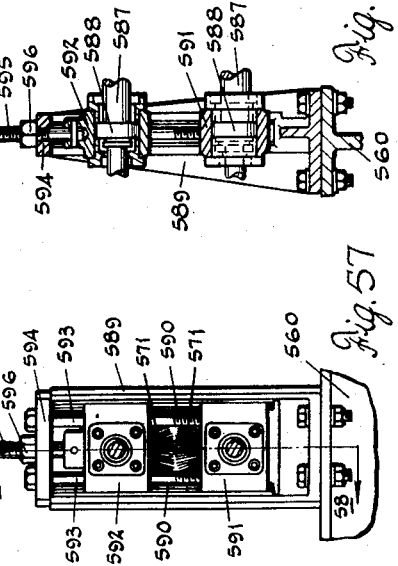

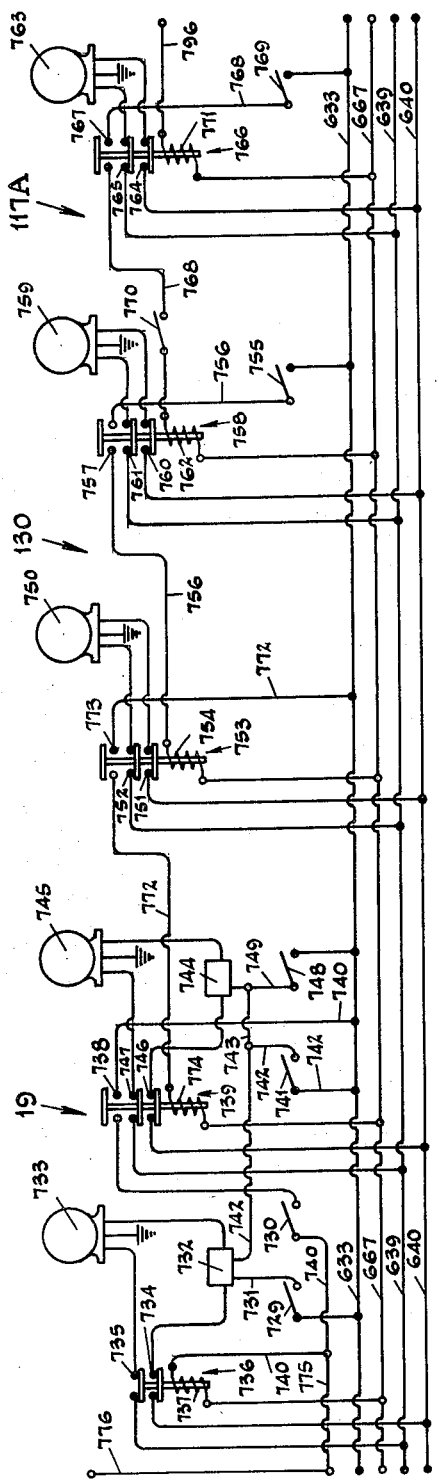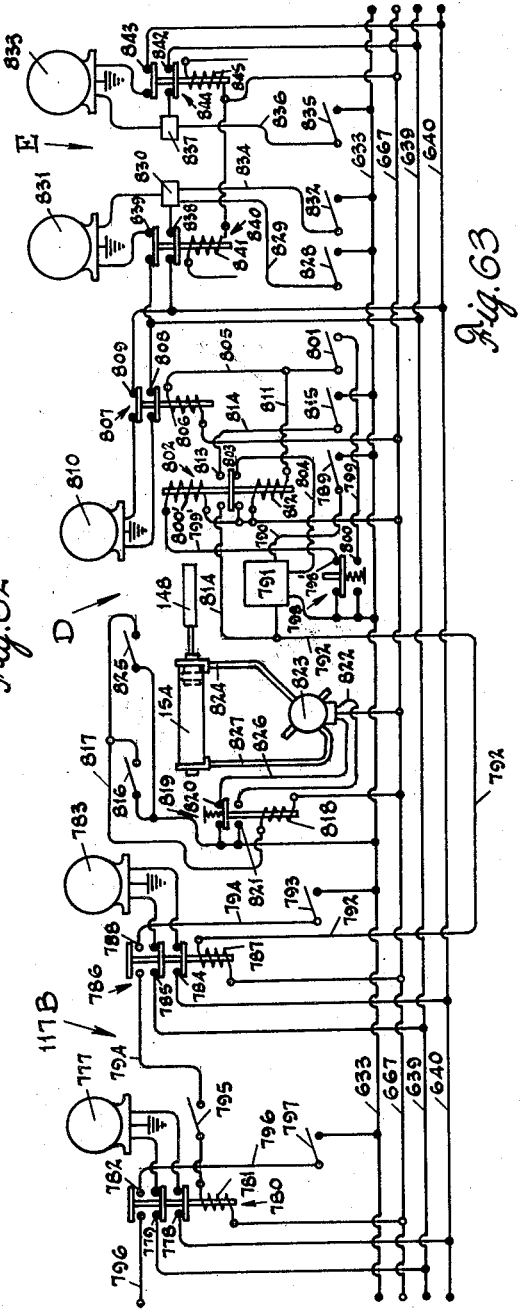

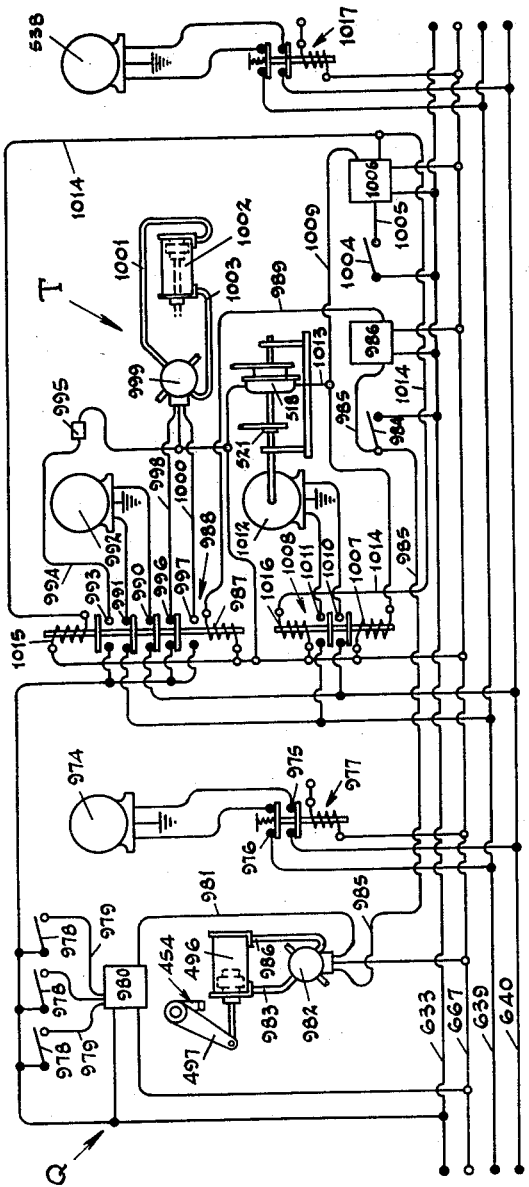

United States Patent Office

2,948,991
Patented Aug. 16, 1960

2,948,991

AUTOMATIC GLASS CUTTING MACHINE

Emmett L. Walters and Alfred H. Miller, Toledo, Ohio, assignors to Libbey-Owens-Ford Glass Company, Toledo, Ohio, a corporation of Ohio Filed Oct. 22, 1956, Ser. No. 617,304

14 Claims. (Cl. 49—48)

This invention relates broadly to cutting apparatus and more particularly to an improved machine for cutting sheets or plates of glass whereby uniformity and trueness of size may be maintained and productivity materially increased.

The machine of the present invention effectively overcomes several existent difficulties in and to the desired productive flow of glass in the manufacture thereof. Heretofore it has been common practice to select, after thorough examination, the reject or undesirable areas of a large pane of glass and to manually score or cut the pane into smaller sizes from the areas surrounding the rejected areas. This has entailed considerable handling, inspecting and sorting of the finally obtained sizes. In some instances, it has been found convenient to individually support glass panes or sheets horizontally on a large cutting table during inspection and thereafter to arrange a plurality of cutters so that substantially uniform sizes might be obtained with a minimum amount of reject glass and upon relative movement between the table and cutters. In any case, however, it has been impossible to materially reduce the time loss involved in the usual methods of handling and cutting glass sheets.

It is therefore the primary object of this invention to provide an improved cutting machine whereby large sheets of glass may be received and cut in a rapid, automatic manner to predetermined finished sizes accurately and uniformly.

Another object of the invention is the provision of a cutting machine embodying a series of interrelated glass cutting and distributing units whereby predetermined sizes of glass panes will be automatically obtained by disposition of the said units to cause movement of the glass or portions thereof in a variety of directions and whereby successive scorings of the glass will be in transverse directions with reference to each other.

Another object of the invention is in the provision of a cutting machine wherein the interrelated units are so located with respect to each other that sheets of large dimension may be periodically introduced into the machine and rapidly moved in regular sequence while the divided portions of preceding sheets are being distributed for substantially simultaneous sub-division.

Another object of the invention is the provision of a cutting machine including a series of interrelated units which effect movement of the glass in regular sequence in a variety of directions whereby the sheet will be subdivided into sheets of a smaller dimension followed by a further sub-division into small panes of the final desired size.

Another object of the invention is the provision of an interlocking control means for the cutting machine by which the glass or any sub-divided portions thereof will initiate or terminate the sequence of its own movement and/or the movement of following sheets or portions thereof.

Another object of the invention is the provision of an interlocking control means by which the glass or any sub-divided part thereof will initiate or terminate the periodic or continuous operation of any or all of the series of interrelated units comprising the cutting machine.

Another object of the invention resides in the provision of a control means for the cutting machine whereby each sub-divided portion of a glass sheet will automatically and sequentially change the course of its movement to produce further sub-division of itself in a transverse direction to the original division and at the same time automatically regulate movement of subsequently positioned sheets of glass or sub-divided parts thereof.

Another object of the invention is in the provision of a general, interlocking cutting machine control system, wherein a glass sheet or subsequently divided portions thereof will progressively select diverging paths of movement to cause distribution of said sub-divided portions for further division in substantially simultaneous actions and while each of the said portions has effective control upon the interlocking elements of said control system to prevent overrunning by another sheet or sub-divided portion thereof.

Another object of the invention is the provision of novel control means for correlating the functions of the interrelated units to produce a progressive movement of the glass through the machine without danger of one sheet overrunning another sheet.

Another object of the invention is the provision of a correlating control means for the several units of the cutting machine whereby the control elements, actuated by the glass sheets, or the divided portions thereof, may create an interlocking, interrupting control for the functions of any or all of the several units so that they will be halted by any of the divided portions of said sheet on any of the several units of the cutting machine or the said control means.

A further object of the invention is to provide a plurality of cutting units for scoring the glass sheet and embodying a control for such cutting units that permits their use individually, or in groups.

A still further object of the invention is the provision of a cutting machine of the above character, embodying various novel and improved features of construction, arrangement and operation, all of which will be more fully described hereinafter.

Other objects and advantages of the invention will become more apparent during the course of the following description when read in connection with the accompanying drawings.

In the drawings wherein the like numerals are employed to designate like parts throughout the same:

Fig. 1 is a general, diagrammatic view of a sheet glass cutting machine as constructed in accordance with this invention;

Fig. 2 is a diagrammatic view of a sheet of glass during its travel through the cutting machine and the division thereof into smaller sized panes;

Fig. 3 is a plan view of the first delivery and transfer section of the cutting machine;

Fig. 4 is a side elevational view of the entry end of the first delivery and transfer section;

Fig. 5 is a similar side elevational view which is a continuation of the delivery section illustrated in Fig. 4;

Fig. 6 is a side elevational view of a sheet glass transfer unit as viewed on line 6—6 of Fig. 4;

Fig. 7 is a cross-sectional detail view through the transfer unit and as taken on line 7—7 of Fig. 6;

Fig. 8 is an end elevational view of the transfer unit;

Fig. 9 is a fragmentary plan view of the end of the transfer unit of Fig. 8;

Fig. 10 is a vertical, transverse cross-sectional view as taken on line 10—10 of Fig. 9;

Fig. 11 is a cross-sectional detail view as taken on line 11—11 of Fig. 10;

Fig. 12 is a longitudinal cross-sectional view of the main delivery section of the cutting machine as taken on line 12—12 of Fig. 1;

Fig. 13 is a similar longitudinal cross-sectional view of the main delivery section which is a continuation of the machine section shown in Fig. 12, and as taken on line 13—13 of Fig. 1;

Fig. 14 is a longitudinal vertical cross-sectional view of the primary squaring and scoring unit and as taken on line 14—14 of Fig. 1;

Fig. 15 is a plan view of the squaring and scoring unit of Fig. 14;

Fig. 16 is a transverse, vertical cross-sectional view through the squaring section of the unit and as taken on line 16—16 of Fig. 15;

Fig. 17 is a fragmentary detail view of a part of the squaring mechanism;

Fig. 18 is a transverse, vertical cross-sectional view through the scoring section of the unit shown in Fig. 15 and is taken on line 18—18 of that figure;

Fig. 19 is a fragmentary plan view of a scoring head and its manner of support in the scoring unit;

Fig. 23 is a vertical cross-sectional view of the scoring head as taken on line 23—23 of Fig. 20;

Fig. 24 is a front elevation view of the scoring head;

Fig. 25 is an exploded perspective view of a disassembled cutter wheel carriage and component parts;

Fig. 26 is a side elevational view of a glass sheet trimming unit as taken on line 26—26 of Fig. 1;

Fig. 27 is a side elevational view which is a continuation of the machine section shown in Fig. 26 and as taken on line 27—27 of Fig. 1;

Fig. 28 is a plan view of the glass sheet trimming unit of Figs. 26 and 27;

Fig. 29 is a detail sectional view of edge trimming rolls as taken on line 29—29 of Fig. 28;

Fig. 30 is a transverse vertical cross-sectional view of the trimming unit as taken on line 30—30 of Fig. 28;

Fig. 31 is a detail view of a support structure for the movable section of Fig. 30 and as taken on line 31—31 of that figure;

Fig. 32 is a detail view of an adjustably movable section of the trimming unit as taken on line 32—32 of Fig. 30;

Fig. 33 is a longitudinal vertical cross-sectional view of the distributing section of the cutting machine and as taken on line 33—33 of Fig. 1;

Fig. 34 is a plan view of machine units illustrated in Fig. 33. This view shows a transfer unit, breaker unit and continuing transfer and conveyor units;

Fig. 35 is a fragmentary side elevational view of the source of power for the transfer and breaker units shown in Fig. 34;

Fig. 38 is a transverse vertical cross-sectional view of the breaker unit as taken on line 38—38 of Fig. 33;

Fig. 39 is a fragmentary side elevational view of the machine structure shown in Fig. 36;

Fig. 40 is a cross-sectional detail view of a portion of the breaker unit;

Fig. 41 is a horizontal sectional view as taken on line 41—41 of Fig. 40;

Fig. 44 is a side elevational view of transfer and conveyor sections in the distributing unit of the cutting machine. This figure is taken on line 44—44 of Fig. 1;

Fig. 45 is a plan view of the transfer and conveyor sections in Fig. 44 and includes the secondary scoring unit;

Fig. 46 is a vertical section of the scoring unit and the interrelated transfer sections as taken on line 46—46 of Fig. 45;

Fig. 51 is a vertical longitudinal view of the transfer and conveyor sections to the secondary breaking and washing units. This figure is taken on line 51—51 of Fig. 1;

Fig. 52 is a similar vertical view which is a continuation of the cutting machine sections shown in Fig. 51;

Fig. 53 is a fragmentary plan view of the transfer and conveyor sections of Fig. 51 and particularly illustrates the power source therefor;

Fig. 54 is a plan view of the cutting machine sections shown in Fig. 52;

Fig. 55 is a side elevational view of the machine sections of Fig. 54 and particularly illustrates the interrelated source of power;

Fig. 56 is a vertical transverse sectional view of the washing unit and as taken on line 56—56 of Fig. 52;

Fig. 57 is a fragmentary elevational view of the supporting structure for the washing brushes;

Fig. 58 is a vertical cross-sectional view as taken on line 58—58 of Fig. 57;

Fig. 59 is a fragmentary perspective view of one driving mechanism for the washing unit;

Fig. 60 is a detail cross-sectional view of the air drying area of the washing unit;

Fig. 62 is a diagrammatic view of the control circuits in the main delivery section;

Fig. 63 is a similar diagrammatic view of control circuits in the main squaring and scoring unit of the machine;

Fig. 65 is a further diagrammatic view of control circuits for the secondary scoring unit and the last transfer unit of the machine.

Figure 20:
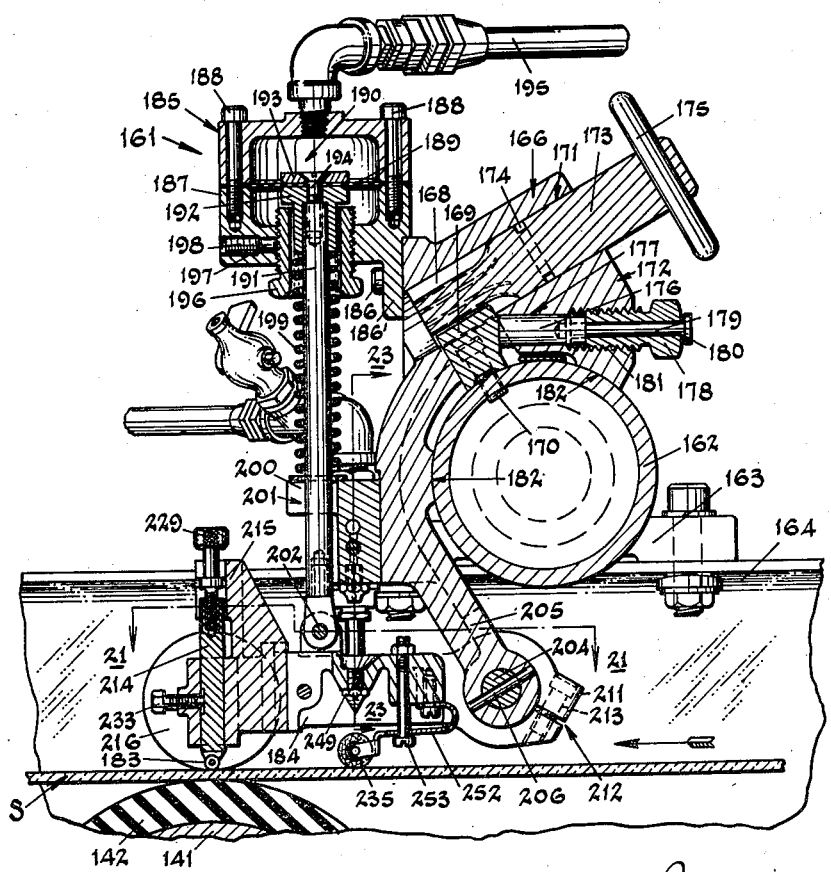
Fig. 20 is a transverse cross-sectional view of a glass sheet scoring head as taken on line 20—20 of Fig. 18.
Figure 21:
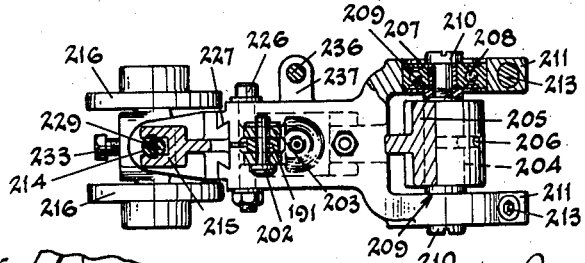
Fig. 21 is a horizontal cross-sectional view of the scoring head as taken on line 21—21 of Fig. 20.
Figure 22:
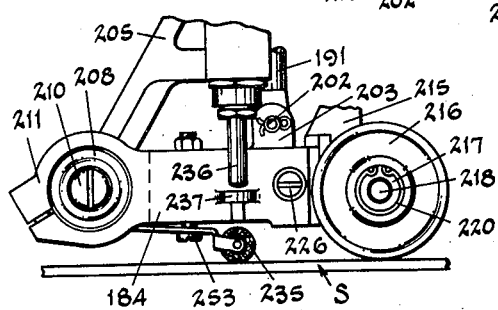
Fig. 22 is a side elevation view of the lower part of the scoring head when viewed in the opposite direction from Fig. 20.

With more particular reference now to the drawings, there is illustrated in Fig. 1 a substantially diagrammatic view of the entire machine including the several distributing, cutting and breaking units. Since the various units, comprising the machine, function to produce different, though interrelated operations, it is believed that a general, broad outline of the operation of the machine will greatly aid in the understanding of the unit functions and their relationship when considered individually and/or in sequence. The complete machine is composed of an initial delivery section A, a main delivery section B and a distributing section C.

The sequence of sheet glass movement, upon entry in the machine, is into and through the initial delivery section A; into and along the main delivery section B to a primary scoring unit D wherein a large pane or sheet or glass, to be sub-divided, is received, squared, scored longitudinally and then moved to an edge breaker or trimming unit E; the trimming unit E receiving the sheet of glass S and removing the salvage marginal edges therefrom before the sheet is carried onto a transfer unit F of the distributing section C. From the distributing section C, the sub-divided sheet is conveyed into units wherein further division is accomplished.

The initial and main delivery sections A and B, respectively, will be seen to be arranged substantially in the form of a T with the section B leading outwardly from section A at substantially a midway position while provision is made to carry glass sheets beyond the area leading to section B in order that the sheets can be bodily removed from the machine before being divided into smaller sized panes or lites. The initial section A thus includes a transfer unit G onto which a large sheet of glass will be received from paths of previous movement; a transfer unit H which is adapted to receive the sheet as it is traveling in one path of movement in the section A and to deliver the same to the main delivery section B in a line of movement at substantially right angles thereto, and a belt conveyor unit J onto which a sheet can be received in the event that it is not to be sub-divided. A plan view of this portion of the machine may be seen in Fig. 3.

A sheet of glass, however, which has been carried along the delivery section B and scored in unit D is moved through the trimming unit E and then received on the transfer unit F of the distributing section C wherein it is carried in several divided parts for further scoring and breaking into small panes. The distributing section C accordingly includes, as may be seen in Figs. 1 and 34 and in addition to the unit F, a breaking unit K, a number of alternately arranged transfer units L, conveyor units M located therebetween and a salvage conveyor unit N. When received on the transfer unit F, the score lines provided in the glass sheet on unit D extend longitudinally of its path of movement and, as the motion of the sheet is directed to a path at substantially right angles in unit F, the score lines will then extend transversely or cross-wise to its line of movement when the object is carried into and through breaking unit K.

The sheet S, which is illustrated in Fig. 2 as a conventional full or large rectangular blank, is thus scored as at $a$ and initially broken or trimmed along its longitudinally disposed marginal edges as at $b$ to determine a precise width of the sheet S and is then broken along score lines $a$ into a plurality of transverse strips $c$, $d$, $e$ and $f$ having a much greater length than width. The width of these strips is determined and produced by the arrangement of the cutting devices in the primary scoring unit D. Upon emerging from the breaking unit K, the plurality of glass strips are carried forwardly through the distributing section C wherein the strips are, by their passage over suitable switch controls, caused to again change the line of their movement.

In the event of breakage of the glass, which renders further distribution thereof inadvisable, the said switch controls may be placed temporarily in an inactive condition in order that the broken portions of the sheet may be carried through the distributing section C and discharged onto the salvage conveyor unit N.

During the regular production of the machine, however, the plurality of glass strips, $c$, $d$, $e$ and $f$ are carried to designated locations along the section C and upon arriving at such locations are automatically transferred at substantially right angles to their line of travel through section C, onto conveyor units, generally indicated at O and P, which transfer the glass strips to secondary scoring units, generally indicated at Q (Figs. 1 and 45). To achieve the most effective positioning of the secondary scoring units Q, they are disposed in parallelism with the distributing unit C and it will be seen that the alternately disposed conveyor units P are shorter than the conveyor units O running to more outwardly disposed scoring units Q which are located parallel to the inner scoring units Q and distributing unit C.

As contemplated by the invention and to be more fully hereinafter described for purposes of illustration, four strips $c$, $d$, $e$, and $f$ of greatly decreased width will be obtained upon passage of the scored sheets through the breaker unit K. The individual strips are received in the distributing section C wherein they cause a sequential actuation of control members to again change their line of movement in a transverse direction. This change of movement is produced periodically at designated locations within the section C so that the strip $c$ will be carried to a location, indicated at $g$, and then shifted transversely to the right onto the last conveyor P. Likewise, the strip $d$ is stopped at the location, indicated at $h$, and then shifted transversely to the right onto the alternate or second conveyor O. Similarly, the strips $e$ and $f$ are stopped at locations $j$ and $k$ and moved transversely to the right, respectively, onto the first and second conveyor O and P respectively.

Accordingly, the strips $c$, $d$, $e$ and $f$ will travel from the machine distributing section C to the right, as viewed in Fig. 1, and onto the alternate long and short conveyor units O and P at the ends of which are located transfer units R. The transfer units R operate to direct the respective strips of the sheet into a line of movement at substantially right angles to the line of movement on the related conveyor units O and P. The strips of glass $e$ and $f$ will thus be directed along similar paths of movement indicated by the arrows $m$ (Fig. 2) and will be scored and then broken as at $n$ to produce their final length and/or size of sheet as at $o$.

Likewise the strips $c$ and $d$ in following generally similar paths of movement can be scored as at $p$ to produce several panes $r$ of still smaller dimension. The individual strips are thus transferred to their respective secondary scoring units Q from which they are removed and received on transfer units T. These transfer units with conveyors U are arranged in parallel with the conveyor units O and P and are adapted to carry the strips into breaker units V wherein they are broken along their secondary scored lines; washed as at W and then received as smaller dimensioned panes or lites of glass $o$ and $r$ to be manually removed for inspection and packing at the conveyors X. It is now believed apparent that, by the arrangement of the scoring heads in the primary scoring unit D and the several secondary scoring units Q, any desired size of glass sheet can be obtained and that the approximate sizes diagrammatically shown in Fig. 2 are only to be considered as explanatory.

Although no showing has been made in the drawings, it has been found of great advantage to provide a series of platforms or catwalks across the major frame sections of the machine for rapid access by operators to any particular unit or for convenient inspection and occasional adjustment of and to the various units.

The initial delivery section

As illustrated particularly in Figs. 1, 3 and 4 of the drawings, a glass sheet S to be cut is introduced into the receiving end of the cutting machine when it is directly conveyed onto the transfer unit G which constitutes the first member of the initial delivery section A. This unit comprises a fixed framework 10 and a vertically movable frame 11 which, in the present instance, is normally supported in a lowermost position. As will be more clearly set forth in detail, there is provided on the fixed framework 10 a continuously moving surface by means of a plurality of belts 12 on whose upper flights 13 (Fig.

7) the glass sheet S is received into the machine along one direction of movement as indicated by the arrow 14. When suitably located in substantially the central area of the unit G, the sheet, by means of suitable controls to be hereinafter more fully described, automatically causes the movable frame 11 to rise and by means of driven rolls 15, journaled thereon, lift said sheet (Fig. 7) from the belts 12 and carry it in a line of movement, indicated by arrow 16 (Fig. 3), substantially at right angles to its former movement. The sheet is thus removed laterally from the transfer unit G and is received on a conveyor unit 17 equipped with continuously driven rolls 18. In turn, the conveyor unit 17 passes the glass sheet onto the transfer unit H from which it is moved to the first conveyor unit 19 of the main delivery section B or to the belt conveyor unit J from which the sheet can be removed for storage.

Since the sheet is moving in the direction of arrow 16 when entering the transfer unit H, it is received on the rolls 15 carried by the movable frame 11 thereof which frame is then in its uppermost position. By means of suitable switch controls which the sheet activates in the central area of unit H, the movable frame 11 thereof is caused to descend and transfer the sheet from the rolls to the plurality of belts 12 of the fixed frame 10 which belts are traveling in the direction of arrow 20 (Fig. 3). Successively received glass sheets will thus be removed from the transfer unit H of the initial delivery section A to the conveyor unit 19 of delivery section B in automatically occurring sequences of operation; or, in the event that they are to be passed to the conveyor unit J, the automatic controls of unit H are rendered temporarily inoperative and the sheets are carried from the conveyor unit 17 to conveyor unit J on the rolls 15 of the movable frame 11 which remains in its elevated position. Also in the event of cracked or partially broken sheets entering the delivery section A, the same are directly moved to conveyor unit J and without being transferred to main delivery section B.

From the above description it is believed quite apparent that transfer units G and H are substantially of the same construction, and that a detailed description of one will suffice for both. Thus, upon examination of Figs. 3 to 11, inclusive, it will be seen that the fixed framework 10 comprises a belt supporting framework 21 formed of horizontally disposed beams 22 that are carried at the upper ends of the vertically disposed standards 23. The beams 22 are interconnected by means of channels 24 that are mounted at one of their ends on bearing housings 25 (Fig. 6) and at their other end on the brackets 26 of belt tensioning devices 27.

Journaled within each of the bearing housings 25 are stub shafts 28 for belt sheaves 29. Shafts 28 are interjoined by couplings 30 whereby the entirety of shafts 28 and sheaves 29 can be driven from a common means such as the gear-reduction unit 31. For this purpose, a sprocket 32 on the adjacent outermost shaft 28 is coupled to a drive sprocket 33 by the sprocket chain 34. Typically, the tension of sprocket chain 34 can be adjusted by means of an idler 35 the shaft of which is journaled on the movable slide of a bracket 36 (Fig. 6).

Each of fixed brackets 26 (Figs. 9 to 11 inclusive) comprises a base 37 mounted on a beam 22 and having an inwardly directed pedestal 38, on which the adjoining ends of channels 24 are mounted. Each base 37 has a pair of slideways 39 formed on its upper surface. As shown in Fig. 11, a slide-block 40 carrying fixed shaft 41 is received in each of the ways 39. Each slide-block is adapted to be moved along its respective way 39 by means of an adjusting screw 42 that is threadably received in said slide-block. The screw 42 is rotatably supported by means of a plate 43 attached to the base 37 and has a squared outer end 44 for convenience of tool engagement. A sheave 45 is mounted on each shaft 41 by means of a bearing 46 that is conventionally retained in its interrelation between the shaft and the sheave by a cap plate 47.

The belts 12, which are trained about the sheaves 29 at one end and sheaves 45 at the other, will thus be driven by sheaves 29 and adjustably maintained in tension by the slide-blocks 40 on which the sheaves 45 generally are mounted. In order that the belts will adequately support large glass sheets which will vary in weight from 120 to 250 pounds or more, depending on dimensional size and thickness, the upper flight 13 traverses a grooved rail 48 that is affixed to the upper surface of each channel 24 (Figs. 7 and 10). Also, if desired, the gear unit 31 by which the belts 12 are operated may be equipped with a suitable magnetic brake 49 to halt the same in the event that movement of the glass sheet is to temporarily be interrupted.

Referring now to Figs. 3 and 6, it will be seen that movable frame 11 comprises channels 50 and 51 which are interjoined by channels 52 located therebetween. The channel 50 is located adjacent bearing housings 25 and between beams 22 while channel 51 is located adjacent brackets 26 and outwardly of the adjacent beam 22. The frame 11 bodily is carried by fulcrum plates 53 that are pivotally supported on rods 54; the ends of which are fixedly mounted in brackets 55 attached to the beams 22. The plates 53 are pivotally joined to the frame channels 50 and 51 at their ends by means of rods 56, the ends of which are mounted in bifurcated brackets 57 carried by said channels. Best seen in Figs. 3, 6 and 8, the fulcrum plates 53 are interconnected by a linkage arrangement 58 whereby the frame 11 will be raised or lowered and at each of its corners. This linkage includes side rods 59, end rods 60 and 61 and diagonally disposed bracing rods 62 extending between rods 60 and 61. The linkage generally is caused to swingably actuate the fulcrum plates and thus raise frame 11 by means of a cylinder 63. In order to counter-balance the mass of the movable frame 11, each of the fulcrum plates 53 is equipped with a threaded shaft 64 (Fig. 6) on which is mounted a weight 65 that is adjustably positioned by means of nuts 66.

More particularly, each end of rods 60 and 61 carries a T-connector 67 into which one end of the side rods 59 is attached. The connectors 67 are adapted to receive a threaded axle bolt 68 which is passed through the respective fulcrum plate 53. Also the rod 61 will be seen in Figs. 5 and 6 to actually comprise two short sections which are joined at their opposed ends by a coupler 69 which as well carries the adjacent ends of bracing rods 62 and is connected to the piston rod 70 of cylinder 63. When the cylinder is operated to move the linkage 58 in the direction of arrow 71 (Fig. 6), the plates 53 will be swung on rods 54 and will elevate the frame 11, the counterweights 65 being swung downwardly to compensate for the weight of the frame as it moves upwardly.

Each of the rolls 15 on frame 11 is substantially tubular in cross-section (Fig. 7) and are provided with regularly spaced grooves in their peripheries for receiving rings or collars 72 of rubber or like non-abrasive material. One end of each of the rolls is journalled in a bearing post 73 fixedly mounted on channel 50 while the opposite end of each tubular roll is fitted with a stub shaft 74 that is journaled in and extended through bearings 75 mounted on channel 51 (Figs. 8 and 9). Outwardly of the bearings 75, each shaft 74 fixedly carries a sprocket 76. The next to the outermost shaft 74 on each side of frame 11 also carries a sprocket 77 and a sprocket chain 78 is trained about this sprocket and sprocket 76 on the outermost shaft 74. The remainder of sprockets 76 are operated in common by a sprocket chain 79 which in its lower flight is trained about pairs of idlers 80 and a drive sprocket 81. One of idlers 80 may be carried by a bracket 82 for adjusting the tension of the chain 79. The drive sprocket 81 is, with a sprocket 83, fixedly mounted on shaft 84 journaled in a bracket 85 depending from channel 51. The sprocket 83 is operatively connected to the drive sprocket of a gear reduction unit 86 by a sprocket chain 87 and the purpose for employing this type of driving connection for sprocket 76 is to allow for vertical movement of the frame 11 without affecting the tension of sprocket chain 79.

Since the rolls 15 are arranged in parallel with and between the several belts 12, their direction of rotation will be substantially at right angles to the movement of the said belts along the grooved rails 48. Thus, as shown in Fig. 7 and with a roll 15 located in the full-line position, the under surface of the glass sheet as at *t* on the belts 12 will be above the peripheral surface of the collars 72 but when the frame 11 is elevated said collars 72 will engage the sheet and move it transversely to its former line of movement while supporting the same in the plane of line *v*. In the case of the transfer unit G, the sheets S are received on the associated belts 12 and removed therefrom in a transverse direction when and as the frame 11 and the rolls 15 therein are elevated. Conversely when the sheet of glass is received in the transfer unit H, the frame 11 is elevated and said sheet is received on the rolls 15 therein and is removed when the frame is lowered so that the belts 12 will operate to carry the sheet in a direction substantially at a right angle to its former line of movement. Accordingly when a glass sheet causes operation of the cylinder 63 of unit G, the linkage 58 (Fig. 6) will move in the direction of arrow 71 to elevate the associated frame 11 and then, moving in the direction of arrow 88, operate to lower the same. Likewise, the linkage 58 associated with frame 11 of unit H will move in the direction of arrow 88 after receiving the glass sheet and then in the direction of arrow 71 when the sheet has been moved therefrom.

The conveyor unit 17, arranged between the transfer units G and H, comprises a frame having side channels 89 and bracing channels 90, all of which are carried at the upper ends of vertically disposed standards 91. The top or sheet receiving surface of this unit, formed by the rolls 18, comprises a plurality of spaced, parallel and transversely disposed shafts 92 on which are fixedly mounted rubber-covered rollers 93 that are regularly spaced from one another (Figs. 3 and 4). The shafts 92 are journaled at their ends in bearings 94 mounted on the side channels 89. A continuous sprocket chain 95 interconnects sprockets 96 mounted on the ends of shafts 92 to effect rotation thereof at a uniform rate of speed and the chain is driven from a gear-reduction unit 97. A glass sheet S therefore, as it leaves the roll 15 of transfer unit G, is received, carried forward upon the rollers 93 on shafts 92 and conveyed onto the rollers 15 of transfer unit H.

In the event that a glass sheet is not to be removed from the transfer unit H in the direction of arrow 20 (Fig. 3), it is carried in a continued line of movement by the rolls 15 until it is received on the conveyor unit J. As best seen in Figs. 3 and 5, this unit comprises a belt supporting frame 98 formed of horizontally disposed channel members 99 that are carried at the upper ends of vertically disposed standards 100. The conveyor is provided with a top portion or deck 101 composed of wood sections supported by braces 102 on channels 99 over which traverses an endless belt 103.

The looped ends of the belt 103 are trained, at the opposite ends of the frame 98, about pulleys 104. The pulleys are mounted on shafts 105 journaled in bearings 106 located on brackets 107 of the frame. The drive shaft and sprocket of a gear reduction unit 108 and a sprocket 109 on one of the shafts 105 are interconnected by a sprocket chain 110. The return flight of the belt is supported on idler rolls 111 and the tautness or slack in its continuity may be compensated for by a pair of tensioning rolls 112 interposed in this return flight. The supporting shafts for the tensioning rolls 112 are journaled in bearing blocks 113 mounted on vertically-disposed screw shafts 114, carried by the standards 100, so that upon rotation of opposed screw shafts at opposite sides of the frame 98, the stretch of the belt may be modified to obtain its required tautness. And, as herein shown, a support roll 115, similar in structure to the rolls 15 previously described, may be mounted by means of bearing posts 116 at the end of the unit J adjoining the transfer unit H.

The main delivery section

The delivery section B is preferably of considerable length to accommodate a number of sheets of glass and their travel thereon is controlled by the changing positional relation of the sheets to the end that their individual movements may be according to control elements actuated by the sheets themselves. This method of control establishes a regular supply of glass to the remainder of the cutting machine in spaced order so that no operating area will be unduly "idle" or "choked" with glass. The as will best be seen in Fig. 1, the delivery section B includes a plurality of conveyor units of common or conventional structure and, with the exception of differences be noted, the units, indicated by the numeral 117 as well as the numeral 19, are identical one to the other and except for length are constructed in the same manner as the conveyor unit 17 above described. That is to say, each of these units comprises a frame 118 of longitudinally-extending side channels 119, transversely disposed channels 120 and vertical standards 121 at the upper ends of which the channels 119 are carried. Regularly spaced throughout the length of these channels are parallel, transversely disposed shafts 122 carrying rubber-covered rollers 123 which are regularly spaced from one another (Figs. 12 and 13). The shafts 122 are journaled at their ends in bearings 124 mounted on channels 119 and at one of their ends fixedly carrying a sprocket 125. In the case of these conveyor units, the shafts 122 in the entry half of each associated frame 118 are driven by a continuous sprocket chain 126 while those shafts 122 in the other or exit half are driven by an independent sprocket chain 127. Each of these sprocket chains is operatively connected to individual gear reduction units 128 and 129 respectively.

This particular manner of roll operation is for the purpose of successively halting sheets of glass in each half area of the conveyors 117 in the event of a delay or other emergency arising in the scoring, breaking or distributing units. As will be more fully hereinafter disclosed, an automatic arrangement is provided whereby the conveyor unit 117 immediately preceding the scoring unit D is equipped with suitable controls for the gear-reduction unit 129 to halt a glass sheet in its forward movement in the exit area which automatically actuates controls for the gear-reduction unit 128 to halt a succeeding sheet of glass as it is received on the entry area of the conveyor unit. Control elements in this entry area of each conveyor likewise control the forward progress of glass sheets as they in sequence are received in like areas of the subsequently located conveyors. A conveyor, generally designated by the numeral 130, is arranged between the conveyor 19 and first conveyor 117 and its structure is substantially the same as that of conveyor unit J which has been hereinbefore described. In the event of a stoppage in movement of the glass sheets, the belt 131 of conveyor 130 will be halted when so affected by control elements located in the next succeeding conveyor unit 117.

The primary squaring and scoring unit

The relation of the last conveyor unit 117 to the scoring unit D may be seen in Fig. 1 and in Figs. 13 and 15 wherein the various individual units are illustrated. The details of this unit D comprises a squaring section, generally designated by the numeral 132, and a scoring section indicated by the numeral 133. These sections of the unit D are contained within a general framework 134 having longitudinally disposed side channels 135, transversely disposed channels 136 and vertically disposed standards 137 at the upper ends of which channels 135 are carried.

As shown in Figs. 14 and 15, the squaring section 132 of the cutting unit D is provided with a plurality of shafts 138 equipped with rubber-covered rollers 139, the shafts being journaled at their ends in bearings 140 carried by the side channels 135. On the other hand, to afford a firmer surface for the glass sheets as they are carried beneath the scoring heads of the section 133, shafts 141 are provided having a rubber-covered periphery 142 (Fig. 18). The shafts 141 are journaled at their opposite ends in bearings 143 mounted on side channels 135. The shafts 138 and 141 are driven in common from the gear-reduction unit 144 and through a chain drive indicated at 145, each of said shafts being equipped with a spur gear 146. The gears 146 are caused to rotate in the same direction by means of idler gears 147 that are intermeshed therebetween.

As best seen in Figs. 15 and 16, the squaring section 132 is equipped with a transversely movable carriage 148 that is bodily located beneath roll shafts 138. The carriage 148 is formed of suitable angle iron members, the members 149 forming the ends thereof and being interconnected by the side members 150. Fixedly mounted on the end members 149 are brackets 151 containing suitable sleeves by which the carriage 148 bodily is slidably supported on rods 152 fixedly secured at their ends to the frame 134. Medially between the rods 152 the carriage carries the outer end of a piston rod 153. The rod 153 is caused to move the carriage 148 by means of the associated cylinder 154. In order that force of the cylinder can be resiliently arrested at each end of movement of the carriage 148, the piston rod is threaded at its outer end and equipped with pairs of adjustment nuts 155 and coil springs 156 located on the rod between nuts 155 and the adjacent end angle 149 through which said rod passes (Fig. 17).

The outer end angle 149 of carriage 148 carries fixedly mounted posts 157 at the upper ends of which are rotatably mounted rubber rollers 158. Upon movement of the carriage 148 to the left as viewed in Fig. 16, the rollers 158 engage the adjacent edge of the glass sheet S and move the same laterally into rolling engagement with rollers 159 that are mounted on fixed posts 160. Thus when the carriage is caused to move, the glass sheet bodily is brought in a "squared" position in the section 132 and immediately before it is carried into the scoring section 133. Also as the sheet is halted in its lateral movement by the rollers 159, the springs 156 serve to absorb the force of the carriage movement until it is moved to the right (Fig. 16) as the cylinder 154 is reversed.

Referring now to Fig. 18, it will be seen that the scoring heads, generally designated by the numeral 161, are adjustably mounted on shafts 162 journaled in bearings 163 that are fixedly mounted on channels 164. The channels 164 on each side of the machine unit are supported on the bearing blocks 165 for idler gears 147. The scoring heads 161 are arranged along the shafts 162 according to the desired number and width of individual strips into which the sheet S is to be divided. Upon examination of Figs. 15 and 18, it will thus be seen that the rightmost or last row of heads 161a, under which the sheet will be carried, are adapted to score the sheet into four strips and narrow marginal areas that are subsequently removed from the sheet. This is tpyical as shown in Fig. 2 by the lines a and margins b.

In the next row, to the left, the scoring heads 161b are arranged in relatively the same positions to replace the first row in the event of necessitated repairs. The next row of heads 161c may be adjustably positioned to score the glass sheet, for example, into three strips of a different required width. In the event of a change in the sizes of production requirements, the scoring heads 161a on the first shaft can be removed from their operative positions and the scoring heads 161c on the last shaft placed in operative position. The heads on the first two shafts are then rearranged in the new order of spacing and placed in their original operative or emergency operative positions. This mode of scoring glass sheets of large dimension has been found to be most advantageous since the sheets can be scored while being carried beneath the scoring heads 161c on the first row, under which the sheet passes, and while the heads 161a and 161b of the second and last or normally operative rows are being placed in adjusted positions of spacing.

A preferred construction of the scoring heads 161 is illustrated in Figs. 19 to 25, inclusive, of the drawings, wherein it will be seen the carriages 166 of the scoring heads are slidably located on shafts 162 on each of which a scale 167 with linear graduations is secured for ready indication of the adjustment to which the carriage or carriages may be moved with reference to designated inch positions for the required spacing. The carriage 166 is borne across the shaft 162 by means of a rack and pinion association, the pinion 168 being adapted to be manually rotated. The rack 169 is bolted, as at 170, to the shaft 162. The pinion 168 is cotnained within the bore 171 formed in the body 172 of the carriage. If desired, for simplicity of construction, the pinion teeth may be formed in the end of a shaft 173. The shaft 173 is rotatably mounted in bore 171 and is secured from endwise movement therefrom by a common type of set screw, the end of which enters an annular groove 174 in the shaft. The outwardly extended end of the shaft 173 has a pin 175 secured therein to provide a suitable handle for the shaft and pinion formed thereon.

When the scoring head 161 is to be secured in an adjusted position, a fixed relation is established between the body 172 and the shaft 162 by means of a plug 176 located in a bore 177 in body 172 and urged against the side of the rack 169 by a hollow sleeve bolt 178. The plug 176 has a shank portion 179 extending through the sleeve portion of the bolt 178 and outwardly thereof terminating in a head 180. The sleeve bolt is threaded into a tapped portion 181 of the bore 177 in which the plug 176 is located. Release of the plug from against the rack 169 is accomplished by turning the bolt 178 and withdrawing the plug 176 by the head 180 which is engaged by the end of the bolt. To minimize the frictional contact between the body 172 and the shaft 162, said body is supported by two pad surfaces 182 which are finished on the proximate side thereof.

Each of the scoring heads 161 is equipped with a steel cutter wheel 183 and a pivotally mounted arm, generally designated 184, on which the cutting wheel is supported. The arm 184 of each head may be swung upwardly through a short arc to remove the related cutter wheel from cutting relation to the glass surface while the remainder of the cutter wheels will produce a desired score line.

In the form of construction shown in the drawings, and particularly Figs. 19 and 23, the arm 184 is operatively connected to a cylinder 185 that is mounted on the body 172 of the scoring head or cutting device by bolts 186 extending through a flange 186' depending from the casing 187 of the cylinder 185. This cylinder casing is formed of two shells which are secured in sealing relation by bolts 188. The mating ends of the shells engage and clamp the periphery of a diaphragm 189 to close one end of the cylinder and form a pressure chamber, as indicated at 190, within the cylinder 185. The central area of the diaphragm 189 is attached to a rod or stem 191 which actuates the arm 184 to raise or lower the steel cutter 183.

For this purpose, the upper end of rod 191 carries a socketed stud 192 having an enlarged head on which the diaphragm 189 is clampingly secured by means of a washer 193 and a screw 194, extended through the washer and stud and threaded into the end of the stem 191 (Fig. 20). When a suitably controlled valve is opened, the pressure in a pipe 195, connected to cylinder 185, will be exerted on the diaphragm 189, to move the stem 191 downwardly with respect to the casing 187. The extent of this downward movement is determined or controlled by a sleeve 196 threaded into the casing 187 and against which the enlarged head of stud 192 engages at the limit or distending movement of the diaphragm. When the desired position of the cutter wheel 183 and arm 184 with reference to the glass surface and consequently the extent of movement of the rod 191 has thus been established, the sleeve 196 may be secured in position by a soft plug 197 which is forced against the threaded exterior of the sleeve by a set-screw 198.

During downward movement of the stem 191, and upon distention of the diaphragm 189, a coil spring 199, located about stem 191, will be compressed. One end of the spring bears against the lower end of stud 192 while the opposite end is supported on a bifurcated bracket 200 attached to the body 172. The stem 191 extends through the bifurcated extensions 201 of said bracket and is connected to the arm 184 by a pintle pin 202 extended through the end of the stem and ears 203 formed on the arm. Said arm 184 is pivotally carried on the body 172 by a shaft 204; the central portion of which is located in a depending leg 205 of said body and fixedly pinned therein as at 206. The ends 207 of the shaft 204 are journaled in bearings 208 which are positioned against shoulders 209 formed by a reduction in diameter of the ends 207 from that of the shaft's central portion (Fig. 20). Said ends 207 are tapped, to receive retaining bolts 210 that secure the bearings against the shoulders 209.

These bearings 208 are located in the recessed ends 211 of the arm 184 and, preferably, the ends of the arm are slotted, as at 212, so that a loose mounting relation can be maintained during assembly. The arm 184 may thus be laterally shifted with reference to the body 172 to locate the stem 191 in vertical axial relation with the cylinder 185. When the desired position has been obtained, a rigid connection between the arm 184 and the outer races of the bearings 207 will be afforded by set-screws 213.

Downward movement of the stem 191, as produced by pressure within the chamber 185 and limited by the sleeve 196, lowers the arm 184 and steel cutter wheel 183 to a position in which the cutter wheel will engage the glass surface; and, upon cessation of pressure, the spring 199 will operate to raise the stem, the arm and cutter wheel from the contacting or scoring position. Thus, it will be seen that the steel cutter 183 will be urged into a proper scoring relation with the glass by a pressure within the chamber 185 and that the relation may be modified by a suitable pneumatic control system and the above described limiting means weherby the cutter wheel 183 will, repetitively, be swung to and from the glass without variance.

The effectiveness of scoring, or the depth of cut, may also be determined during assembly of the cutting device. The steel cutter 183 is generally mounted on the arm 184 by a stem 214 slidably mounted in a bracket 215. The operative position of cutter wheel to the plane of the glass surface is determined by a pair of casters 216 which ride on the surface of glass during its movement beneath the cutting device 161. The casters serve to establish the depth of cut since the effectiveness of the cutter will be defined by the extent of projection of the cutting edge below the plane of a line extending from the peripheries of the casters at their points of tangency to the glass. The casters also prevent injurious impact of the cutter against edges of the glass by lifting or bodily swinging the arm over the leading edge and, subsequently, sustaining the cutter and arm above the rear edge of the glass. Due to the relative size of the casters 216, the cutter wheel 183 will be initially placed on the surface of the glass and will be carried beyond the rear edge of the glass before the casters roll from its surface.

The casters 216 are journalled, as shown in Fig. 25, on bearings 217 that are supported on axle pins 218. Preferably the bearings are located in a recess 219, formed in the outwardly directed face of each of the casters, and retained therein by a conventional type of lock washer 220 which, when released, is seated in a groove 221 provided in said recess. The axles 218, having headed ends 222 for engaging the bearings, are secured in the sides of the bracket 215 by set-screws 223.

The steel cutter 183 is freely and rotatably mounted on a conventional form of keeper clip 224 which is U-shaped, as is well known in the art. The leg portions of the clip are located in transversely disposed grooves 225 in the end of the stem 214 to position the cutter in a slot formed in the extreme end thereof. The stem 214 is slidably supported in the bracket 215 which is rigidly clamped to the arm 184 by a bolt 226 that secures the mating dovetail surfaces 227 of the bracket and arm together. The body of the stem 214 is centrally disposed in the bore 228 of the bracket and is moved therethrough by an adjusting screw 229 that is threaded into the end of said stem. The screw is restricted from endwise movement by an enlarged annular flange 230 located in notched ear portions 231 forming a part of the bracket. The proximate end of the stem also has flatted surfaces 232 which engage the opposed inner surfaces of the ear portions in sliding relation to prevent rotation of the stem. The screw 229 is threaded into the end of the stem in order that, upon rotation, the lead of the screw will shift the stem vertically with respect to the bracket 215 and accordingly modify the position of the steel cutter wheel 183 with reference to both the surface of the glass and the peripheral edge of the casters 216. When the desired elevation of the cutter has been obtained, the stem 214 is secured in the bracket 215 by a set-screw 233 that engages the stem along a flatted surface 234.

The depth of scoring may thus be established by the relative position of the cutter wheel 183 with reference to the casters 216. Means for modifying the force and extent by which the cutter engages the glass surface is therefore readily accessible according to results to be obtained. When breakage occurs due to worn or broken cutter wheels, the scoring heads of an entire row may be removed from the operative position by rotation of the shaft 162 while the cutting devices set up for emergency purposes on an adjoining shaft 162 can be swung into operative position in order that production is not interrupted. By thus supplementing similarly mounted cutting devices, repairs can be effected and/or entire cutting devices replaced if necessary.

The vertical movements of the arm 184, as produced by the air pressure, also control the dispensation of a liquid supply that is fed, according to the position of the arm, to provide an oily film in the path of the cutter 183. The liquid is carried to the glass surface by a felt roll 235 which forms an oil film or path on the glass. It has been found beneficial to the life of the cutter to provide an oily medium in which the score line is created. The film acts to gather or accumulate the minute particles of glass formed as the steel edge enters the glass surface, and has been found to produce an additional feature subsequent to the scoring of the glass. The filmy deposit, accumulating on the walls of the scored area, acts to provide a separating medium between the walls and thus prevent any physical tendency of material adherence along the score line walls. To prevent flooding of the liquid onto the glass and to afford, in addition, a control that may be actuated periodically and without supervision, the supply of the liquid to the felt roll 235 is open while the casters 216 are riding on the glass and, when the cutter wheel 183 and casters 216 are raised from the glass, the supply will be interrupted.

An auxiliary function for the arm 184 is thus created by the required dispensation of the liquid. The reciprocatory movements described by the arm are utilized to raise and to allow the lowering of a plunger which forms, at one end, a valve member. The plunger 236 is engaged at one end, during the upward movement of the arm 184, by a lug 237 extending from the side of the arm. The plunger is moved, against the bias of a spring 238, to close off the liquid supply from its source as the tapered end 239 of the plunger engages a valve seat 240 formed in the end of a pipe fitting 241. When said plunger is in this position, a passageway 242 formed through the bracket 200 is closed at its inlet end 243 provided by the fitting 241. The passageway 242, which may be formed by drilling crosswise into the bracket, as is shown in Fig. 23, and plugging the end thereof, as at 244, connects the inlet end 243 with a passageway 245 forming the outlet end. A suitable needle adjustment valve 246 is located in the passageway 245 to control the flow of liquid to the outlet nipple 247. The nipple 247 provides a restriction to the liquid flow by the small cross section of its passageway.

The liquid flowing through the passageway 242, when the parts are located as shown in Fig. 23, is received in a reservoir 248 formed in the upper surface of the arm 184. The lower end of the reservoir communicates with a threaded plug 249 which has a T-shaped passageway 250 and conically formed exterior surfaces terminating in a tip 251. The liquid emerging onto the surface of the tip drips onto the felt roll 235 and, from the roll's surface, is transmitted to the glass surface. The roll is supported on the arm 184 by a flexible and suitably bent member 252 that urges the roll toward the glass except as restrained by a stop bolt 253.

The above description of the cutting devices 161 and of their means of support, together with the means, as set forth, for actuating or modifying the actuation of the devices, is common to all of the scoring units both of the primary unit D and those in the secondary units Q.

The glass having thus passed through the scoring area of the unit D, as above described, is carried by rolls 254, which form the surface of the edge trimming unit E. These rolls 254 are operated at an accelerated rate of speed to increase movement of the glass sheets between the scoring unit D and the trimming area of the unit E which will be seen in Figs. 26 to 32 inclusive.

The edge trimming unit

In being carried into and through the trimming unit E of the cutting machine, a scored glass sheet S is received on the rolls 254 at the entry area. These rolls comprise shafts 255 which carry rubber-covered rollers 256 are journaled at their opposite ends in bearings 257. These bearings are mounted on the side channels 258 of a framework 259 and which are supported on the upper ends of vertically disposed standards 260. The shafts 255 in the entry area 261 are equipped at one of their ends with sprockets 262 that are operatively driven by a gear-reduction unit 263 througth the chain 264. These shafts are driven by the unit 263 at an accelerated rate to convery the glass sheets in successiion into the braking or trimming area 265 of the unit E wherein a normal rate of movement is resumed. The sheets are thus delivered from rolls 254 onto rolls 266 of substantially the same construction and from which they are carried onto the roll shafts 267 of the breaker area 265. The shafts 267 are provided with rubber-covered peripheries and their opposite ends are journaled in bearings 268 mounted on channels 258. The rolls 266 and roll shafts 267 are each equipped at one of their ends with a sprocket 269 about which a chain 270, driven by gear-reduction unit 271, is entrained.

In order that the trimming unit E will be adapted for rapid adjustment to satisfactorily handle glass sheets of varying overall width, provision is herein made for supporting one longitudinal margin of the sheet on rollers that are generally mounted on a horizontally disposed frame 272 and transversely movable therewith. This frame is comprised of longitudinally positioned channels 273 and transversely disposed channels 274. As shown in Fig. 30, the transverse channels 274 function as support elements for the frame and for this purpose are provided adjacent one of their ends with guide rails 275 that are fixedly secured to the under surface of flanges 276 of said channels, as shown in Fig. 31, while adjacent their opposite end, each channel 274 carries a guide rail 277 on the upper surface of flanges 276. Beneath the rail 277, the channels 274 carry a grooved bar 278 which contains gear rack 279. As will be seen in Fig. 32, bolts 280 are employed to assemble the guide rail 277, a spacing bar 281, the bar 278 and gear rack 279 in common on the associated flange 276 of each channel 274.

The guide rails 275 and 277 are adapted to engage suitable rollers which, by their relative positions, operate to support the frame 272 and maintain the same in a substantially horizontal plane. For this purpose, each guide rail 275 is supported by a roller 282, the shaft for which is carried in a bracket 283 (Fig. 31) that is mounted on a base plate 284, fixed to a standard 260. The brackets are adapted to be vertically adjusted by means of bolts 285. At the opposite end of the frame 272, rollers 286, rotatably mounted in brackets 287, are more or less fixedly positioned to roll on the upper surfaces of the rails 277 to the end that while the several rollers 286 are in rolling contact with supporting guide rails 277 with a downward pressure, the plurality of rollers 282 by brackets 283 may be adjusted vertically to raise the frame 272 by guide rails 275 and thus position said frame in the desired horizontal plane.

By means of gear racks 279, the frame 272 is movable transversely to the direction of movement of the glass sheets. With each gear rack, there is associated a spur gear 287' fixedly mounted on shafting 288 which for convenience may be formed in sections interjoined by couplings 289 (Fig. 32). The shafting 288 is journaled in bearings 290 mounted on a portion of the frame 259 and fixedly carries a sprocket 291. This sprocket is connected to a power source 292 by chain 293.

On and along one longitudinal side of frame 272, a plurality of rollers 294 are carried by shafts 295 in brackets 296. Preferably and as may be seen in Fig. 28, the brackets 296 and rollers 294 are located substantially medially between roll shafts 267 in order that upon movement of the frame 272, to the right as viewed in Fig. 30, said assemblage can be located between the roll shafts. This, of course, is for the purpose of providing adequate support for the proximate margin of a glass sheet as the same is passing through the actual zone of trimming.

Removal of the salvage margins from each longitudinal edge of a sheet is accomplished by means of rollers 297, 298 and 299; the roller 297 being positioned to engage one margin of the sheet while the rollers 298 and 299 are so located with respect to one another that the opposite margin will pass therebetween. The roller 297 is accordingly located closely adjacent and transversely aligned with an adjacent roller 294 (Fig. 29). At the opposite marginal edge of the sheet, the roller 298 is located to support the said edge inwardly of the scored line therein while the roller 299 is positioned outwardly of said scored line.

The supporting shafts for rollers 297, 298 and 299 are each eccentrically mounted for the purpose of controlling the degree of deflection enforced on the marginal edges of the glass sheet to produce a clean breakage thereof. These rollers are of the same construction, and, being mounted in substantially the same manner, will be described in common.

Thus the roller 297 is rotatably mounted on an eccentric shaft 300 that is adjustably secured in a bracket 301. The bracket is provided with a threaded bore 302, axially aligned with shaft 300 and through which a screw shaft 303 is extended.

The ends of shaft 303 are rotatably carried in plates 304 and 305 affixed to a standard 306 comprised of a vertical column 307 and horizontally disposed arm 308. The shaft is secured from endwise motion by means of lock collars 309 arranged on opposite sides of plate 304 and has a squared end adapted to receive a crank handle as indicated in phantom line in Fig. 29. The bracket 301 is guided in movement along shaft 303 by means of grooved bar 310 that is carried by the horizontal arm 308 of standard 306. Accordingly, the roller 297 is adapted to be positioned by the bracket 301 for a maximum width of glass sheet as indicated in full line in Fig. 29 or for widths ranging to a minimum as indicated in phantom line.

Bracket 301 for roller 299 is threadably associated with screw shaft 311 that is supported at its ends in plates 312 and 313 affixed to standard 314 constructed similarly to standard 306. As in the case of shaft 303, shaft 311 has a squared outer end to move the associated bracket 301 therealong as the shaft is rotated. The bracket 301 for roller 298 is slidably supported on a base plate 315 that is mounted on a side channel 258 of main framework 259. This bracket is caused to move by means of screw shaft 316 that is rotatably mounted by a plate 317 on base 315 and plate 318 on the standard 314.

Accordingly, the frame 272 can be moved transversely to position the outermost rollers 294 for the proper supporting of a glass sheet with reference to its width and along one of its longitudinal margins while the roller 298 correspondingly is positioned to support the opposite margins during the breaking action. Likewise the rollers 298 and 299 can be transversely adjusted to engage and trim or break the glass sheet along the desired score line. The rollers 297, 298 and 299 are each individually adapted by their eccentric shafts 300 to be adjusted so that a plane tangential to the lowermost surface of the peripheries of rollers 297 and 299 will be beneath a plane tangential to the upper most surface of their respectively associated rollers 294 and 298.

While shown only on phantom line in Fig. 30, it will be understood that the edge trimming unit E is equipped with adequate shields and belt conveyors 319 for efficient removal of the marginal salvage or cullet glass strips.

Upon reaching the rightmost and exit area of the unit E, as viewed in Fig. 28, the glass sheet S is carried forwardly onto the transfer unit F of the distribution section C. As heretofore explained in connection with Figs. 1 and 2, when a sheet S reaches the unit F, the score lines *a* therein extend longitudinally with respect to its line of movement and on this transfer unit, the direction of movement is altered to carry the sheet into the distribution section C of the cutting machine in a direction substantially at a right angle to its former movement. The score lines by this change of line movement, are accordingly positioned in transverse relation to movement of the sheet.

The distribution unit C

As illustrated at the left hand of Fig. 2, it will be seen that the sheet S is divided into a plurality of strips *c*, *d*, *e* and *f* which are automatically and sequentially caused to be carried forwardly and, at selected areas, laterally for further processing. Since the individual units of the section C are in one way or another duplications of each other, except for size, a clear and full description of one strip, such as the strip *f*, is believed to be adequate for a comprehensive understanding of the cutting machine's operation when considered in its entirety.

The transfer unit F

The transfer unit F is constructed similarly to either of the units G and H, the structures of which are delineated in Figs. 6 to 11 inclusive of the drawings. Thus as viewed in Figs. 27 and 34, it will be understood that the movable frame 320 is elevated in its uppermost position so that a glass sheet will be received on the rolls 321 thereof. Upon arriving in this central area of the unit F, said sheet actuates controls, later to be described, to lower the frame 320 and deposit the sheet on the plurality of belts 322. The sheet now moves forward at a substantially right angle to its former direction of movement and is carried into the main breaking unit K, wherein it is divided into the several strips which have a length equal to the length of the orignal sheet and a width determined by the spacing of the scoring heads 161 in the cutting unit D.

The breaking unit

Figures 36, 37:
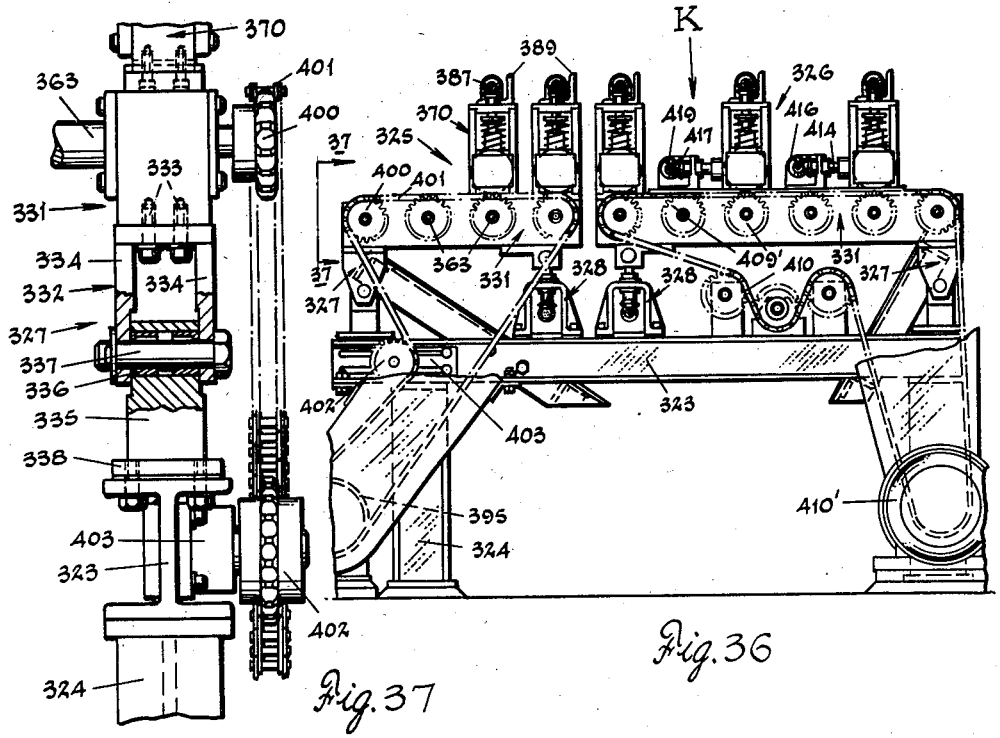
Fig. 36 is a side elevational view of a sheet glass breaker unit.
Fig. 37 is a fragmentary end view of the breaker unit as seen in the direction of line 37—37 in Fig. 36.

The framework of this unit, as shown in Fig. 36, comprises side beams 323 that are arranged in parallel and carried on the upper ends of vertically disposed standards 324. Pivotally supported on channels 323 are two frames 325 and 326 that at their outermost ends are swingably carried on fulcrum members, designated generally by the numeral 327, and at their opposed innermost ends are supported on vertical adjusting devices generally indicated at 328.

Briefly stated, a sheet entering onto frame 325 is carried by rollers 329 in a slightly inclined plane; engaged by suitable gripping rolls and is carried between supporting and gripping rolls 330 on frame 326. This frame is disposed at a slightly opposed angle, as will be seen in Fig. 42, to the angular position of frame 325 to effect breaking of the sheet S transversely along a score line *a* as the scored area is passing between the angularly disposed frames. Also to achieve breakage of glass sheets or strips having a width materially less than the span between the rolls of frames 325 and 326, the unit K is further provided with means for producing the satisfactory breakage of glass strips having an intended narrower width, as illustrated in Fig. 43.

More specifically, the frame 325 comprises an especially machined base 331 (Fig. 38) to which at one end there is secured a bifurcated bracket 332 forming one part of the fulcrum member 327 (Fig. 37). The bracket is secured to the underside of the base 331 by screws 333 and the spaced, depending legs 334 receive the upper end of a post 335 therebetween. The post is suitably bored to receive a sleeve bearing 336 and pivot pin 337 therethrough, the ends of the pin being carried in the bracket legs 334. The base 338 of each post 335 is fixedly mounted at the corresponding ends of the beams 323 at the entry end of the unit K. Similar posts 335 are mounted on beams 323 at the take-off end for generally supporting the frame 326 in the same manner.

The adjusting devices 328 on which the opposite ends of the frames 325 and 326 are mounted are best seen in Figs. 38 and 39. Each device is generally contained within a housing 339 having an outwardly directed opening 340; said housings being fixedly mounted on the beams 323. The top wall 341 and inner wall 342 are equipped with sleeve bearings 343 and 344, respectively, in which are journaled a vertically disposed shaft 345 and a horizontally disposed shaft 346.

The vertically disposed shaft 345, in each instance on the opposite side of the frames 325 and 326, has a bevel gear 347 fixedly keyed to the lower end thereof and above the sleeve bearing 343 has formed thereon a retaining flange 348. The upper end of each shaft is threaded as at 349 and has associated therewith a nut 350. More particularly, the nut 350 which is cylindrical in cross-section in its horizontal axis, is more or less rotatably confined in an oval-shaped bore 351 of a bracket 352, one of which is fixedly bolted to the adjoining undersurface of each of the individual bases 331. The bracket 352 is provided with a downwardly directed opening 353 for receiving the shaft 345. Thus upon rotation of the shaft 345, the threaded end 349 thereof will traverse the nut 350 and, since the nut is confined in the bore 351, turning of the shaft in one direction will cause the nut and bracket 352 to actually rise upwardly along the threaded end 349 and to descend therealong when the shaft is turned in the opposite direction. This action will cause the associated base 331 to pivot at its opposite end on the related pin 337 of the fulcrum members 327. Obviously, the angular movement of the associated bases 331 of frame 325 or frame 326 must be coordinated so that each side of the frames will be disposed in the same angle of inclination.

For this purpose, the horizontally disposed shaft 346 of each adjusting device 328 is equipped adjacent its opposed end with a bevel gear 354 meshing with the bevel gears 347 on shafts 345. One or both of the ends of shaft 346 may be squared to receive a suitable hand crank. Preferably also the housings 339 are structurally interjoined by means of an angle 355 which at its ends is bolted to flanges 356 projected outwardly from the inner wall 342 of each housing.

At regularly spaced intervals, each of the bases 331 is provided with transversely aligned bored openings 357, in which the bearings 358 for the support and breaker rolls are positioned. The frame 325, as herein disclosed, is provided with entry rolls 329 and glass supporting rolls 360 cooperating with breaker rolls 361. Each of the rolls 329, 360 or 361, as shown in Fig. 38, by way of example, consists of a tubular mandrel 362 into the ends of which the enlarged heads of stub shafts 363 are fixedly inserted. In the case of the rolls 329 and 360, the smaller or outer ends of the shafts 363 at the opposite ends of mandrel 362 are journaled in bearings 358. The outer peripheries of the mandrels 362 are suitably covered with rubber surfaces as at 364. The breaker rolls 361 are similarly formed but the shafts 363 at the opposite ends thereof are journaled in bearings 365 vertically aligned with bearings 358, bearings 365 being located in bores 366 of slide blocks 367. The ends of the bores 357 and 366 are capped by suitable plates 368 or lubricated sealing plates 369.

The slide blocks 367 are supported for vertical movement in U-shaped base members 370 (Fig. 39) comprising a bottom plate 371 fixed to the upper surface of the main base 331 and vertically disposed side walls 372. The slide blocks 367 are equipped with outwardly directed cap plates 373 and on their inwardly directed surface with lubricant seal plates 374; plates 373 and 374 being sufficiently wider than blocks 367 to slidably engage the facing edge surfaces of the walls 372 to retain said blocks therebetween.

The degree of pressure which the rolls 361 exert against rolls 360 is resiliently controlled by means of coil springs 375 and a specific control of the pressure is imposed on the rolls 361 by means of vertical adjusting screws 376 (Fig. 38). For this purpose, the blocks 367 located on opposite sides of frame 325 have annular and upwardly directed hollow hubs 377 that are cross-drilled to support the ends of a pin 378. The hubs receive the annular enlarged head 379 of associated screw 376 in which is located a slot 380 through which the pin 378 passes. The upper, threaded portion of the screw is journaled through sleeve bearing 381 supported in the cap plate 382 of base members 370, and above said bearing is received in a tapped sleeve 383 fixedly secured in the hub of a bevel gear 384. The spring 375, in each instance, thus encircles the hub 377 and rests at its lower end on the top of the associated slide-block 367. A hand-nut 385 on screw 376 is provided for adjusting the compressional characteristics of each spring.

Under normal circumstances, separation of the rolls 360 and 361, by movement of a glass sheet therebetween, forces the slide-blocks 367 upwardly against action of the springs 375 at the opposite ends of the rolls 361. During such movement the pins 378 travel in the slots 380, and relative to the enlarged heads 379 of screws 376. Now, if the pressure of tangential contact of the rolls 360 and 361 is to be altered, the adjusting screws 376 are raised or lowered by the bevel gears 384 which action will vary the relation of the slots 380 to pins 378. For this purpose, bevel gears 384 are meshed with complementary bevel gears 386 fixedly mounted on shaft 387. Shaft 387 is journaled in bearing brackets 388 that are carried by an angle 389 that is connected at its ends to the cap plates 382 of base members 370 and further functions as a transverse bracing member for the frame. By means of suitably squared ends, the shaft 387 can be operated by a hand crank to drive bevel gears 386.

The gripping action of the rolls 360 and 361 against the surfaces of a glass sheet will thus be seen to be affected by the action of coil springs 375 while the pressure of influence of this action can be modified by vertical adjustment of screws 376 through bevel gears 384 and 386 and the associated shaft 387. By effecting an equal amount of adjustment through screws 376 at the opposite sides of frame 325, the tangential engagement of the rolls 360 and 361 will be uniform throughout their adjoining surfaces.

As indicated in Figs. 34 and 36, the rolls 329 and 360 are driven from a power source 390 which will also be seen as operatively connected to the shafts 28 for the belts 322 of the transfer unit F (Fig. 35). This arrangement includes a jack shaft 391, journaled in bearings 392, and on which are mounted sprockets 393, 394 and 395. By chain 396, sprocket 393 is coupled to drive gear 397 of the power unit 390 to drive shaft 391. The sprocket 394 through chain 398 drives the said shafts 28 of the transfer unit; while sprocket 395 is operatively connected to sprockets 400, one of which is keyed to each shaft 363 on frame 325, by chain 401 entrained thereabout. If desired, a tensioning idler sprocket 402 journaled on adjusting bracket 403 may be employed to suitably support chain 401. The rolls on frame 325 are of course driven independently from the rolls on frame 326 since these frames are adapted to be angularly positioned with respect to each other to break the glass sheets along score lines a.

The frame 326 is constructed substantially in the same manner as frame 325, in that the bases 331 are mounted for adjustment into the desired planes of inclination by the fulcrum members 327 and vertical adjustment devices 328. However, upon reference to Figs. 36 and 42, it will be seen that frame 326 has mounted therein supporting roll 330 and cooperating breaking roll 404 and spaced pairs of breaking rolls 405—406 and 407—408. Also between these pairs of rolls, there are provided supporting rolls 409. The rolls 330, 405—406 and 407—408 are of the same structure as rolls 360—361 and are similarly mounted, as is shown in Fig. 38 wherein the rolls 360 and 361 are disclosed, and the description hereinabove is equally applicable to these rolls. This is also true of the means such as the bearing 365 and screws 376 for supporting and adjusting the positions of rolls 404, 406 and 408. Each of the associated stub shafts 363 for these rolls is equipped at one end with suitable sprockets 409′ which in common are driven by a sprocket chain 410 from the power unit 410′ (Fig. 36).

Figure 42:
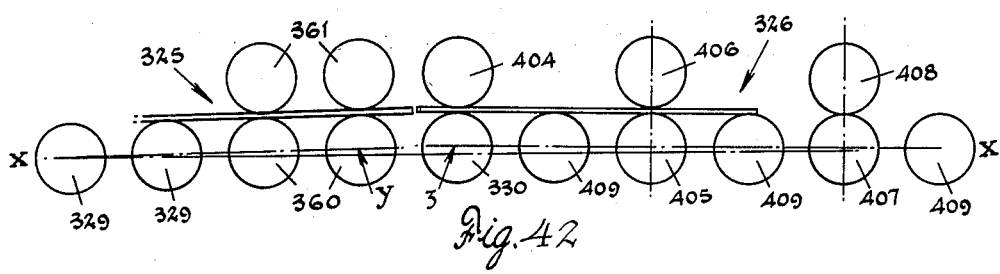
Fig. 42 is a diagrammatic view of the arrangement of breaking rolls according to one method of separating a glass sheet into narrower strips.
Figure 43:
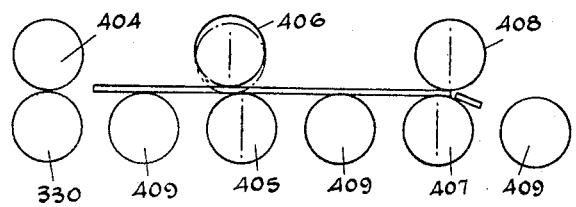
Fig. 43 is a similar diagrammatic view of the arrangement of other of the breaking rolls according to another method of separating a strip width from the body of a glass sheet.

As will be seen in Fig. 42, the frames 325 and 326 are diagrammatically shown as being located in inclined planes of opposed angularity so that a sheet of glass entering on the rolls 329 will progressively pass between the pairs of gripping rolls 360 and 361 and be bodily deflected upon entry of the leading edge between the gripping rolls 330—404 on frame 326. Then as the edge passes between rolls 405—406, the deflection will be sufficiently pronounced to produce a quick, clean break along a score line as this area of the sheet is moving between the frames 325 and 326. While the angles between the theoretical horizontal line $x$ and the inclined lines $y$ and $z$ has been emphasized, it will be appreciated that either of these angles can be best determined by actual operation of the breaking unit.

As illustrated in Fig. 43, the unit 326 is further equipped with means for breaking off transverse strips of glass from a sheet when the width of such a strip is less than would produce a normal break upon deflection of the sheet between rolls 360—361 and 330—404. For this purpose, the gripping rolls 406 and 408 are adapted to be moved longitudinally with respect to the path of movement of the sheet. In one instance, this adjusted positioning of the roll 406 with reference to the mating roll 405 will produce breaking of a strip from the following or rear margin of a sheet; or, as herein shown, upon longitudinal movement of the roll 408 to an adjusted position with reference to the associated roll 407 will produce a similar break along the leading margin of a sheet.

To accomplish longitudinal movement of either of the rolls 406 and 408, the U-shaped base members 370 associated with the rolls 406 and 408, are adapted to be movably supported on their respective bases 331. As shown in Figs. 40 and 41, a shaft is threaded into a boss formed on one side of the particular members 370; said shafts on the opposed sides of the frame 326 being suitably interconnected to cause the housings to move an equal increment of distance. To directively guide motion of the members 370, each base 331 of frame 326 is provided on its upper surface with integrally formed guide rails 411 and the bottom plate 371 of base members 370 is received therebetween. On one side wall 372, each member is provided with an internally threaded boss 412 into which is received the threaded end 413 of a shaft 414. The shaft 414 is journaled in sleeve bearing 415 mounted in the vertically disposed wall of a bracket 416 fixedly carried on the base 331. A bevel gear 417 keyed to the opposite end of the shaft abuts one end of the sleeve bearing 415 while a lock-collar 418 fixed on the shaft engages the opposite end. This prevents endwise movement of the shaft and, upon the rotation thereof, produces a forward or rearward traversal of the base member 370 generally, as the threaded boss is caused to move along said threaded shaft end 413. The bevel gear 417 meshes with a corresponding bevel gear 419 and the gears 419 on each side of frame 326 are fixedly mounted on a transversely and horizontally disposed shaft 420. Adjacent the gears 419, the shaft is journaled in sleeve bearings 421 mounted in the brackets 416. Each of these brackets may be provided with a horizontally extendsd flange 422 on which are supported the opposite ends of a bracing angle 423.

Consequently, when the shaft 420 is turned at either of its ends, the transversely related base members 370 on the frame 326 will be moved along the base members 331 and between the guide rails 411 thereof. As illustrated in Fig. 43, this will, in the case of the roll 406, cause the same to be moved to a position as therein indicated and out of vertical alignment with the roll 405. Likewise, the roll 408 may be similarly moved to an adjusted position out of vertical alignment with the roll 407. This will effect breaking of the glass sheet along a score line that is made transversely and adjacent either the leading or following margin of a glass sheet.

Now, with reference to further movement of a glass strip along the distributor section C of the cutting machine, it will be seen in Fig. 34, that as the individual strips leave the breaking unit K, they will be received on the first of the alternately arranged transfer units L and conveyor units M. The strip $e$ is herein shown as approaching the second transfer unit L while the strip $f$ actuates a control which, as will be more fully described in detail, causes the transfer unit to divert a strip from one path of movement to another path at substantially a right angle thereto.

The transfer unit L is constructed in the same manner as the units of the same character previously described.

That is to say, this particular unit is equipped with a vertically movable frame 424 having rolls 425 rotatably mounted thereon and driven by a sprocket chain 426 from a power unit 427. Likewise, said unit is provided with belts 428, arranged in parallel with and between the rolls 425 and generally operated by a sprocket chain 429 from the power unit 430. A cylinder, the same as cylinder 63 previously described in connection with the frame 11 of unit G, is caused upon the passage of, for example, three glass strips over the transfer unit to become activated as the fourth strip is moved thereupon. This will cause the cylinder through the linkage 431 (Fig. 33) to lower the series of rolls 425 and deposit the fourth or strip $f$ on the belts 428 to the end that said strip will be carried laterally onto the adjoining conveyor unit O.

It will be appreciated that the transfer units L and conveyor units M required in the distributor section C and those conveyors carrying the strips toward and away from the secondary scoring units Q function in the same manner as the similar and previously described units in the main delivery section B of the machine and accordingly the structures thereof will be considered the same except for some distinguishing features that will be noted in detail.

The conveyor unit O into which the glass strip $f$ is moved from the transfer unit L is equipped with roll shafts 432 journaled at their ends in bearings 433 that are mounted on a framework 434. The rolls are operated by means of a power unit 435 through sprocket chain 436. The glass strip is thus carried by the roll shafts 432 from the transfer unit L to the similar transfer unit R wherein the direction of its movement will be changed to a path substantially at a right angle to its former movement.

The transfer unit R is equipped with a vertically movable frame 437 on which are rotatably mounted the plurality of rolls 438 that are driven through train of sprocket chains 439 from power unit 440. When the glass strip enters unit R, the frame 437 is in its lowermost position so that said strip enters onto and is supported on the surfaces of the belts 441. These belts are driven by a sprocket chain 442 from power unit 443. The frame 437 is raised by the linkage 444 as the following end of the strip $f$ reaches the central area of transfer unit R and the rolls 438 operate, as shown in Fig. 46, to lift the strip from the belts 441 and direct it toward the secondary scoring unit Q. As the strip passes through this scoring unit, the linkage 444 functions to lower the frame 437 in order that a subsequent strip will be received on the plurality of belts 441.

*Secondary scoring unit*

Figure 47:
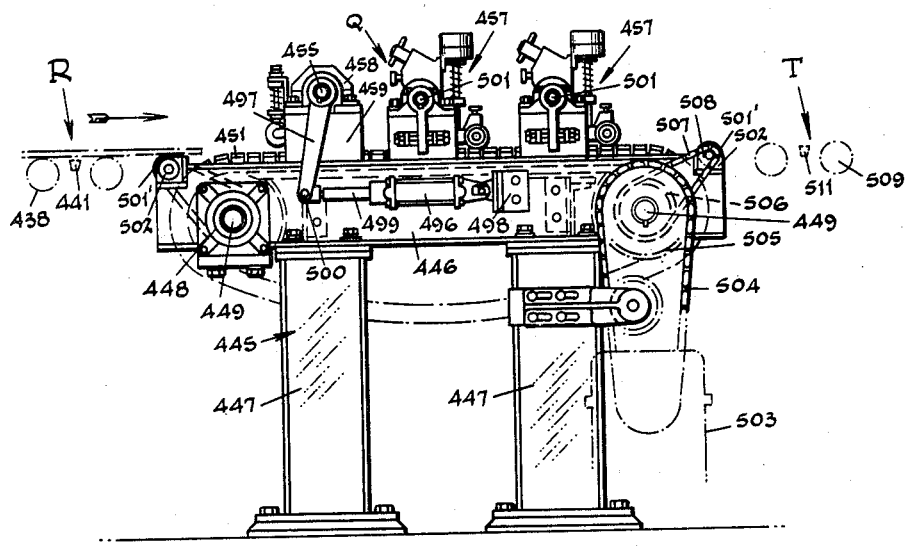
Fig. 47 is a side elevational view of the secondary scoring unit.

Referring now to Figs. 45, 46 and 47, the squaring and scoring members will be seen to be mounted generally on a framework 445 which includes longitudinal and transverse channels 446 carried on the upper ends of vertically disposed standards 447. Arranged in journal bearings 448 at each end of the framework 445 are shafts 449 on which are mounted sprockets 450 (Fig. 46) which support and motivate a series of endless slat conveyors 451. The slat conveyors 451 are conventionally equipped with rollers 452 which in the upper flights of the conveyors are supported on tracks or rails 453 as will be best seen in Fig. 49. The conveyors 451, as herein shown in Fig. 45, are transversely spaced from one another for the purpose of positioning retarding fingers 454 in the path of the strip.

Figures 48, 49:
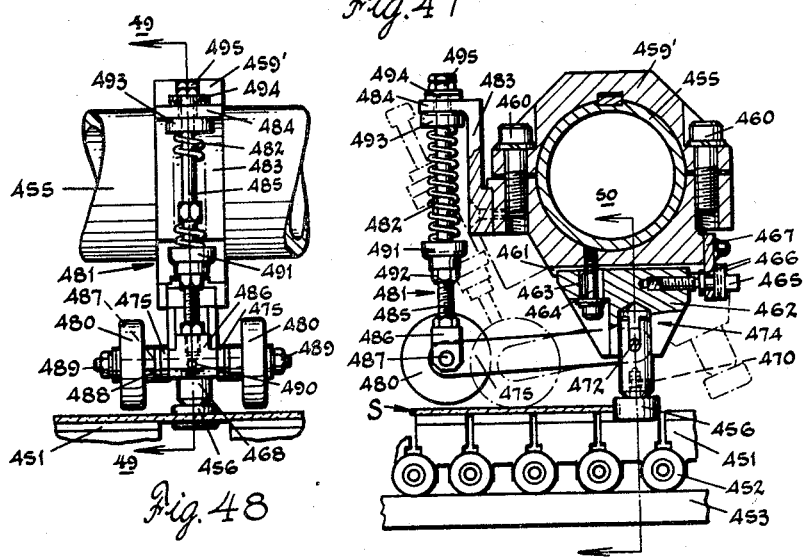
Fig. 48 is an end view of a glass strip squaring device used in the secondary scoring unit.
Fig. 49 is a cross-sectional view of the squaring device and as taken on line 49—49 of Fig. 48.
Figure 50:
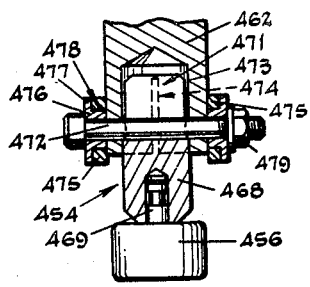
Fig. 50 is a detail view of the glass engaging member of the squaring device and as taken on line 50—50 of Fig. 49.
Figure 61:
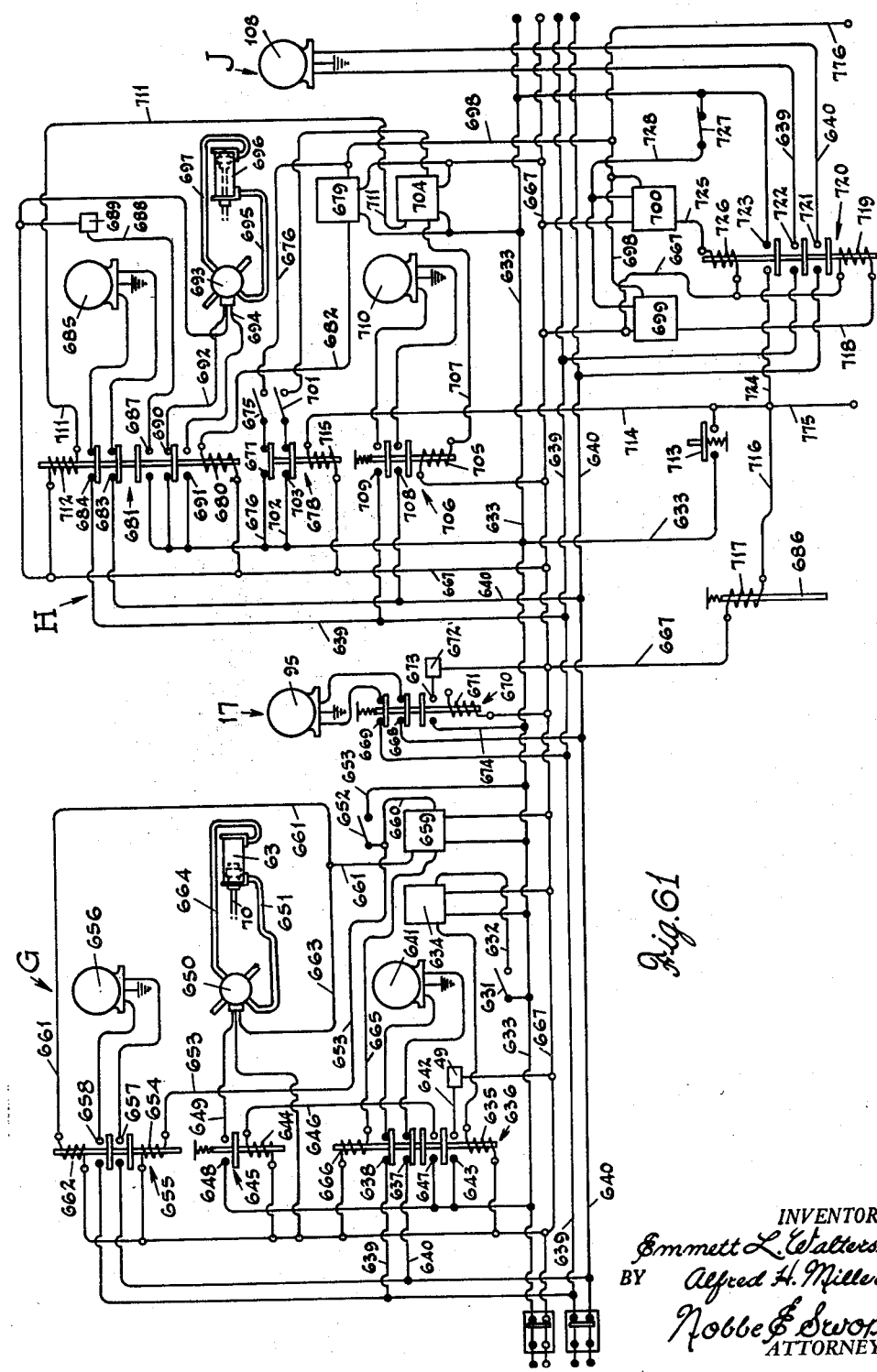
Fig. 61 is a diagrammatic view of the control circuits in the primary delivery section of the cutting machine.

As illustrated in Figs. 48, 49 and 50, these so-called fingers are generally carried on a mandrel 455 and each is equipped with a roller 456 which is positioned so as to be engaged by the leading edge of the glass strip. Upon such engagement of the strip with at least two of the rollers 456 the strip bodily will become "squared" on the scoring unit Q before proceeding beneath the scoring heads 457 thereon. More particularly, the mandrel 455 is journaled at its ends in bearings 458 mounted on blocks 459 of the framework 445. The support for the fingers 454 includes a saddle-block 459' fixedly mounted on the mandrel 455 by means of bolts 460. The lower surface of block 459' is suitably grooved longitudinally as at 461 to adjustably mount a slide-block 462 at the lower end of which the finger 454 is carried. One end of this block is suitably apertured and vertically slotted as at 463 to receive a clamping bolt 464 which is upwardly threaded into the lower surface of saddle-block 459'. The opposite end of block 462 is tapped to receive the threaded end of a feed-screw 465. The screw 465 is conventionally provided with collars 466 whereby the screw will be adapted to rotate in its mounting plate 467 but will be incapable, when turned, of longitudinal motion. Thus the slide-block 462, when the bolt 464 is loosened, will be adapted to slide within the groove 461 upon operation of the feed-screw 465 and adjust the position of the finger 454 in a longitudinal direction with respect to the framework and the direction of glass movement.

The finger 454, in each instance, includes a mounting post 468 which is drilled in its lower end to receive the stub axle 469 of roller 456 and tapped to receive the retaining set-screw 470 therefor. The opposite or upper end of the post is slotted at 471 to receive a bolt 472 that extends transversely through the slide-block 462. The block has a vertical bore 473 in which the slotted upper end of post 468 is situated and also is slotted as at 474 in order that said post 468 may be fixedly held within the bore 473 by the bolt 472.

The bolt 472 also serves in the form of a pivotal support for a pair of links 475. These links are mounted on stepped washers 476 through which bolt 472 is passed. More particularly, the washers 476 (Fig. 50) have an annular flange 477 of greater diameter than the actual bearing surface for the links, and the length of the surface 478 is slightly more than the width of the link. Accordingly when nut 479 on bolt 472 is turned up tightly, the washers 476 will operate to engage the slide-block 462 therebetween and effect a clamped relation between the block and post 468 in the base 473 thereof.

The links 475 serve to swingably support a pair of casters 480 (Figs. 48 and 49) which comprise the contact members of a glass retention device generally designated 481. According to the intended function of the fingers 454 and upon engagement of the glass therewith, certain switches, to be hereinafter described, are actuated to produce a rocking of the mandrel 455 and consequent displacement of the saddle-blocks 459 from the full-line position of Fig. 49 to a position such as is therein indicated in broken line. This will remove the fingers from their positions in the path of the glass strip and simultaneously exert a flexible pressure by means of casters 480 to maintain said strip in the aligned position into which it was brought by reason of its motion and the temporary retarding action of the said fingers.

The glass retention devices 481 act upon the glass surface by the casters 480 through the medium of springs 482 that are adjustably mounted so as to flexibly urge said casters downwardly. For this purpose, a bracket 483 is fixedly mounted on each saddle-block 459. The bracket has a horizontally directed apertured ear 484 through which is passed the upper end of a rod 485 that is threaded at each of its ends. The lower end of rod 485 is received in the upper surface of an axle block 486. This block is cross-drilled for supporting the axle 487 of casters 480. As best seen in Fig. 48, this assembly comprises, in addition to the casters, the immediate ends of links 475, bearing against the opposite ends of blocks 486, anti-friction washers 488 and suitable washers and nuts 489 threaded onto the ends of axle 487. If desired, the axle, medially of the block 486, can be accurately positioned by means of a set-screw 490. Above the block 486, the rod 485 carries a spring support cup 491 that is adjustably positioned thereon by nut 492. Beneath the ear 484, a second cup 493 is provided for supporting the upper end of the spring 482, while above the ear, a pair of washers 494 are provided to support lock-nuts 495 on the upper end of rod 485. Preferably the matching surfaces of the washers are concave-convex to compensate for slight angular motion of the rod. By means of nuts 495, the compression of spring 482 can be adjusted to suit the pressure required to maintain the casters against the glass surface when they are so positioned as will be seen in Fig. 49.

In order to rock the mandrel 455 and the parts mounted thereon between the indicated positions, a cylinder 496 is connected to said mandrel by means of an arm 497 as shown in Fig. 47. The cylinder is pivotally mounted by a bracket 498 carried by the framework 445 and the piston rod 499 thereof is provided with a suitable head connected to the adjoining end of arm 497 by pin 500. Thus as a strip of glass is delivered from the transfer unit R, the leading edge thereof will engage two or more of the retarding fingers 454 and become squared in advance of being scored. When such engagement is effected, the cylinder 496 is activated to rock the mandrel 455 to swing the fingers to an inoperative position and place the casters 480 on the surface of the strip to maintain its desired position.

As previously set forth in connection with the scoring heads of the primary scoring unit D, the scoring heads 457, of similar construction to the socring heads 161, are adapted to be moved along their supporting shafts 501 according to the desired length of panes or lites of glass whose width was determined by the spacing of the heads 161. For purposes of simplicity, the scoring heads 457 that are operatively positioned are intended to score the strip *f* along lines which are closely adjacent the side edges thereof. This is as shown in connection with the secondary scoring of strips *e* and *f* in Fig. 2; however, as therein pointed out, other spacings between the associated scoring heads of one row may be established to produce two or more panes or lites of glass of the final size of smaller dimension. As explanatory of this change, in the spacing between two or more scoring heads, the first strips *c* and *d* are described in connection with Fig. 2 as having been scored to obtain three panes of glass in addition to the salvage marginal portions. Therefore as the strip *f* passes beneath the scoring heads 457, indicated in full line in Fig. 45, it will be scored along the margins of its opposite sides and will remain a single pane of predetermined length and width.

On the framework 445 and outwardly of each shaft 449, there is provided a roll shaft to support the glass strip across the intervening spaces between the transfer unit R and then the transfer unit T. The roll shafts 501' are journaled in bearings 502 carried on channels 446. The roll shafts 501 and conveyor shafts 449 are operatively driven from a power unit 503 through a sprocket chain 504 which is trained about a sprocket 505 on one shaft 449 as shown in Fig. 47, as well as a sprocket (not shown) mounted on the output shaft of the power source. Also mounted on this shaft 449 is a sprocket 506 coupled to a sprocket 507 on the adjacent roll shaft 501 by sprocket chain 508. At the opposite end and side of the scoring unit framework, a similar sprocket 506 on the adjacent shaft 449 is coupled to a sprocket 507 on the associated roll shaft 501 by a chain 508.

When the glass strip *f* is carried outwardly from the slat conveyor 451 of the secondary scoring unit Q onto the rolls 509 of the transfer unit T, the following edge thereof actuates suitable controls which cause reversal of pressure in the cylinder 496 and consequently return the retarding fingers 454 to their original full line position of Fig. 49 to engage a succeeding strip of glass. Also, referring to Fig. 46, it will be seen that by the movable frame 510 of unit T the rolls 509 thereon will be located in their upper position to support a glass strip above the plurality of belts 511. Then when said strip is substantially centrally located in this transfer unit, the frame 510 will be lowered to enable the belts 511 to directively move the strip in a path of movement at a right angle to its former direction as shown in Fig. 51 and toward the run-out conveyor U.

The frame 510 is raised and lowered in a manner common to all of the transfer units and namely by a linkage 512 that is actuated by its associated cylinder. The rolls 509 on the frame are driven by a sprocket chain 513 from a source of power (not shown). On the other hand, the belts 511 are driven from a power unit 514 through a train of sprockets which also drive the roll shafts of the run-out conveyor U. Thus, as shown in Fig. 53 the power source 514 is coupled to a supply shaft 515 by sprocket chain 516. The shaft 515 is journaled in bearings 517 and has mounted thereon a magnetic clutch 518, a sprocket 519 and sprocket 520. The sprocket 519 is operatively connected to the drive for the belts 511 through sprocket chain 521, while sprocket 520 for short intervals of operation drives the roll shafts 523 of conveyor U through sprocket chain 522 at a higher rate of speed when the clutch 518 is engaged and which will hereinafter be described.

The run-out conveyor U is of similar construction to the conveyor O and the roll shafts 523 thereof are journaled in bearings 524 mounted in the framework 525.

In Fig. 1, it will be observed that the over-all length of these conveyors U will vary according to their positions of association between the several transfer units T and breaking units V; thus the conveyor U as illustrated in Fig. 51 may be taken as typical of the conveyors which deliver the scored glass strips to the secondary breaking units V.

*Secondary breaking unit*

The secondary breaking units V are in each instance identical to the main breaking unit K, the structure of which has been fully set forth in detail hereinabove. However, due to the differences in length of the small panes of glass to be finally obtained, the pairs of breaking rolls and their support frames may be positioned as shown in Figs. 42 and/or 43 or as a combination of both of these arrangements, that is to say, when only one pane is to be obtained, the pairs of rolls, for example, 360—361 and 330—404 may remain in a plane of horizontal axial alignment while the pairs of rolls 405—406 and 407—408 may be arranged as shown in Fig. 43 wherein it will be seen that the upper rolls 406 and 408 are out of vertical alignment and are positioned to break off the leading and following margins as the strip of glass moves therebetween. On the other hand, to obtain two or more panes as shown at r in Fig. 2, it may be found advantageous to position the frames at slightly opposed angles as in Fig. 42 in combination with the arrangement of rolls as in Fig. 43. Thus, by way of example, the frames 526 and 527 of the breaking unit V (Fig. 52) are horizontally aligned so that the pairs of breaking rolls 528—529 on frame 526 are axially aligned with the pair of rolls 530—531 on frame 527; however, roll 532 will be out of vertical alignment with roll 533 while roll 534 will similarly be positioned with respect to its mating roll 535 although on the opposite side of a vertical plane through the axes of the lower rolls. This manner of positioning will cause the leading margin to be broken along the first score line n (Fig. 2) as the strip passed between rolls 532—533 and then enters between rolls 534—535. Likewise, as the following margin of the strip passes between rolls 532—533, the said margin will be broken off along the second score line n. The angular positioning of frames 526 and 527 when necessary, is carried out in the same manner of operation as was described in connection with frames 325 and 326 (Figs. 36 to 39 inclusive). Also the longitudinal shifting of the base members for rolls 533 and 535 is obtained by means similar to the structure of Figs. 40 and 41.

The support rolls 536 of frame 526 as well as the support rolls 537 of the frame 527 in addition to the rolls 528, 530, 532 and 534 are driven by means of an interrelated association of power members from a source adjacent the takeoff unit X. This power take-off, as shown in Figs. 54 and 55, consists of a motor 538, mounted beneath the conveyor X and which drives a gear reduction unit 539. Through conventional gearing, the unit 539 is constructed to translate the power from its input shaft 540 (Fig. 56) to its output shafting 541 which is mounted substantially at right angles thereto. One side of the shafting is connected by coupling 542 to a line shaft 543, that is journaled at spaced points in bearings 544. At its opposite end from coupling 542, shaft 543 is joined to the input shaft of a gear unit 545 by coupling 546. The output shaft of unit 545 is operatively connected to a sprocket 547 on the shaft 548 of the last roll 537 on frame 527 by sprocket chain 549. As best seen in Fig. 54, on the opposite end of the shaft 548, another sprocket 550 is mounted which sprocket drives a sprocket chain 551 entrained about sprockets on the shafts of rolls 530, 532, 534, and 537. The shaft of roll 530 also carries a sprocket 552 at its opposite end which drives a sprocket chain 553 entrained about sprockets mounted on the shafts of rolls 528 and 536 of frame 525. The shaft of entry roll 536, at its opposite end also has mounted thereon a sprocket 554 operatively connected to the last shaft 523 of the run-out conveyor U through an over-running clutch 555. The purpose of this clutch is to drive the plurality of roll shafts at the rate of nominal travel for the glass strips through the units U, V, W and X, except when a strip is being received on the entry end of run-out conveyor U at which time the magnetic clutch 518 is activated to temporarily accelerate the rate of movement of the glass sheets.

The roll shafts 523 are accordingly driven by chain 522 from sprocket 556, sprocket chain 557 and sprocket 554 associated with overrunning clutch 555. Clutch 555 is mounted on the shaft of first roll 536 which is driven by sprocket chain 553 from sprocket 552. This sprocket is mounted on first roll 537 which at its opposite end carries sprocket 552' which is driven generally by sprocket chain 551 from sprocket 550 on shaft 548 which in turn is operatively driven by chain 549 from line shaft 543 through gear unit 545. The motor 538 thus motivates the run-out conveyor U, the breaking unit V and, as will be described hereinafter, the washing unit W and take-off conveyor X.

*The washing unit*

As shown in Figs. 52, 54, 55 and 56, the washing and air drying of the glass panes in their final size is accomplished while said panes are passed between feed rolls, brush rolls and air jets of the unit W. As will be seen in these figures, the unit has a framework 559 of channels 560 carried on vertically disposed channels 561. The washing area of this framework is substantially enclosed by a housing 562 that is comprised of vertically disposed walls 563 and a top wall 564; the walls 563 all terminating at their lower extremities within a drainage area 565. The walls 563 and 564 are suitably supported by means of vertically and horizontally disposed channels 566 and 567, the channels 567 also serving to carry the upper water supply pipes 568. Lower supply pipes 569 are supported on the framework 559.

The feed rolls 570 are arranged in vertically aligned pairs (Fig. 52) and in sets of two pairs are disposed in front of, between and at the rear of pairs of brush rolls 571. Each of rolls 570 has a tubular shaft 572 that is covered with a peripheral rubber surface. As shown in Fig. 54, one end of each shaft is journaled in bearings contained in a mounting bracket 573. At their opposite ends, each shaft 572 is similarly journaled in mounting bracket but projects therethrough and at its end is connected to a multiple gear box 574 by means of a double universal-joint unit 575. The gear boxes 574 are mounted on the framework 559 and contain a gear train, as shown in Fig. 59, which comprises gears 576 on shafts 577, connected outwardly of each gear box to the universal-joint units 575; drive gear 578 on shaft 579 on which is also mounted worm gear 580. Component worm 581 is mounted on shaft 582 and the shafts 582 between gear boxes 574 are united by couplings 583.

As herein disclosed, provision is made for driving the interjoined shafts 582 from the line shaft 543 by means of a sprocket chain 584 entrained about sprocket 585 on shaft 543 and sprocket 586 on the extended shaft 582 from one outwardly disposed box 574. Thus the feed rolls 570 are adapted in their plurality to be driven at a common rate of speed while the uppermost roll of each pair is adapted to move vertically during movement of glass therebetween through the medium of the universal-joint units 575.

On the other hand, the shafts 587 for brush rolls 571 are mounted at their ends in vertically adjustable bearings 588. As shown in Figs. 57 and 58, these bearings in each instance, are carried in a bracket 589 mounted on the framework 559 which is equipped with slide ways 590 for the bearing blocks 591 and 592. In the case of each lower shaft 587, the bearing block 591 is adapted to be vertically moved along slide ways 590 by means of a pair of adjusting screws 593 that are supported in the cap plate 594 for bracket 589. Medially between screws 593 is a threaded rod 595 fixedly connected to bearing block 592 for the upper shaft 587 of each pair of brush rolls 571. The rod 595 is vertically adjusted by means of nut 596.

One end of each shaft 587, or at the left hand side of the unit as viewed in Fig. 56, is connected to a gear box 597 through a double universal-joint unit 598. Referring to Fig. 54, it will be seen that the drive shafts 599 for gear boxes 597 are suitably interjoined and driven in common from motor 600.

Proceeding through the washing area, the glass pane emerges from the housing 562 and enters a hood 601 wherein are located a pair of air pipes 602. The jet nozzles of pipes 602 are disposed so as to sweep the upper and lower surfaces of the pane and direct the water film therefrom to the drain area 565. From the last pair of feed rolls 570, the pane of glass is supported on a plurality of rubber-surfaced rolls 603, the shafts of which are journaled in bearings 604. Sprockets on the shafts 603 are driven in common by means of sprocket chain 605 which is operatively connected to the power-source for the take-off conveyor X.

The take-off conveyor X from which the glass panes of the finally dimensional size are manually removed is similar in structure to the run-out conveyor U and as herein disclosed comprises a framework 606 of longitudinally and transversely disposed channels 607 and 608 carried by vertically disposed standards 609. Roll shafts 610 are journaled at their ends in bearings 611 mounted on channels 607 and at one of these ends are equipped with sprockets 612. The sprockets are driven by sprocket chain 613 which is also entrained about sprocket 614 on the output shaft of a gear reduction unit 615. This unit is operatively driven by motor 538 through the reduction unit 539 to which the input shaft of unit 615 is connected by coupling 616.

The sprocket chain 613 thus provides a power source for the plurality of roll shafts 610 with the exception of the last shaft 617 which operates as an idler. On the first roll shaft adjacent the washing unit W and at its end opposite the sprocket 612, there is a second sprocket 618 about which sprocket chain 605 is entrained to drive the support rolls 603 of the said washing unit.

*Complete operation of the cutting machine*

It is now believed that the efficiency of the cutting machine will have become apparent and that the successively moving sheets in the delivery section B pass through the main squaring and scoring unit D and continue thereafter into the trimming unit E. Upon reaching the transfer unit F, each sheet S, so scored, is diverted in its path of movement to a path at substantially a right angle thereto. Continuing into the main breaker unit K, the scored lines in the sheet then extend transversely to the movement of the sheet which produces a plurality of glass strips such as c, d, e and f. These individual strips, as they emerge from the main breaking unit K, will be carried through the distributing section C until they reach an area of selection at which point they will be moved laterally from the section C and onto the various conveyors O and P. Subsequently, each strip is again scored in secondary scoring unit Q, further broken to obtain the final dimensions in the unit V and are then washed as at W before being removed from the take-off conveyors X of the cutting machine.

In order that the delivery of successive sheets of glass can be automatically controlled throughout the cutting machine and that the separated strips therefrom can be likewise distributed in an automatic sequence of operation, mention has been made throughout the specification to certain controls and/or control switches which are engaged by a glass sheet to effect some change in its movement. While not structurally shown throughout the drawings, it will be understood by those acquainted in this art that by suitable bridging members these switches can be arranged at strategic positions in the respective units of the cutting machine to be thus engaged as the sheet arrives at designated points during its movement. In order that these various controls can be suitably identified and their respective functions adequately described, reference is now made to Figs. 61 to 65 inclusive wherein the control circuits for each of the various units of the cutting machine are diagrammatically illustrated.

As a full size blank or sheet of glass S enters the transfer unit G and is carried by belts 12, it closes micro-switch 631 which by line 632 from one circuit line 633 actuates a timer 634. The timer is adjusted to activate coil 635 of relay switch 636 to break the contacts 637—638 to open service lines 639—640 to motor 641 when the sheet has reached suitable stop means in the central area of the unit; to energize brake 49 for motor 641 upon closure of line 642 at contacts 643 and activate coil 644 of relay switch 645 by line 646 through closed contacts 647. Switch 645 closes contacts 648 and by line 649 causes reversal of four-way solenoid valve 650 to direct pressure through pipe 651 to cylinder 63 thereby elevating frame 11 and rolls 15 thereon; this operating through linkage 58 to lift the sheet from belts 12. As frame 11 is raised, a micro-switch 652 by line 653 from circuit line 633 activates coil 654 of relay switch 655 to close service lines 639—640 to motor 656 of power unit 86 by contacts 657—658 and also energizes timer 659 by branch line 660. Timer 659, as the sheet S is moved laterally on transfer unit G, is adjusted so that by line 661 it energizes coil 662 of relay switch 655 to stop motor 656 of power unit 86 as service lines 639—640 are opened at contacts 657—658; timer also reverses valve 651 by line 663 so that by pipe 664 the cylinder 63 will be operated to lower frame 11 and as it resets, by line 665 operates coil 666 of relay switch 636 to reestablish service lines 639—640 at contacts 637—638 to motor 641. The sheet S will thus be received on and removed from transfer unit G along paths of movement at substantially a right angle to one another, before being carried laterally toward and onto the conveyor 17. Coils 635, 644, 654, 662 and 666 as well as brake 49, timers 634—659 and valve 650 are generally connected to the opposite circuit side by line 667.

The motor 95 for conveyor 17 by the sprocket chain 93 drives the roll shafts 91 and is operated from service lines 639—640 through contacts 668—669 of relay switch 670. The coil 671 of switch 670 is not normally energized and operation of motor 95 is substantially continuous except when controls in main delivery section B are operated to halt the movement of glass and as brake 672 is activated through contacts 673 of switch 670 by line 674 from circuit line 633.

As previously noted in the specification and in moving in the direction of arrow 16, the glass sheet S is received on rolls 15 of transfer unit H while the frame 11 is elevated and said sheet will either be removed along direction of arrow 20 to main delivery section B or, continuing in direction of arrow 16, be removed to conveyor J which action will direct the sheet or sheets from further movement through the cutting machine. However, under normal circumstances of operation and as a sheet enters the central area of transfer unit H, it operates a micro-switch 675 to close line 676 from circuit line 633 and through normally closed contacts 677 of relay switch 678. Circuit of line 676 activates timer 679 to energize coil 680 of relay switch 681 by line 682 thereby opening service lines 639—640 at contacts 683—684 to halt motor 685, which operates rolls 15, when sheet is moved into engagement with a vertically movable stop means, generally indicated at 686, in substantially the central area of the unit H. Through closed contacts 687 of switch 681 a line 688 from circuit line 633 actuates brake 689 to halt motor 685; also simultaneous opening of contacts 690 and closing of contacts 691 reverses the current flow of line 633 from line 692 to one side of valve 693 to line 694 to the opposite side thereof. This reversal of valve 693 operates to change the direction of pressure from pipe 695 to cylinder 696 to pipe 697 whereby frame 11 will be lowered to deposit the glass sheet on the plurality of belts 12 of transfer unit H.

In addition to timer 679, micro-switch 675 by line 698 activates timers 699 and 700 which control the operation of motor 108 of conveyor J. However, unless relay switch 678 is operated by a manual control means, the sheet immediately proceeds from the transfer unit H to the conveyor 19 of main delivery section B.

As the frame 11 descends, a micro-switch 701 is actuated and line 702 from circuit line 633 through closed contacts 703 of switch 678 activates timer 704 to energize coil 705 of relay switch 706 by line 707 thereby closing service lines 639—740 at contacts 708—709 to motor 710 for driving belts 12. Timer 704 is adjusted to limit operating period of motor 710 and until the sheet S has been carried forwardly in the direction of arrow 20 onto the conveyor unit 19. At the end of its active period, timer 704 by line 711 energizes coil 712 of switch 681 to re-open contacts 687 to deenergize brake 689 and open contacts 691 while closing contacts 690 to produce reversal of valve 693 and thereby return the frame 11 to its uppermost position. The rolls 15 resume their operation as re-closed contacts 683—684 reestablish service lines 639—640 to motor 685. Coils 680, 705, and 712 as well as brake 689, timers 679—704 and valve 693 are generally connected to the opposite circuit side by line 667.

The glass sheet S accordingly is carried from its initial point of entry onto transfer unit G in the direction of arrow 14; outwardly from said unit in the direction of arrow 16 and through the conveyor 17. On the transfer unit H, the sheet is normally carried therefrom in the direction of arrow 20 toward and onto conveyor 19 of the main delivery section B. In the event that a glass sheet is found to be objectionable or is intended to be placed in temporary storage, a manual switch 713 is operated before the sheet enters the central area of transfer unit H and is engaged by the stop means 686. Switch 713 by line 714 from circuit line 633 energizes coil 715 of relay switch 678 to open contacts 677 and 703; contacts 677 acting to render particularly micro-switch 675 ineffective. Switch 713 also by line 716 energizes a spring-loaded solenoid 717 which is so connected to the stop means 686 as to cause retraction of said stop means from the path of the oncoming glass thereby permitting continued movement of the sheet across the rolls 15 and onto the endless conveyor belt 103 of the unit J. Opened contacts 703 of switch 678 render micro-switch 701 inoperable to activate timer 704 which will prevent starting of the belt motor 710. Timer 699 is adjusted to time an interval before the motor 108 starts while timer 700 is timed to stop said motor. Timer 699 accordingly by line 718 to coil 719 of relay switch 720 causes closure of contacts 721—722 to complete service lines 639—640 to motor 108 and by contacts 723 through line 724 connecting to line 716, hold solenoid 717 energized. Upon completion of period of timer 700, line 725 of coil 726 of switch 720 opens contacts 721—722 to halt motor 108. Also upon cessation of the normal interval of timer 700, opened contacts 723 will also permit spring-loaded solenoid 717 to reverse and reposition the stop means 687 in the transfer unit H. Coils 717, 719 and 726 as well as timer 699—700 are connected to the opposite circuit side by line 667.

However, if a sheet of glass remains on and inadvertently has not been removed from the take-off end of conveyor belt 103, an emergency, normally closed micro-switch 727 is held open. This switch maintains line 633 through line 728 to one side of each of the timers 699—700 and when held open renders them inoperable to prevent operation of the conveyor motor 108.

Normally the glass sheets will proceed into the main delivery section B; initially to the conveyor 19, thence on conveyor 130 and then sequentially on the several conveyors 117 before being received on the primary squaring and breaking unit D. These several conveyor units are interrelated by limit switches by means of which various speeds of operation may be attained and line shut-downs can be automatically produced in the event that an emergency has arisen in other sections or units of the cutting machine. Thus, where a glass sheet is completely received on the entry area of conveyor 19, it (Fig. 62) operates micro-switches 729—730; switch 729 by line 731 from circuit line 633 actuating a motor control 732 to reduce speed of the conveyor motor 733 which normally operates at an accelerated speed comparable to the speed at which belts 12 of transfer unit H are operated. Motor control 732 is interposed in one of the service lines 639—640 which are connected to motor 733 through contacts 734—735 of relay switch 736. Switch 730 is effective to energize coil 737 of switch 736 only when the normally open contacts 738 of relay switch 739 are closed to complete line 740 from circuit line 633 through switch 730 to said coil.

When completely received on the exit end of conveyor 19, the glass sheet engages micro-switch 741 to operate motor control 732 by line 742 from circuit line 633 thereby returning motor 733 to "fast" speed for receiving a subsequent sheet from transfer unit H. Line 742 and branch 743 also connects micro-switch 741 to motor control 744 of motor 745; said control being interposed in one of the service lines 639—640 which through contacts 746—747 of relay switch 739 are connected to said motor. Motor 745 operates power unit 129 which drives shafts 122 in the exit end of conveyor 19 and motor control 744 reduces the speed of this motor from "fast" to "slow." An interlocking micro-switch 748 is also connected to motor control 744 by lines 743 and 749 to hold motor 745 at slow speed until the trailing end of the sheet has been moved from beneath switch 748. Motor 745 then automatically returns to "fast" speed.

From the conveyor 19, sheets of glass are, at sequentially spaced intervals, received on and moved forwardly by the belt 131 of conveyor 130. The operating motor 750 for this conveyor is connected to service lines 639—640 through closed contacts 751—752 of relay switch 753 and, during normal flow of glass, operates continuously. Coil 754 of relay switch 753, however, is subject to the control of a limit switch 755 through line 756 and upon the condition of normally open contacts 757 of relay switch 758; said limit switch 755 being located in the next adjoining conveyor unit 117.

The rolls 122 in the entry end of this conveyor 117 are operated by the associated power source 128 which is driven by motor 759, the service lines 639—640 for which are connected through contacts 760—761 of relay switch 758. As previously noted, the normally open contacts 757 are adapted when closed to complete the line 756 from micro-switch 755 to coil 754 of relay switch 753, when coil 762 of switch 753 is energized. In turn, the motor 763, which drives the power source 129 associated with rolls 122 in the exit end of conveyor 117, is supplied from service lines 639—640 through contacts 764—765 of relay switch 766. This relay also carries normally open contacts 767 that are adapted when closed, to complete line 768 from circuit line 633 through micro-switch 769 in the exit end of the conveyor 117, and through a micro-switch 770 interposed in the line 768 between the coil 762 of relay switch 758 and contacts 767.

Accordingly in the event that the motor 763 of the conveyor 117 is halted by stoppage of the advancing glass sheets on a succeeding conveyor, the coil 771 of relay switch 766 will effect not only opening of contacts 764—765 but closure of contacts 767 to complete line 768 pending closure of micro-switch 770.

Motor 759 in the entry end of the conveyor 117 will thus continue to drive the associated power unit 128 until a sheet of glass advancing into this area closes micro-switches 775 and 770. Switch 770 will then complete line 768 to coil 762 to open contacts 760—761 of switch 758 and close contacts 757. Open contacts 760—761 break service lines 639—640 to halt motor 759 while closed contacts 757 complete line 756 through micro-switch 755 to coil 754 of relay switch 753.

This relay switch operates to open contacts 751—752 and thereby the service lines 639—640 to halt motor 750 of the conveyor 130. By line 772 and through closed contacts 773 of switch 753, action of micro-switch 775 and line 756 will effect the actuation of coil 744 of relay switch 739 to open service lines 639—640 at contacts 746—747 and halt motor 745 at the exit end of conveyor 19. And, when a succeeding sheet of glass is received in the entry end of this conveyor, switch 730 will be operated and motor 733 will be halted in the same manner. Coils 737, 754, 762, 771 and 774 are conventionally connected to the opposite side of the circuit by line 667.

This will cause the stoppage of glass into the main delivery section B. Also it may be found preferable to extend line 740 by branch 775 to lines 714 and 716 (Fig. 61) which will operate switch 678 to temporarily shunt out the effectiveness of switches 675—701; while by branch 776 to line 698 the timers 699—700 will be activated to operate the conveyor J in the manner above described. This will prevent entry of glass sheets into the delivery section B while it is halted.

Since the actual number of conveyors 117 can be varied to suit the desired length of main delivery section B or the area length of conveyor sections from conveyor 130 to the primary squaring unit D, there are herein shown, by way of example, two of the conveyors 117; one (117A) immediately adjoining the conveyor 130 (Fig. 62) and one (117B) immediately preceding the unit D (Fig. 63). Now the operation of this last conveyor 117B is controlled to supply the squaring area 132 of the unit D with sheets of glass at regularly spaced intervals of time and to accomplish this purpose, a timer is provided which creates a delay in operation of the conveyor as a sheet reaches the exit end thereof. By means of suitably interrelated switches, the effective action of this timer will be reflected throughout the entirety of the conveyor system and the glass sheets advanced from one conveyor to the next as preceding sheets are supplied to the primary scoring unit D. Thus, in Fig. 63, there are shown the motors for operating the rolls 122 in the entry and exit ends of the conveyor 117B. Motor 777 for power unit 128 in the entry end is connected to service lines 639—640 through contacts 778—779 of relay switch 780 having coil 781. Switch 780 also carries normally open contacts 782. Likewise motor 783 for the power unit 129 in the exit end of conveyor 117B is connected to service lines 639—640 through contacts 784—785 of relay switch 786 having coil 787. Switch 786 also carries normally open contacts 788.

Now there is also shown a micro-switch 789 through which a line 790 may be completed from circuit line 633 to the timer 791. The timer by line 792 is adapted to energize the coil 787 of relay switch 786, the contacts 784—785 of which connect service lines 639—640 to motor 783 for power unit 129 which drives the shafts 122 in the exit end of the conveyor 117B.

Accordingly when a glass sheet reaches the exit end of the last conveyor 117B, it activates switch 789 to initiate the timing period of timer 791 which may, for example, be for ten to twenty seconds. During this interval, timer 791 by line 792 actuates coil 787 of relay switch 786 to open service lines to motor 783 thereby stopping shafts 122 in this exit area. In turn, micro-switch 793 in this area is rendered effective, upon closure of contacts 788 and by line 794, to actuate the coil 781 of relay switch 780 to halt motor 777 when a subsequent sheet is completely in the entry area of conveyor 117B and closes micro-switch 795 located in line 794. Likewise contacts 782 of relay switch 780, presently closed, will complete line 796 from circuit line 633 to render micro-switch 797 effective. This switch, when closed by engagement with a sheet of glass, is adapted to energize coil 771 of relay switch 766 and open the service lines of motor 763 which drives the power unit 129 of conveyor 117A (Fig. 62).

Operation of relay 766 closes contacts 767 and consequently the periodic stoppage of the conveyors 19, 130 and 117 will be automatically and periodically carried out to control the supply of glass to the primary scoring unit D as has been previously described.

In the event of an emergency which will require stopping of the main delivery section B, a manual switch 798 is provided to supply a line 799 from circuit line 633 through contacts 800 thereof to micro-switch 801 that is normally ineffective but is operated substantially simultaneously with switch 789. The normally closed contacts 798' of switch 798 by line 799' operate to hold coil 800' of relay switch 802 energized thereby maintaining the contacts 803 thereof in closed condition. These contacts complete line 804 between timer 791 and line 667. Switch 801 by line 805 is connected to coil 806 of relay switch 807. The contacts 808—809 of this switch connect service lines 639—640 to motor 810 which drives the gear reduction unit 144 of the primary squaring and scoring unit D. However, when motor 810 is halted by the energization of coil 806 and opening of contacts 808 and 809, a simultaneously completed line 811 from line 805 to coil 812 of relay switch 802 operates to open contacts 803 and close contacts 813. Contacts 803 break one supply line 804 serving timer 791 to render the same inactive while contacts 813 connect a line 814 from micro-switch 815 to line 792. Closure of switch 815, which is normally ineffective and occurs substantially at the same time as switches 789 and 801, will reflect the temporary stoppage of the scoring unit D since lines 792—814 will complete a line to coil 787 of relay switch 786 to halt motor 783 in the exit end of the adjoining conveyor 117B.

Accordingly, when micro-switch 801 is effective, it will produce the same sequence of motor control as that previously described in the connection with the timer 791 which periodically produces the stopping of each of the conveyor motors in sequence. Although not shown, in the event of a complete shut-down of the main delivery section B, the transfer units G and H and conveyor 17 of the delivery section A would be similarly and automatically operated.

As each sheet S fully enters the squaring area 132 of the unit D, a micro-switch 816 is engaged which will complete line 817 from circuit line 633 to coil 818 of a spring-loaded relay switch 819. Actuation of this switch opens contacts 820 and closes contacts 821 whereby a line 822 will be completed to a four-way solenoid valve 823. This valve is connected by pipe 824 to the cylinder 154 (Fig. 16) which operates the transversely movable carriage 148 to engage one longitudinal side of the glass sheet S by rollers 158 and shift the same laterally into contact with stationary rollers 159 along the opposite longitudinal side of the sheet. Preferably a second micro-switch 825 is located near the exit end of the squaring area and is interlocked with switch 816 to hold coil 818 energized until the trailing end of the sheet has been moved from the squaring area. When switch 825 is disengaged, reversal of switch 819 opens contacts 821 and closes contacts 820 to complete line 826 from circuit line 633 to valve 823. This will reverse valve 823 so that by pipe 827 to cylinder 154 the change in direction of pressure will cause frame 148 to be returned transversely to its original position.

Passing through the scoring area 133 of unit D, the glass sheet is carried forwardly on shafts 141 beneath the then effective scoring heads 161. Roll shafts 138 and the alternately arranged gears 146 and 147 are driven generally from the gear reduction unit 144. This power source is operated by motor 810. The sheet is then received in the entry area 261 of the edge trimming unit E.

As hereinbefore described, the rolls 254 of the entry area of this unit of the cutting machine are driven at variable rates of speed whereby a glass sheet is received under a slow rate of speed and, when completely on rolls 254, is rapidly conveyed to the breaking area 265 after which rolls 254 resume their slower speed of operation. For this purpose and as shown in Fig. 63, a micro-switch 828 is engaged by the advancing sheet of glass and by line 829 from circuit line 633 activates motor control 830 to increase speed of motor 831 for power unit 263. A micro-switch 832 is then engaged by the leading end of the sheet when said sheet is entirely supported by rolls 266 in the edge trimming area 265 of the unit E.

The rolls 266 are driven by power source 271 which is operated by motor 833. This motor is operating at slow speed when the glass sheet is received on the rolls 266 and when micro-switch 832 by line 834 from circuit line 633 reverses motor control 830 to slow the speed of motor 831, the switch 835 by line 836 from line 633 activates motor control 837 for motor 833 to increase the speed thereof. The sheet then passes between the pairs of rolls 294—297 and 298—299 whereby the longitudinal marginal edges b will be trimmed therefrom along the outermost lines scored in the unit D. The motor 831 is connected to service lines 639—640 through contacts 838—839 of relay switch 840 having coil 841 while motor 833 is similarly connected through contacts 842—843 of relay switch 844 having coil 845. Coils 841 and 845 may be energized by suitable switches to halt motors 831—833 and motor control 837 may be automatically self-resetting to return motor 833 to slow.

As previously noted in the specification, the glass sheet S, in moving outwardly from the trimming unit E and in the direction of downwardly directed arrow (Fig. 34), is received on rolls 321 of transfer unit F since the frame 320 is then elevated and said sheet will be removed along direction of the rightwardly directed arrow to main breaker unit K from which the several glass strips c, d, e and f will be removed to first transfer unit L which action will direct the strips further through the cutting machine. Thus under normal circumstances of operation and as a sheet enters transfer unit F, it operates a micro-switch 846 to close line 847 from circuit line 633. Circuit of line 847 activates timer 848 to energize coil 849 of relay switch 850 by line 851 thereby opening service lines 639—640 at contacts 852—853 to halt motor 854 which operates rolls 321, when sheet is moved into engagement with stop means suitably positioned in substantially the central area of the unit F. Through closed contacts 855, a line 856 from circuit line 633 actuates brake 857 to halt motor 854; simultaneously opening of contacts 858 and closing of contacts 859 reverses the flow of service from line 633 through line 860 to one side of valve 861 to line 862 to the opposite side thereof. This reversal of the valve operates to change the direction of pressure from pipe 863 and cylinder 864 to pipe 865 and said cylinder whereby frame 320 will be lowered to deposit the glass sheet on the plurality of belts 322 of transfer unit F.

Figure 64:
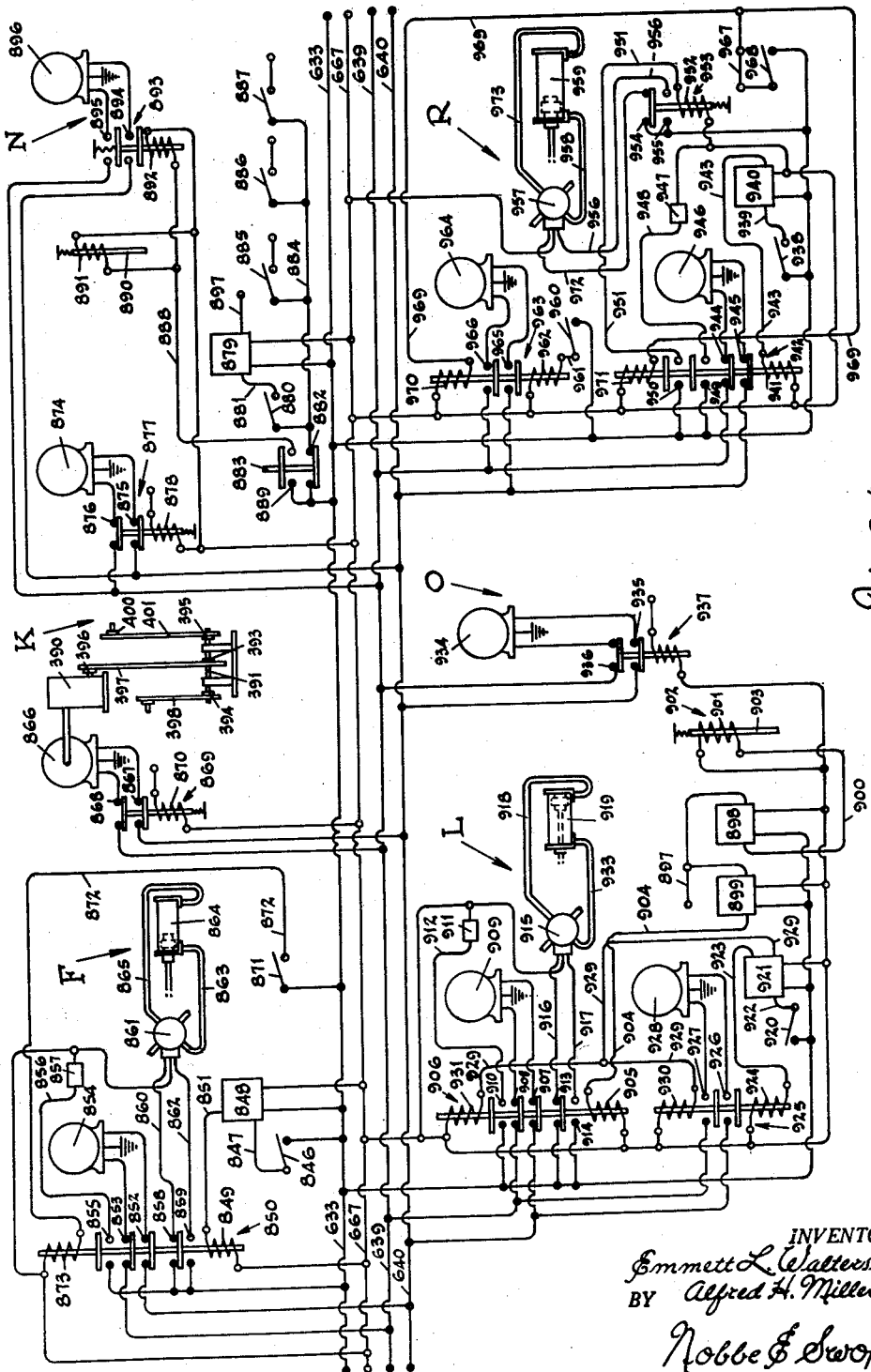
Fig. 64 is a diagrammatic view of the control circuits in the entry end of the distributing section of the machine.

The belts 322 broadly are driven by motor 866 which is connected to the service lines 639—640 through contacts 867—868 of relay switch 869 having coil 870. More particularly, motor 866 operates power unit 390 which through sprocket chain 396 drives shaft 391 which carries sprockets 393, 394 and 395; sprocket 393 being interconnected with output sprocket 396 by chain 397 (Figs. 35 and 64). Sprocket 394 by chain 398 drives the belts 322 in a manner fully set forth in connection with the description of transfer unit G (Figs. 4, 5 and 6) wherein the belt sheaves 29 were described as being mounted on shafts 28 that were interjoined by couplings 30 and driven by sprocket 32 from power source 31.

The motor 854 for the rolls 321 of transfer unit F remains inactive until a micro-switch 871 is released by the trailing end of the sheet as the sheet bodily is received in the main breaking unit K. Switch 871 by line 872 activates coil 873 of relay switch 850 and this will open contacts 855 to de-energize motor brake 857; start motor 854 upon closure of service lines 639—640 at contacts 852—853 and open contacts 859 while closing contacts 858. Closure of contacts 858 re-establishes line 860 to valve 861 whereby cylinder 864 with pressure through pipe 863 will motivate linkage 58 to raise the frame 320 of the transfer unit F to position the rolls 321 for reception of a subsequent sheet thereupon.

As previously mentioned, the rolls 329 and 360 on the frame 325 are driven by sprocket chain 401 which is entrained about the sprocket 395 on shaft 391 and sprockets 400 on the roll shafts 363. On the other hand, the rolls 330, 405, 407 and 409 on the frame 326 (Fig. 42) are driven by sprocket chain 410 which is entrained about the several sprockets 409' and the sprocket on the power unit 410'. This unit is operated by motor 874 which receives service lines 639—640 through contacts 875—876 of relay switch 877 having coil 878.

As the several strips c, d, e and f pass from the breaker unit K, they activate a counting timer 879 by means of a micro-switch 880 through line 881 from normally closed contacts 882 of manually operated emergency switch 883. Contacts 882 are connected to circuit line 633. Timer 879 is adapted to "count" the number of glass strips passing into the first transfer unit L and, for the present purposes of illustration, is adjusted to activate the said transfer unit as the fourth strip f engages switch 880.

Also supplied by line 884 are micro-switches 885 and 886. Similarly to the switch 880 in the first transfer unit L, these switches are located in the second and third transfer units L that are arranged in the distributing section C of the cutting mechaine as shown diagrammatically in Fig. 1 of the drawings. Operatively, they function in the same manner as switch 880 to activate a counting timer associated with each of the related transfer units to the end that the first strip c will continue through this section of the machine; engaging said switches 885 and 886 in sequence and then engaging micro-switch 887 to initiate operation of the last or fourth transfer unit L and as indicated at *g* in Fig. 2. The second strip *d* will engage switch 885 and upon engagement with switch 886 will cause operation of third transfer unit L to produce its removal on the associated conveyor O as shown at *h* in Fig. 2. The third strip *e* likewise engages switches 880 and 885 which switch starts the operation of the second transfer unit L as at *j* in Fig. 2 to cause the removal thereof onto associated conveyor P.

In the event of reject sheets or separated strips thereof becoming reject upon entering distributing section C, switch 883 may be operated to open line 884 and close a line 888 at contacts 889 which operates to raise the positive stops 890 in the last transfer conveyor and to start the motor of the reject conveyor N. Preferably the timer 879 is of the type which when interrupted upon operation of switch 883 will automatically reset itself. For this purpose, the line 888 is connected to a spring-loaded solenoid 891, which is adapted to raise the stop 890, and also to the coil 892 of relay switch 893. Contacts 894—895 of this switch complete service lines 639—640 to the reject conveyor motor 896. Obviously when line 884 is disconnected at switch 883, the micro-switches 880, 885, 886 and 887 are inoperable and the reject strips of glass will progressively pass over all of the transfer units L and interposed conveyors M until they reach conveyor N. Upon restoration of line 884 at contacts 882 of switch 883, the above-described switches 880, 885, 886 and 887 will resume their control facilities.

In passing from main breaker unit K onto the rolls 425 of transfer unit L, the first strip of glass in sequence operates a micro-switch 880 to initiate the operation of the counting timer 879 through line 881 from supply line 884 connected through manual switch 883 to circuit line 633. The glass sheet accordingly is carried from its initial point of entry onto transfer unit F at substantially a right angle to its former movement.

During normal operation, the counting timer 879 is adjusted according to the number of strips that will be distributed along the section C and to become active as the last strip passes over switch 880. By line 897, timer 879 activates timers 898 and 899; timer 898 by line 900 operating coil 901 of a spring-loaded solenoid 902 to raise the positive stops 903 in transfer unit L. As the last strip emerges from the breaking unit K, timer 898 is adapted to become inactive, allowing solenoid to lower stops 903 into the path of the advancing glass strip *f*.

The timer 899 is connected by line 904 to coil 905 of relay switch 906 and is adjusted, as the glass strip *f* engages stops 903, to energize said coil to open service lines 639—640 at contacts 907 and 908 for motor 909 which generally drives the rolls 425. Contacts 910 of switch 906 when closed energize brake 911 by line 912 from circuit line 633 while contacts 913 and 914 are, respectively, opened and closed to reverse the direction of pressure through valve 915. Contacts 913 are connected to one side of valve 915 by line 916 and contacts 914 are similarly connected by line 917 to said valve so that, when closed will operate to reverse said valve. Then, through pipe 918 pressure will be directed to cylinder 919 to produce lowering of the transfer frame 424. Simultaneously, micro-switch 920 will connect timer 921 to circuit line 633 through line 922. This timer is adjusted to control the period of time during which the glass strip is to be removed to the adjoining conveyor O. Timer 921 is then connected by line 923 to coil 924 of relay switch 925, switches 926—927 of which connect service lines 639—640 to motor 928 which generally drives the plurality of transfer belts 428. Upon becoming inactive, timer by line 929 to coil 930 of switch 925 and coil 931 of switch 906 reverses switch 925 to open the contacts 926—927 thereof and halt operation of belt motor 928 while reversal of switch 906 will deenergize brake 911, start motor 909 and, upon reversal of valve 915 by line 917, restore pressure to pipe 933 to cylinder 919 and thereby raise the frame 424 for rolls 425. Coils 901, 905, 924, 930 and 931 as well as brake 911 and valve 915 are connected to the opposite circuit side by line 667. As the glass *f* is passed onto conveyor O, the timer 879 will reset to monitor on a subsequent plurality of glass strips; the rolls 425 will have been elevated and the stops 915 raised to permit movement of the first strips *c*, *d* and *e* through the transfer unit L before the last strip *f* is halted thereon.

The power source 435 for the conveyor O, and conventionally for the other and similar conveyors O and P, is driven by a motor 934 which is operated from service lines 639—640 through contacts 935—936 of relay switch 937. Normally the conveyor O operates continually and the motor 934 therefor is only stopped when the advancing movement of glass is temporarily halted. At the end of this conveyor, the glass strip is received on the plurality of belts 441 of the transfer unit R.

As the strip of glass *f* enters the transfer unit R and is received by belts 441, it closes micro-switch 938 which by line 939 from one circuit line 633 actuates a timer 940 to activate coil 941 of relay switch 942 by line 943 which will produce separation of contacts 944—945 to open service lines 639—640 of motor 946; energization of brake 947 for motor 946 upon closure of line 948 at contacts 949 and close contacts 950. Contacts 950 complete line 951 from supply line 633 to coil 952 of relay switch 953 to open contacts 954 and close contacts 955. Contacts 955 by line 956 will cause reversal of four-way solenoid valve 957 to direct pressure through pipe 958 to cylinder 959 thereby elevating frame 437 and rolls 438 thereon, this operating to lift the strip *f* from belts 441. As frame 438 is raised, a micro-switch 960 by line 961 from circuit line 633 activates coil 962 of relay switch 963 to close service lines 639—640 to motor 964 at contacts 965—966. Now, as the glass strip enters the secondary scoring unit Q, it opens micro-switch 967 and closes micro-switch 968 which supplies switch 967 from circuit line 633 by line 969. When the trailing edge of the sheet allows switch 967 to reclose, line 969 will be completed to coil 970 of relay switch 963 to stop motor 964 as service lines 639—640 are opened at contacts 965—966; and operates coil 971 of relay switch 942 to re-establish service lines 639—640 at contacts 944—945 to restart belt motor 946. Open contacts 949 of switch 942 de-energizes brake 947 while open contacts 950 de-energize coil 952 to allow contacts 955 to open and contacts 954 to reclose. Now by line 972 valve 957 will be reversed to supply cylinder 959 through pipe 973 thereby lowering the roll frame 437. Coils 941, 952, 962, 970 and 971 as well as timer 940, brake 947 and valve 957 are connected to the opposite circuit side by line 667. The strip *f* will thus be received on and removed from transfer unit R along paths of movement at substantially a right angle to one another before being carried forwardly to the secondary scoring unit Q.

The motor 974 for this scoring unit by the sprocket chain 504 drives the roll shafts 501 and the slat conveyor 451. This motor is operated from service lines 639—640 through contacts 975—976 of relay switch 977. The operation of motor 974 is substantially continuous except when conventional controls are operated to halt the movement of glass.

When entering the squaring area of the secondary scoring unit Q, the glass strip engages the rollers 456 of fingers 454 and, in one way or another, produces actuation of related micro-switches 978 as shown in Fig. 65. These switches are connected by lines 979 to timer 980 which is connected by line 981 to one side of valve 982 for cylinder 496. Upon expiration of its adjusted interval, timer 980 actuates valve 982 through line 981. The valve by pipe 983 operates said cylinder so that the arm 497 will be rocked to remove the said fingers 454 from their glass-engaging positions. Thereafter, the strip passes beneath the effectively located scoring heads 457 of the scoring unit Q and is carried toward and onto the transfer unit T by the conveyor 451.

As previously noted in the specification, the glass strip is received on rolls 509 of transfer unit T since the frame 510 is then elevated and said strip will then be removed to run-out conveyor U on the belts 511. As the strip enters transfer unit T, it operates a micro-switch 984 to close line 985 from circuit line 633 which line is connected to the opposite side of valve 982. This will produce reversal of said valve and consequently by pipe 986 to cylinder 496 the direction of pressure will rock arm 497 so that fingers 454 will be re-positioned. Circuit of line 985 also activates timer 986 to energize coil 987 of relay switch 988 by line 989 thereby opening service lines 639—640 at contacts 990—991 to halt motor 992 which generally operates rolls 509, when sheet is moved into engagement with suitable stop means in substantially the central area of the unit T. Through closed contacts 993, a line 994 from circuit line 633 actuates brake 995 to halt motor 992; simultaneously opening of contacts 996 and closing of contacts 997 reverses the flow of service from line 633 from line 998 to one side of valve 999 to line 1000 to the opposite side thereof. This reversal operates to change the direction of pressure from pipe 1001 to cylinder 1002 to pipe 1003 whereby frame 510 will be lowered to deposit the glass sheet on the plurality of belts 511 of transfer unit T.

As the frame 510 descends, a micro-switch 1004 by line 1005 from circuit line 633 activates timer 1006 to energize coil 1007 of relay switch 1008 by line 1009 thereby closing service lines 639—640 at contacts 1010—1011 to motor 1012 for driving belts 511. Timer is adjusted to limit operation period of motor 1012 until the strip f has been carried onto the run-out conveyor unit U.

Timer 1006 is also attached by line 1013 to the magnetic clutch 518. Now, as the motor drives power unit 514 not only will the belts 511 of the transfer unit T be driven by sprocket chain 521 but, through energized clutch 518, sprocket chain 522 will operate the roll shafts 523 of the run-out conveyor U at an accelerated rate of speed. That is to say, a more rapid speed than that at which said roll shafts are normally driven through the overrunning clutch 555.

At the end of its active period, timer 1006 by line 1014 energizes coil 1015 of switch 988 to reclose contacts 990—991 for service lines 639—640 to motor 992; reopen contacts 993 to de-energize brake 995, and open contacts 997 while reclosing contacts 996 to produce reversal of valve 999 and thereby return the frame 510 to its uppermost position as the rolls 509 resume their operation. Line 1014 also energizes coil 1016 of relay switch 1008 to produce opening of contacts 1010—1011 and thereby the service lines 639—640 to belt motor 1012. In its activity, the timer, further, de-energizes magnetic clutch 518 whereupon the roll shafts 523 of the run-out conveyor U will again be driven from motor 538 which, as previously described, also operates the secondary breaking unit V, the washing unit W and the takeoff conveyor X. Coils 987, 1007, 1015 and 1016 as well as valve 982 and timers 986—1006 are conventionally connected to the opposite circuit side by line 667.

The service lines 639—640 for motor 538 may be connected by relay switch 1017 and while no control has been indicated for such motors 95, 538, 750, 831, 833, 866, 934 and 974, it is to be understood that conventional controls are utilized to maintain such operation.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. A sheet glass cutting machine adapted to separate glass blanks into a plurality of individual cut portions which machine includes, a primary cutting unit adapted to score the blanks longitudinally with respect to their path of movement, a breaking unit adapted to break said scored blanks into individual cut portions, first conveying means adapted to transport the blanks through said primary cutting unit and to said breaking unit, a plurality of secondary cutting units adapted to score the individual cut portions longitudinally with respect to their path of movement, second conveyor means for selectively conveying cut portions of the glass sheets to the secondary cutting units from said breaking unit and means automatically controlling the movement of the glass sheets through said cutting units, breaking unit and conveyor means.

2. A sheet glass cutting machine as described in claim 1, wherein the first conveyor means causes the sheets to be moved through the primary cutting unit in periodically spaced intervals of sequential movement.

3. In a sheet glass cutting machine as described in claim 1, means for moving the sheets into longitudinal alignment with the primary cutting unit as they are sequentially moved therethrough.

4. A sheet glass cutting machine adapted to separate glass blanks into a plurality of individual cut portions which machine includes, a primary cutting unit adapted to score the blanks longitudinally with respect to their path of movement, a breaking unit adapted to break each blank into individual cut portions, first conveying means adapted to transport the blanks from said first cutting unit to said breaking unit, a plurality of secondary cutting units adapted to score the individual cut portions longitudinally with respect to their path of movement, a conveyor system arranged between the primary cutting unit and the breaking unit and adapted to carry a glass sheet in a direction transverse to the direction of movement on said primary cutting unit, a second conveyor system arranged between the breaking unit and the plurality of secondary cutting units, means for automatically controlling movement of the glass sheets from the primary cutting unit to the breaking unit on the first-named conveyor system, means for selectively directing cut portions of the glass sheet from the breaking unit to the plurality of secondary cutting units while on the second-named conveyor system and means for moving a glass sheet through the cutting unit, the breaking unit and the secondary cutting units.

5. In a sheet glass cutting machine, a primary cutting unit, a series of cutter elements mounted thereon for producing parallel cut lines in sheets of glass in a direction longitudinal with respect to the direction of movement of the glass material, a breaking unit for separating said sheets into cut sections, a plurality of secondary cutting units, a series of cutting elements mounted thereon for producing parallel cut lines in each of the several cut sections in a direction longitudinal with respect to the direction of movement of the glass material, a conveyor system arranged between the said units, means for automatically controlling movement of glass sheets as it passes through said conveyor system, means for selectively directing the several cut sections of each glass sheet from the breaking unit to the plurality of secondary cutting units and means for moving a glass sheet through the cutting unit, the breaking unit and the secondary cutting units.

6. In a sheet glass cutting machine as described in claim 5, means in the conveyor system for moving the glass sheets to the breaking unit in a direction substantially at right angles to the movement of said sheets from the primary cutting unit.

7. In a sheet glass cutting machine as described in claim 6, wherein the second-named means directs the several cut sections of each glass sheet from the breaking unit in a direction substantially at right angles to the movement of said glass sheets therethrough and at selectively spaced points along the said other portion of the conveyor system.

8. In a sheet glass cutting machine, a primary cutting unit, a series of cutting elements mounted thereon for producing parallel cut lines in successive sheets of glass longitudinally with respect to the direction of movement of the glass material, a breaking unit, a plurality of secondary cutting units, a series of cutting elements mounted thereon, a first conveyor system arranged between the primary cutting unit and breaking unit adapted to carry said sheets of glass in a direction substantially at a right angle to their movement in said primary cutting unit to separate the sheets into several sections along the parallel cut lines, a second conveyor system arranged between the breaking unit and the plurality of secondary cutting units and adapted to carry the several glass sections in a direction transverse to their movement on the breaker unit to produce in the secondary cutting units cut lines longitudinally with respect to the direction of movement of the glass material at substantially right angles to the original cut lines, means for selectively directing the several sections of the glass sheets from the breaking unit to the plurality of secondary cutting units while moving on the second-named conveyor system, means for subsequently breaking each of the several sections of the glass sheets as they are carried in a direction of movement substantially at right angles to their movement in the secondary cutting units and means for moving a glass sheet through the cutting unit, breaking unit and the secondary cutting units.

9. In a sheet glass cutting machine having in combination with a first breaking unit and a plurality of secondary cutting units said first breaking unit located in advance of said plurality of secondary cutting units and adapted to break the sheets into individual cut portions, a primary cutting unit located in advance of said first breaking unit comprising feed means, squaring means, cutting means and trimming means, means for moving glass sheets in spaced sequence through and between the said means, said cutting means including, cutting elements mounted in position to engage glass sheets moving through the cutting means, said squaring means including, a transversely movable carriage and squaring elements disposed on the carriage to move the glass sheets into positions of longitudinal alignment with the said cutting elements, and means engageable by the glass sheets for actuating the movable carriage.

10. In a sheet glass cutting machine as described in claim 9, wherein said trimming means includes edge breaking means for longitudinally scoring and breaking marginal areas from the glass sheets.

11. In a sheet glass cutting machine as described in claim 9 wherein said primary cutting unit includes a second breaking unit, means for carrying the longitudinally cut sheets to a breaking unit from said trimming means, and transfer means disposed between said trimming means and second breaking unit to move the said sheets in a direction substantially at right angles to their movement from the trimming means into said second breaking unit.

12. A sheet glass cutting machine adapted to separate glass blanks into a plurality of individual cut portions which machine includes having a primary cutting unit adapted to score the blanks longitudinally with respect to their path of movement, a breaking unit adapted to break each blank into individual cut portions, first conveying means adapted to transport the blanks from said first cutting unit to said breaking unit and a plurality of secondary cutting units adapted to score the individual cut portions longitudinally with respect to their path of movement, said primary cutting unit comprising a loading conveyor, squaring means, cutting means and transfer means, means for moving glass sheets sequentially from the loading conveyor to the squaring means and from said means to the cutting means, said cutting means including cutting elements, said squaring means including margin defining members, a transversely movable carriage, a cylinder connected to a source of pressure for operating the movable carriage, an electric valve located in the cylinder pressure line, limit switches adapted to energize said valve when contacted by the moving sheets of glass, squaring elements disposed on the carriage for engaging said glass and moving same into alignment with the said margin defining members, means between said cutting means and the transfer means for trimming the marginal edges from the glass sheets before entering said transfer means, said transfer means adapted to move said sheets in a direction of movement substantially at right angles to their movement in the cutting means to the breaking unit, means for separating the sheets into several cut sections in the breaking unit, and means for selectively moving the several cut sections of the said sheets in individual order and in directions of movement substantially at right angles to their movement in the breaking unit to the plurality of secondary scoring units.

13. A sheet glass cutting machine adapted to separate glass blanks into a plurality of individual cut portions, which machine includes a primary cutting unit adapted to score the blanks longitudinally with respect to their path of movement, a breaking unit adapted to break each blank into individual cut portions, first conveying means adapted to transport the blanks from said first cutting unit to said breaking unit, a plurality of secondary cutting units adapted to score the individual cut portions longitudinally with respect to their path of movement, a conveyor system for moving spaced sheets of glass to the primary cutting unit, means controlling movement of the glass sheets in sequential order into the said cutting unit, means for longitudinally aligning the said sheets upon entering the said cutting unit, an edge trimming unit positioned to receive longitudinally cut sheets from the primary cutting unit and adapted to break the longitudinal marginal edges therefrom, a transfer unit between said trimming unit and said breaking unit, means for carrying the cut sheets in said transfer unit to position the cut lines in said sheets transversely to the sheet's movement, means in the breaking unit for separating the sheets into several cut sections, a conveyor system between said breaking unit and said secondary cutting units, and means in said conveyor system for individually moving each of the several sections at selected points therein in a direction of movement substantially at right angles to their movement along said conveyor system and toward said secondary cutting units.

14. In a sheet glass cutting machine as described in claim 13, a plurality of secondary breaking units, and means for receiving a separated sheet section from the secondary cutting unit and for moving said section to the related secondary breaking unit in a direction of movement substantially at right angles to their movement from the said secondary cutting unit.

References Cited in the file of this patent

UNITED STATES PATENTS

| | | |
|---|---|---|
| 1,324,219 | Waterloo | Dec. 9, 1919 |
| 1,377,320 | Crowley | May 10, 1921 |
| 1,591,179 | Myers | July 6, 1926 |
| 1,642,839 | Chadwick | Sept. 20, 1927 |
| 1,702,522 | Owen | Feb. 19, 1929 |
| 1,798,625 | Owen | Mar. 31, 1931 |
| 1,861,665 | Owen | June 7, 1932 |
| 1,946,356 | Owen | Feb. 6, 1934 |
| 2,042,819 | Allison | June 2, 1936 |
| 2,236,011 | Shock | Mar. 25, 1941 |
| 2,747,280 | Kurata | May 29, 1956 |

FOREIGN PATENTS

| | | |
|---|---|---|
| 257,033 | Germany | Feb. 26, 1913 |